US 6,940,243 B2

(12) United States Patent
Berroth et al.

(10) Patent No.: US 6,940,243 B2
(45) Date of Patent: Sep. 6, 2005

(54) METHOD FOR COMMUTATING AN ELECTRONICALLY COMMUTATED DC MOTOR, AND MOTOR FOR CARRYING OUT SAID METHOD

(75) Inventors: Hansjörg Berroth, VS-Obereschach (DE); Alexander Hahn, Sauldorf (DE); Frank Heller, St. Georgen (DE); Frank Jeske, St. Georgen (DE); Arno Karwath, Rottweil (DE); Arnold Kuner, St. Georgen (DE); Hans-Dieter Schondelmaier, St. Georgen (DE); Hermann Rappenecker, Vöhrenbach (DE); Günther Strasser, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 10/415,055

(22) PCT Filed: Dec. 21, 2001

(86) PCT No.: PCT/EP01/15238

§ 371 (c)(1),
(2), (4) Date: Apr. 23, 2003

(87) PCT Pub. No.: WO02/054565

PCT Pub. Date: Jul. 11, 2002

(65) Prior Publication Data

US 2004/0036435 A1 Feb. 26, 2004

(30) Foreign Application Priority Data

Dec. 28, 2000 (DE) ........................................ 100 65 834

(51) Int. Cl.$^7$ .............................................. H02K 13/00
(52) U.S. Cl. ........................ 318/439; 318/254; 318/434
(58) Field of Search ................................ 318/139, 254, 318/434, 439, 663; 363/98; 701/42, 1; 123/399

(56) References Cited

U.S. PATENT DOCUMENTS

| 4,542,323 A | 9/1985 | Doemen ..................... 318/254 |
| 4,581,565 A | 4/1986 | Van Pelt et al. ............ 318/294 |

(Continued)

FOREIGN PATENT DOCUMENTS

| DE | 41 24 240 A1 | 1/1993 |
| EP | 0 397 514 | 11/1990 |
| EP | 0 831 580 | 3/1998 |
| JP | 9-271 198 A | 10/1997 |

OTHER PUBLICATIONS

Patent Abstracts of Japan, English abstract of unexamined publication JP 9–271 198–A, Obayashi, based on application JP 9–010 601 filed Jan. 23, 1997.

Derwent English Abstract of EP 0 831 580, Zeh, no date.

*Primary Examiner*—Paul Ip
(74) *Attorney, Agent, or Firm*—Milton Oliver, Esq.; Ware Fressola Van Der Sluys & Adolphson LLP

(57) ABSTRACT

An improved method of commutating an electronically commutated DC motor shuts off application of power between the end of one current pulse and the beginning of the subsequent current pulse. Based upon the instantaneous rotation speed, one calculates at what instant to shut off the power. During the power interruption, the disconnected winding is operated in short-circuit mode using two MOS-FET transistors, and the decay of the current is monitored. When the current reaches a predetermined reduced value, the terminals of the winding are switched to a high-resistance state, until the subsequent current pulse is started. This has the advantage that less reactive power occurs during operation, and one need not install as bulky a storage capacitor as the capacitors used heretofore.

8 Claims, 31 Drawing Sheets

U.S. PATENT DOCUMENTS

| | | | | |
|---|---|---|---|---|
| 4,677,356 A | * | 6/1987 | Tsuneda et al. | 318/258 |
| 4,924,158 A | * | 5/1990 | Kelley et al. | 318/434 |
| 4,933,621 A | | 6/1990 | MacMinn et al. | 318/696 |
| 5,202,830 A | * | 4/1993 | Tsurumiya et al. | 701/41 |
| 5,296,787 A | | 3/1994 | Albrecht et al. | 318/433 |
| 5,444,622 A | * | 8/1995 | Takeshima et al. | 701/41 |
| 5,537,015 A | | 7/1996 | Karwath | 318/439 |
| 5,642,247 A | * | 6/1997 | Giordano | 361/31 |
| 5,708,578 A | * | 1/1998 | Stoddard et al. | 363/98 |
| 5,732,373 A | * | 3/1998 | Endo | 701/42 |
| 5,784,270 A | | 7/1998 | Permuy | 363/132 |
| 5,801,504 A | * | 9/1998 | Endo et al. | 318/434 |
| 5,814,957 A | * | 9/1998 | Yoshida | 318/439 |
| 5,894,206 A | * | 4/1999 | Noro et al. | 318/433 |
| 5,903,128 A | | 5/1999 | Sakakibara et al. | 318/721 |
| 5,912,539 A | * | 6/1999 | Sugitani et al. | 318/434 |
| 5,920,174 A | * | 7/1999 | Kawada et al. | 318/663 |
| 6,212,447 B1 | * | 4/2001 | Kohge et al. | 701/1 |
| 6,226,580 B1 | * | 5/2001 | Noro et al. | 701/42 |
| 6,249,094 B1 | | 6/2001 | Zeh et al. | 318/254 |
| 6,390,064 B2 | * | 5/2002 | Marumoto et al. | 123/399 |
| 6,497,303 B1 | * | 12/2002 | Nishimura et al. | 180/446 |
| 6,559,689 B1 | * | 5/2003 | Clark | 327/97 |
| 6,563,284 B2 | * | 5/2003 | Teutsch et al. | 318/599 |
| 6,678,177 B2 | * | 1/2004 | Asano et al. | 363/98 |
| 2001/0048278 A1 | * | 12/2001 | Young et al. | 318/254 |

* cited by examiner

METHOD FOR COMMUTATING AN ELECTRONICALLY COMMUTATED DC MOTOR, AND MOTOR FOR CARRYING OUT SAID METHOD

FIELD OF THE INVENTION

The invention concerns a method for commutating an electronically commutated DC motor, and a motor for carrying out such a method.

BACKGROUND

An electronically commutated motor "breathes" during operation; i.e. in addition to its normal energy consumption, it alternately receives energy from the power network or from a storage capacitor connected to the power network, and at intervals—during commutation—delivers energy to that storage capacitor. In electrical engineering, this phenomenon is also referred to as the phenomenon of reactive power. In order to adapt to this reactive power, the storage capacitor must be of considerable size (usually hundreds of $\mu$F) so it can temporarily store this energy. A storage capacitor of this kind has a limited service life and requires a great deal of space in the motor.

SUMMARY OF THE INVENTION

It is therefore an object of the invention to make available a novel method for commutating an electronically commutated motor, and a motor adapted to that method.

According to the invention, this object is achieved by executing, at the end of a current pulse, a switchoff routine designed to improve the conversion of electric energy, stored in the winding to be switched off, into mechanical energy driving the rotor. This is therefore a method for commutating an electronically commutated motor comprising an improved commutation procedure that is effective between the switching off of one current pulse and the switching on of a subsequent current pulse. In this, a switchoff time is calculated based on the instantaneous rotation speed, and energy delivery from a direct current source to the motor is interrupted when that time is reached. The winding to be switched off is then operated substantially in short-circuit by way of two bidirectionally conducting semiconductor switches, and the decaying current in the winding is monitored. When it has reached a reduced value, the winding terminals of the winding are temporarily switched to high resistance before the subsequent current pulse begins. The result is that during the commutation procedure, the energy stored electrically in the inductance of the motor is converted better into mechanical energy, so that less reactive power occurs and consequently a smaller storage capacitor is needed.

An advantageous motor for carrying out such a method employs a full bridge circuit comprising at least two field effect transistors (FET's) which serve to operate a motor winding in short circuit during a predetermined operating state of the motor, and an arrangement for monitoring the direction of the current flowing in said short circuit and to initiate opening of said short circuit when a reversal of said current direction is sensed.

BRIEF FIGURE DESCRIPTION

Further details and advantageous embodiments of the invention are evident from the exemplary embodiments, to be understood in no way as a limitation of the invention, that are described below and depicted in the drawings. In the drawings.

DETAILED DESCRIPTION

Figure 1:
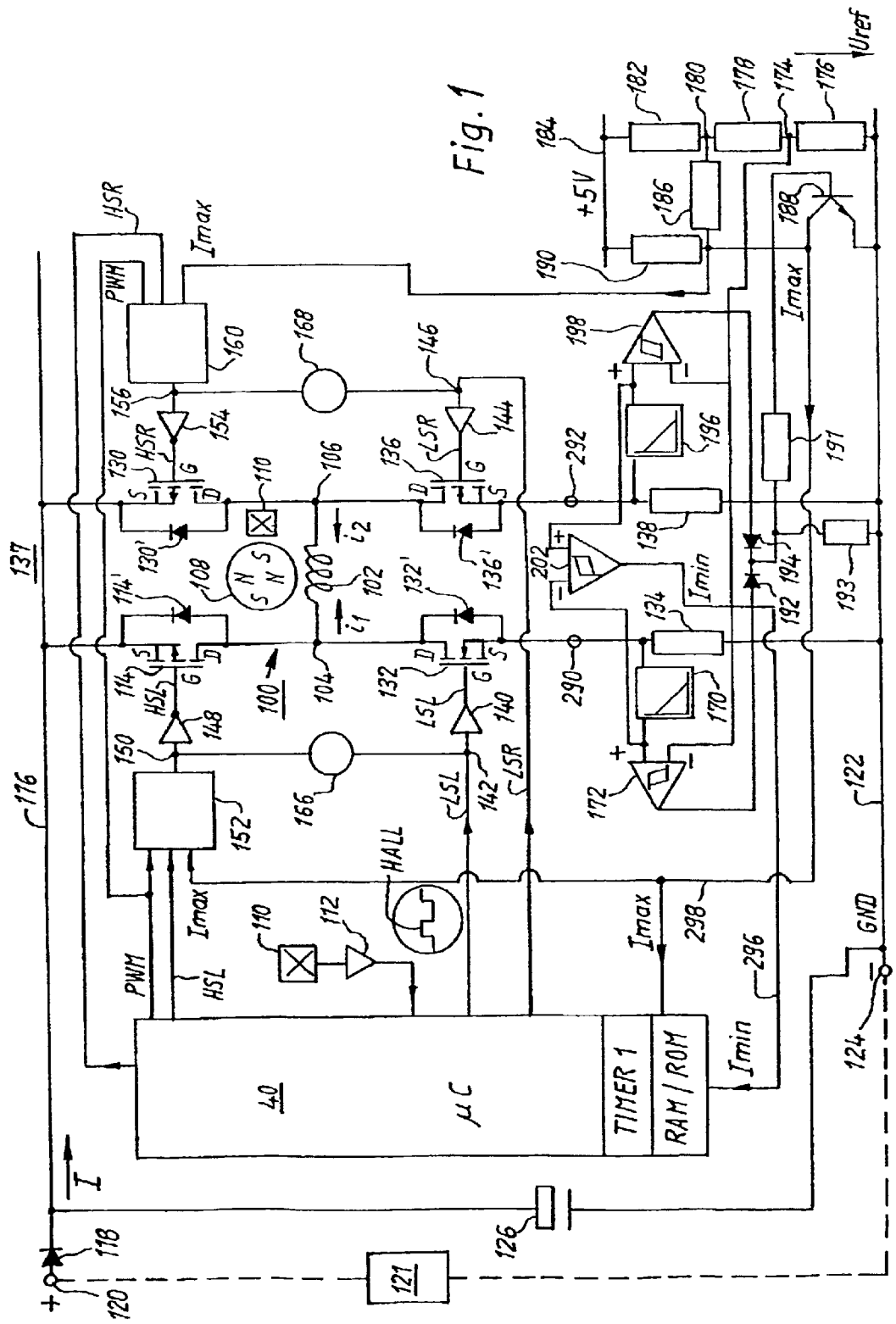
FIG. 1 is an overview circuit diagram of a preferred embodiment of a direct current motor according to the present invention.

In the description below, identical reference characters are used for identical or identically functioning parts, which are usually described only once. Since the subject is a difficult one, concrete numerical values—e.g. 3 A, 1.6 A, 200 µs, 1000 rpm, etc.—are often indicated in order to make the text more readable. It is understood as self-evident, however, that these concrete values are merely preferred examples which in no way limit the invention.

FIG. 1 provides an overview of a preferred embodiment of a motor according to the invention.

In this embodiment, the actual motor 100 has one winding phase 102 having two terminals 104, 106, as well as a permanent-magnet rotor 108. The exemplary embodiment below refers to a motor 100 having a four-pole rotor 108, although any number of poles, and also other numbers of winding phases, are of course possible. The example of motor 100 was selected because of its simplicity, in order to facilitate comprehension of this very complex invention.

Figure 15:
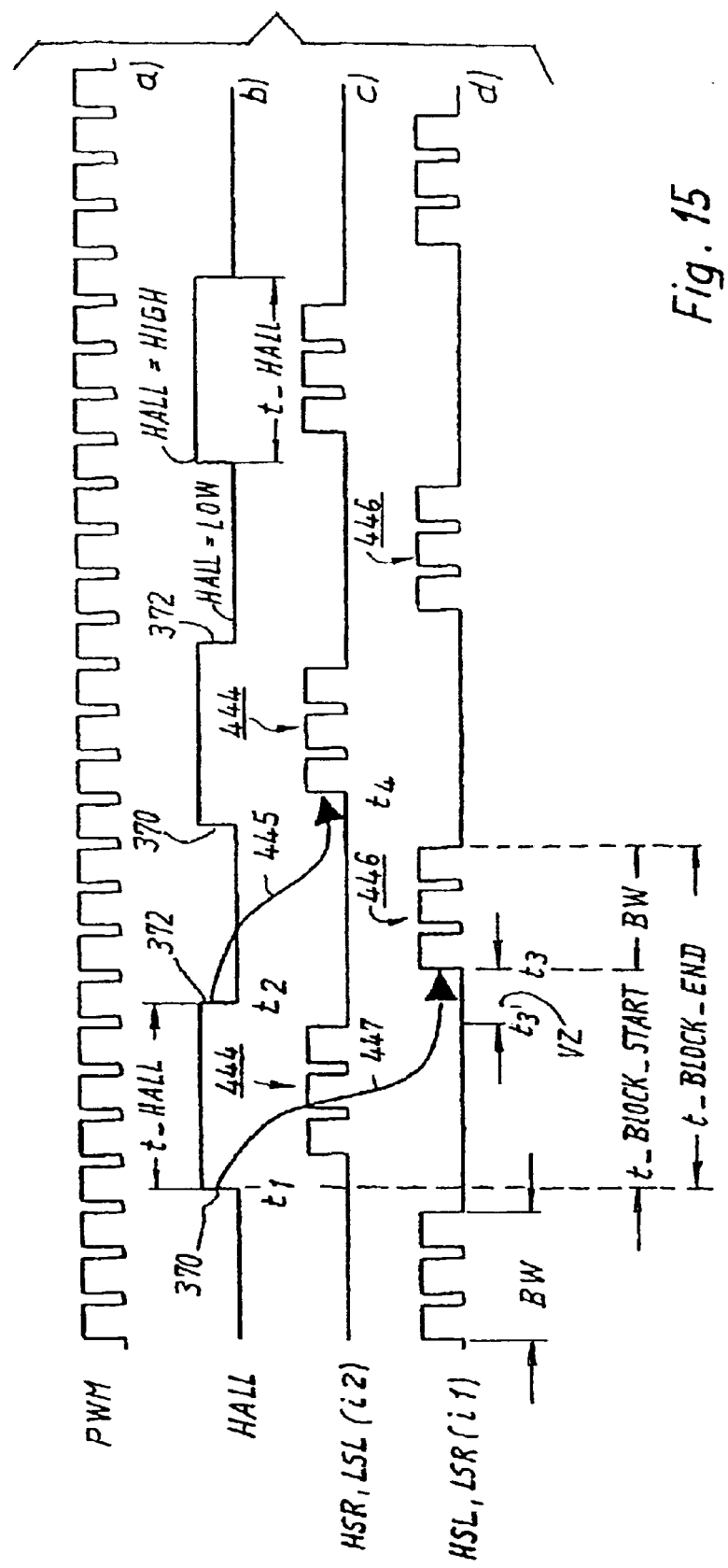
FIG. 15 is a diagram explaining the Figures that follow.

The exemplary embodiment shows a motor 100 in which a current i1 flows from terminal 104 to terminal 106 in the region of a rotor rotation of 180° el., and a current i2 flows from 106 to 104 in the region of the subsequent rotor rotation of 180° el. The duration (beginning and end) and amplitude of currents i1 and i2 are varied depending on the motor's needs; this is usually referred to as a so-called block control system, i.e. current i1 can have a length e.g. of between 0° and 180° el., as can current i2. Also possible, without any additional effort, is a so-called "ignition advance," as indicated in FIG. 15 at VZ and explained in equations (3a) and (4a) below.

Since a motor of this kind requires only a single winding 102, it is very simple. It is preferably used to drive fans. DE 2 346 380 and corresponding U.S. Pat. No. 3,873,897, Muller, give an example of the construction of such a motor, which is produced in a great many variants.

Figure 30:
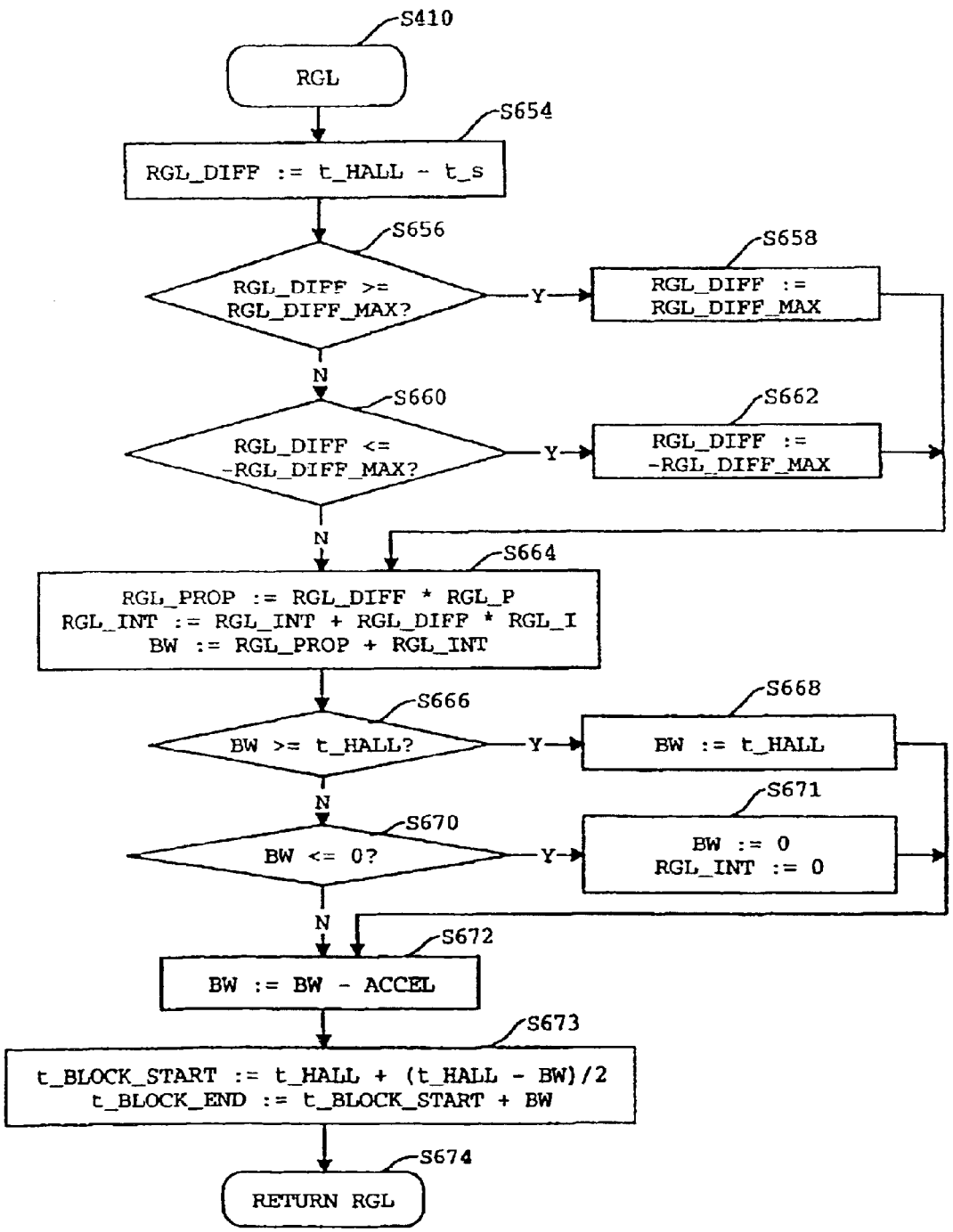
FIG. 30 shows an RGL routine for rotation speed regulation.

Motor 100 preferably has a galvanomagnetic rotor position sensor 110, e.g. a Hall generator, controlled by rotor 108, and that sensor is shown again on the left in FIG. 1. Its output signals are amplified by an amplifier 112, converted into square-wave HALL pulses, and then conveyed to a microcontroller µC 40, where each edge of these HALL pulses triggers an interrupt (hereinafter referred to as a HALL interrupt) (cf. FIG. 16). Because of the magnetization of rotor 108, a HALL interrupt of this kind is triggered each time rotor 108 has rotated through 180° el. The distance t_HALL between two HALL interrupts is large at low rotation speeds and small at high rotation speeds, and is therefore an indication of the rotation speed of rotor 108 which is used for rotation speed regulation (FIG. 30). The time span t_HALL corresponds to the time required by rotor 108 to rotate through 180° el.; cf. equations (6) and (7) below.

Terminal 104 of winding 102 is connected to drain D of a p-channel MOSFET 114 whose source S is connected to a positive line 116 that is connected via a protective diode 118 to a positive terminal 120 which usually is connected to a (schematically indicated) power supply unit 121 which supplies a DC voltage of, for example, 12, 24, 48 or 60 V depending on the type of motor 100. The negative line (GND) of motor 100 is labeled 122, and its terminal 124. A capacitor 126 is located between positive line 116 and negative line 122.

Motor 100 "breathes" as it operates, i.e. it alternately receives energy from power supply unit 121 and capacitor 126 and in the intervals during the commutation procedures—delivers energy, which must be temporarily stored by capacitor 126 so that the voltage between lines 116 and 122 does not become too high. Capacitor 126 therefore has a size that is approx. 500 µF in conventional motors with comparable performance data, and that can be significantly decreased in the context of the invention. It is not easy to accommodate large capacitors 126 in small motors. Because of the high temperature in a motor, the service life of such a capacitor is limited. One of the objects of the invention is therefore to keep capacitor 126 small and to place little electrical load on it. At an operating voltage of 12 V, for example, the size of this capacitor can be 60 to 100 µF when the motor is operating according to the invention.

Terminal 106 of winding 102 is connected to drain D of a p-channel MOSFET 130 whose source S is connected to line 116.

Terminal 104 is also connected to drain D of an n-channel MOSFET 132 whose source S is connected via a measuring resistor 134 to negative line 122.

Terminal 106 is likewise connected to drain D of an n-channel MOSFET 136 whose source is connected via a measuring resistor 138 to negative line 122.

Free-wheeling diodes 114', 130', 132', 136' are connected in the usual manner antiparallel to MOSFETs 114, 130, 132, 136.

Gate G of MOSFET 132 is connected to the output of an amplifier 140 to whose input 142 a signal LSL is conveyed from µC 40 when MOSFET 132 is to be switched on. (LSL is hereinafter also referred to as LSL_OUT, and similarly for signals LSR, HSL, and HSR.)

Gate G of MOSFET 136 is connected to the output of an amplifier 144 to whose input 146 a signal LSR is conveyed from µC 40 when transistor 136 is to be switched on.

Gate G of MOSFET 114 is connected to the output of an amplifier 148 whose input 150 is controlled by the output signal of a logic element 152. Together with amplifier 148 this constitutes a NAND gate; i.e. when one of the input signals of logic element 152 is low, MOSFET 114 is blocked. In that case, logic element 152 has a low output signal. The resistance of driver amplifier 148 thus becomes high, pulling the potential at gate G of FET 114 upward so that the latter becomes nonconductive.

Gate G of MOSFET 130 is connected to the output of an amplifier 154 whose input 156 is controlled by the output signal of a logic element 160. Together with amplifier 154 this constitutes a NAND gate; i.e. when one of the input signals of logic element 160 is low, MOSFET 130 is blocked. Because of the symmetry of the circuit, the mode of operation is the same as for FET 114.

Both logic elements 152 and 160 have conveyed to them from µC 40 a PWM signal PWM which has e.g. a frequency of 20 kHz and whose pulse duty factor pwm can be set by means of µC 40 at between 0 and 100%. This signal PWM is continuously generated by µC 40 during operation, and determines the magnitude of the current conveyed to motor 100.

Similarly, both logic elements 152 and 160, as well as μC 40, have a (low) signal Imax conveyed to them when the current in MOSFET 132 or in MOSFET 136 exceeds a defined limit value. This signal Imax results in immediate shutoff of both MOSFETs 114 and 130 by way of the motor's hardware. (Only one of these two MOSFETs 114, 130 can ever be active at any given point in time.) Signal Imax is therefore "low-active," i.e. it shuts the current off when the signal becomes low.

Logic element 152 also has conveyed to it from μC 40 a commutation signal HSL for controlling transistor 114. Similarly, logic element 160 has conveyed to it from μC 40 a commutation signal HSR for controlling transistor 130.

The terms HSL, etc. are mnemonic and denote the following:

| HSL | High side left | Transistor 114 |
| HSR | High side right | Transistor 130 |
| LSL | Low side left | Transistor 134 |
| LSR | Low side right | Transistor 136 |

The four transistors 114, 130, 132, 136 constitute, together with winding 102, a so-called H bridge (or full bridge) 137 having high-side (HS) transistors 114, 130 and low-side (LS) transistors 132, 136. When transistors 114 and 136 are switched on, a current i1 flows in winding 102 from left to right. When transistors 130 and 132 are switched on, a current i2 flows in winding 102 from right to left.

Provided between inputs 142 and 150 is an interlock 166 which prevents transistors 114 and 132 from being conductive simultaneously. Similarly provided between inputs 146 and 156 is an interlock 168 which prevents both transistors 130 and 136 from being conductive simultaneously. These interlocks serve to protect H-bridge 137.

The voltage at resistor 134 is conveyed through a signal filter 170 (to filter out interference pulses) to the positive input of a comparator 172 whose negative input is connected to a node 174 that is connected via a resistor 176 to negative line 122 and via a resistor 178 to a node 180 which is connected via a resistor 182 to a line 184 to which a regulated voltage of +5 V is applied. The voltage at resistor 176 thus constitutes a reference voltage Uref which determines the current at which the maximum current detector responds.

Node 180 is connected via a resistor 186 to the collector of an npn transistor 188 at which a (low) signal Imax is generated in the event of overcurrent, and which is therefore connected directly to logic elements 152 and 160 and to μC 40, and also via a resistor 190 to line 184.

The emitter of transistor 188 is connected to negative line 122. Its base is connected via a resistor 191 to the cathodes of two diodes 192, 194 that are connected via a resistor 193 to negative line 122 (GND). The anode of diode 192 is connected to the output of comparator 172.

The voltage at measuring resistor 138 is conveyed, via a signal filter 196, to the positive input of a comparator 198 whose negative input is connected to node 174. The output of comparator 198 is connected to the anode of diode 194.

When the current through measuring resistor 134 becomes too high, the positive input of comparator 172 becomes more positive than the negative input, so that transistor 188 receives a base current through diode 192 and is switched on. When the current through resistor 138 becomes too high, the positive input of comparator 198 becomes more positive than its negative input, so that transistor 188 receives a base current through diode 194 and becomes conductive.

In both cases, resistor 186 is thereby switched in parallel with resistors 176, 178, thereby increasing the current through resistor 182 and therefore the voltage drop at that resistor. As a result, reference voltage Uref automatically drops as soon as transistor 188 switches on, and this causes a switching hysteresis, i.e. comparator 172 switches on e.g. at an overcurrent of 3 A, and shuts off again only at approximately 1.6 A, and likewise for comparator 198. This means that high-side transistors 114, 130 are forced to switch off e.g. at 3 A and can be (but do not need to be!) switched back on only when the current in resistor 134 or 138 has dropped to 1.6 A. This prevents overloading of high-side transistors 114, 130, i.e. in the event of an overcurrent the presently conductive transistor is completely shut off as soon as the low signal Imax is generated at the collector of transistor 188, and it cannot be switched back on until signal Imax is no longer being generated and the other criteria for switching it on are present, as will be explained in more detail below.

A comparator 202, whose negative input is connected to the positive input of comparator 172 and whose positive input is connected to the positive input of comparator 198, serves to recognize the zero transition for the instance in which both high-side transistors 114, 130 are blocked and both low-side transistors 132, 136 are conductive.

Figure 3:
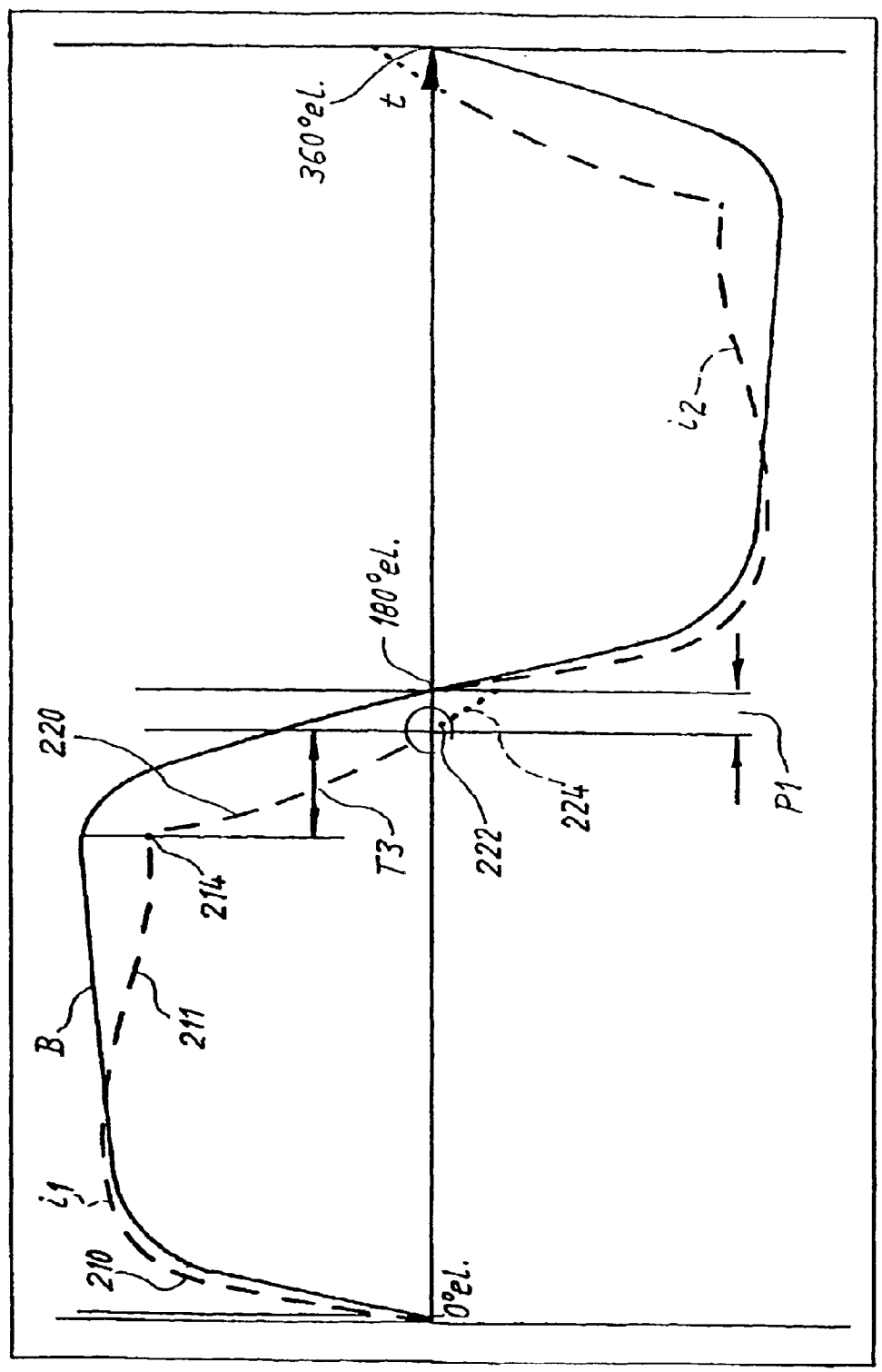
FIG. 3 is a schematic diagram similar to FIG. 2, to explain the commutation procedure in a motor according to the invention.

When the two low-side transistors 132, 136 are made conductive after shutoff of a previously conductive high-side transistor 114 or 130, the current generated by the electrical energy stored in winding 102 causes a voltage drop at both resistors 134, 138; and when the current through winding 102 transitions from motor mode into generator mode, as is the case in FIG. 3 at point 222, this current changes direction and passes through zero.

For example, when current is flowing in motor mode from terminal 106 through resistors 138, 134 to terminal 104, the positive input of comparator 202 is more positive than its negative input. After the zero transition, current flows from terminal 104 through resistors 134, 138 to terminal 106, and the negative input of comparator 202 now becomes more positive than the positive input, so that at the current's zero transition, signal Imin at the output of comparator 202 abruptly changes, i.e. either from low to high or from high to low. At the zero transition an abrupt signal change (switching edge) thus occurs at the output of comparator 202, and this brings about an interrupt in μC 40 that causes all four transistors 114, 130, 132, 136 to be blocked. This interrupt is referred to as an "Imin interrupt" and will be explained in more detail in FIG. 19 below.

Figure 2:
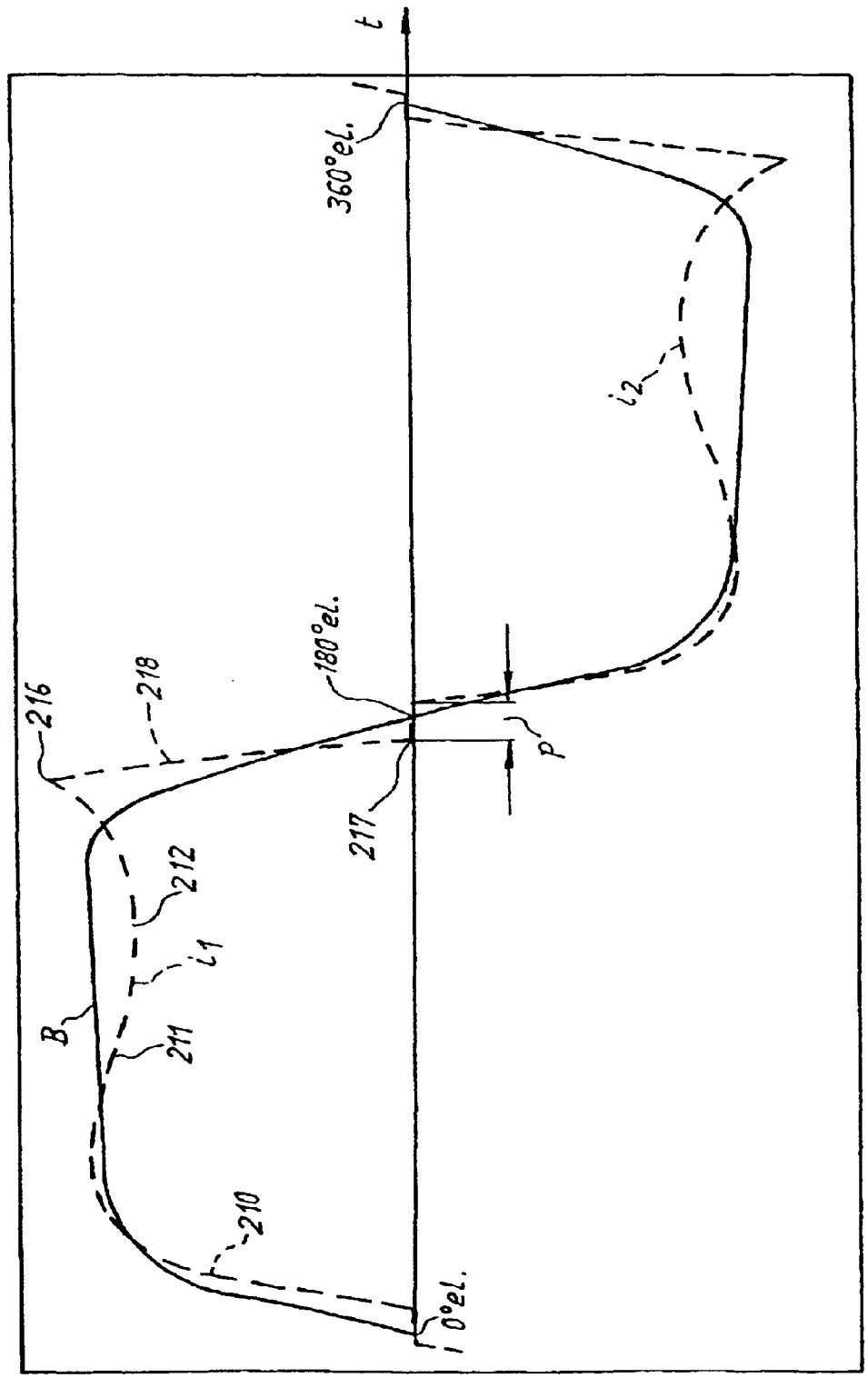
FIG. 2 is a schematic diagram to explain the commutation sequence in a motor according to the existing art.

To explain the general mode of operation of FIG. 1, reference will be made to FIGS. 2 and 3, which explain the operating principle in highly schematic fashion. FIG. 2 shows the current profile in the stator for a motor according to the existing art, and FIG. 3 shows the analogous profile for a motor according to the invention. FIGS. 2 and 3 show, over a rotation angle of 360° el., the following values:

a) Magnetic flux density B at rotor 108

Magnetic flux density is measured in tesla (T). Its profile in this example is approximately trapezoidal, and the term "trapezoidal magnetization" is therefore used. This is a preferred profile of B in the context of the present invention, but not the only conceivable one.

The changes in magnetic flux density B induce a voltage in stator winding 102 when rotor 108 rotates. The shape of this voltage corresponds to the shape of B, i.e. is also trapezoidal in this case. The amplitude of this voltage increases with increasing rotation speed. This voltage is referred to as the "induced voltage" or "counter-EMF."

b) FIG. 2 shows the stator current profile in a conventional motor Current i1 through winding 102 usually begins at a time after 0° el. and rises rapidly at first (at 210) because of the low value of B, i.e. the low counter-EMF, in this region. The result of this rise is that some of the energy conveyed by current i1 is transformed, with a time delay, into kinetic energy of rotor 108. Current i1 then decreases again slightly at 211, because of the higher counter-EMF, to a minimum 212. In FIG. 2, i.e. in a conventional motor, current i1 rises from 212 to a maximum 216 where current i1 is shut off, and then drops to zero along a curve 218. In this example (FIG. 2), zero transition 217 is reached somewhat before 180° el., but can also occur after 180° el. depending on the angular position of Hall generator 110.

Because of the symmetry of the arrangement, the events for current i2 that flows from terminal 106 to terminal 104 are analogous and are therefore not described again. In FIG. 2, current i2 begins at 180° el.

Time span P between point 217 and the onset of current i2 is referred to as the switching off-time or switching gap P. This is necessary, among other reasons, in order to prevent a short circuit in H bridge 137. (For example, if transistors 114 and 132 in FIG. 1 were conductive simultaneously, a short-circuit current would occur through them from positive line 116 to negative line 122.)

In an ECM with conventional commutation, in the angular range approximately from 0° el. to maximum 216 the winding current i1 is converted with a time delay into kinetic energy of rotor 108.

When current i1 is abruptly switched off at point 216, a high induced voltage occurs at winding 102 and attempts to make that current i1 continue to flow, so that between points 216 and 217 current i1 flows through freewheeling diodes 132' and 130' to capacitor 126 and charges it. Energy E stored in winding 102 is transferred almost entirely into capacitor 126, meaning that the latter must be very large so that the voltage between lines 116 and 122 does not rise excessively. Energy E depends on the square of current I at time 216, and on inductance L of winding 102:

$$E = I^2 * L / 2 \tag{1}$$

where
E=magnetic energy stored in winding 102;
I=instantaneous current in winding 102;
L=inductance of winding 102.

Since I is very high at shutoff, energy E that is stored inductively in winding 102 is also very high.

After the shutoff of winding 102, this energy is transferred into capacitor 126. This is therefore a reactive power component that shuttles back and forth between capacitor 126 and winding 102; and because this reactive power is high, capacitor 126 must also be large. The large currents that flow as a result of this reactive power also cause unnecessary losses that reduce the motor's efficiency.

It is the intent of the invention to reduce this reactive power, i.e. to have as little energy as possible flow out of winding 102 into capacitor 126 at shutoff, but instead to drive rotor 108 using that energy.

The Commutation Procedure According to the Invention (FIG. 3)

Figure 25:
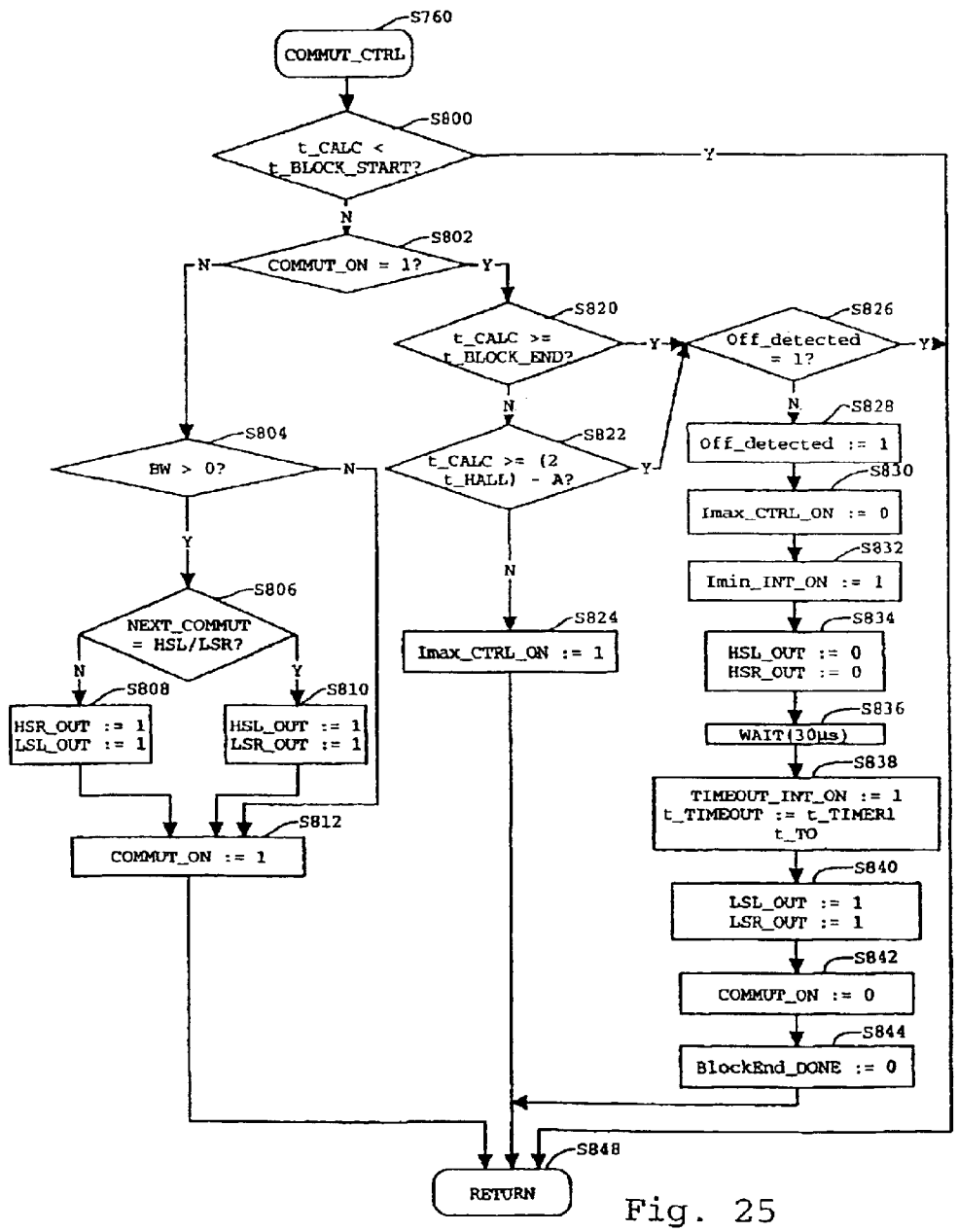
FIG. 25 is a flow chart to explain details of the commutation procedure upon shutoff of a current in winding 102.

A commutation procedure that differs greatly from the conventional one is therefore used (as shown in FIG. 3). In FIG. 3, current i1 once again rises sharply at 210 after switching on, and decreases at 211. To that extent the profile is similar to that in FIG. 2. It is different in the following ways, however:

a) Energy delivery from lines 116, 122 to winding 102 is shut off at a point 214 calculated by μC 40, usually at a point where motor current i1 has not yet reached its maximum 216 (FIG. 2). The calculation of shutoff time 214 is described in FIG. 30. Shutoff is effected by shutting off, at point 214, the instantaneously conducting high-side transistor (either 114 or 130). FIG. 25 below describes, by way of example, how this can be done.

b) Subsequent to point in time 214, usually after a short off-time, both low-side transistors 132 and 136 are then made conductive (cf. FIG. 25, S840) so that current i1 can continue to flow through these two transistors; in FET 136 it flows from drain D to source S, which is possible in a FET. This results in a low-resistance connection between terminals 104 and 106 of winding 102, and in this connection current i1 decays along a curve 220, continuing to drive rotor 108 (i.e. to generate motor-mode energy).

c) At a point 222, current i1 transitions through zero and would thereafter continue to flow as generator-mode current 224 if transistors 132 and 136 were to continue conducting. This current 224 is indicated as a dotted line. Since it would have a braking effect, it is undesirable.

To prevent this, OP amplifier 202 (FIG. 1) generates signal Imin in the vicinity of point 222. This signal generates an Imin interrupt in μC 40, so that the latter immediately makes all four transistors 114, 130, 132, 136 of H-bridge 137 nonconductive. In the example shown in FIG. 3, this occurs shortly after point 222.

Since current i1=0 at time 222, no more energy is stored in winding 102 when all the MOSFETs are shut off. As a result, after the shutoff of winding 102 no energy can be fed back from it into capacitor 126.

All that is still present at winding 102 at this point in time is the voltage induced by rotor magnet 108; but this is low at time 222 (usually amounting to only a few volts) and is therefore unproblematic.

After a short switching off-time P1, current i2 is then switched on. The switch-on time is calculated by μC 40 (cf. FIG. 30).

At motor start-up it would take too long for i1 to reach a value of zero in segment 220, so here the current is shut off by a special function (called the TIMEOUT function) after a predefined time, e.g. after 500 to 800 μs, even if i1 (or i2) has not yet reached a value of zero. The time T3 elapsed after reaching point 214 at which high-side transistors 114, 130 are shut off is therefore monitored here, as is current Imin. All the transistors of H-bridge 137 are shut off no later than the point at which T3 elapses, or alternatively upon generation of the Imin interrupt, if that occurs earlier than the end of T3. T3 is typically in the range from 500 to 800 μs.

Figure 4:
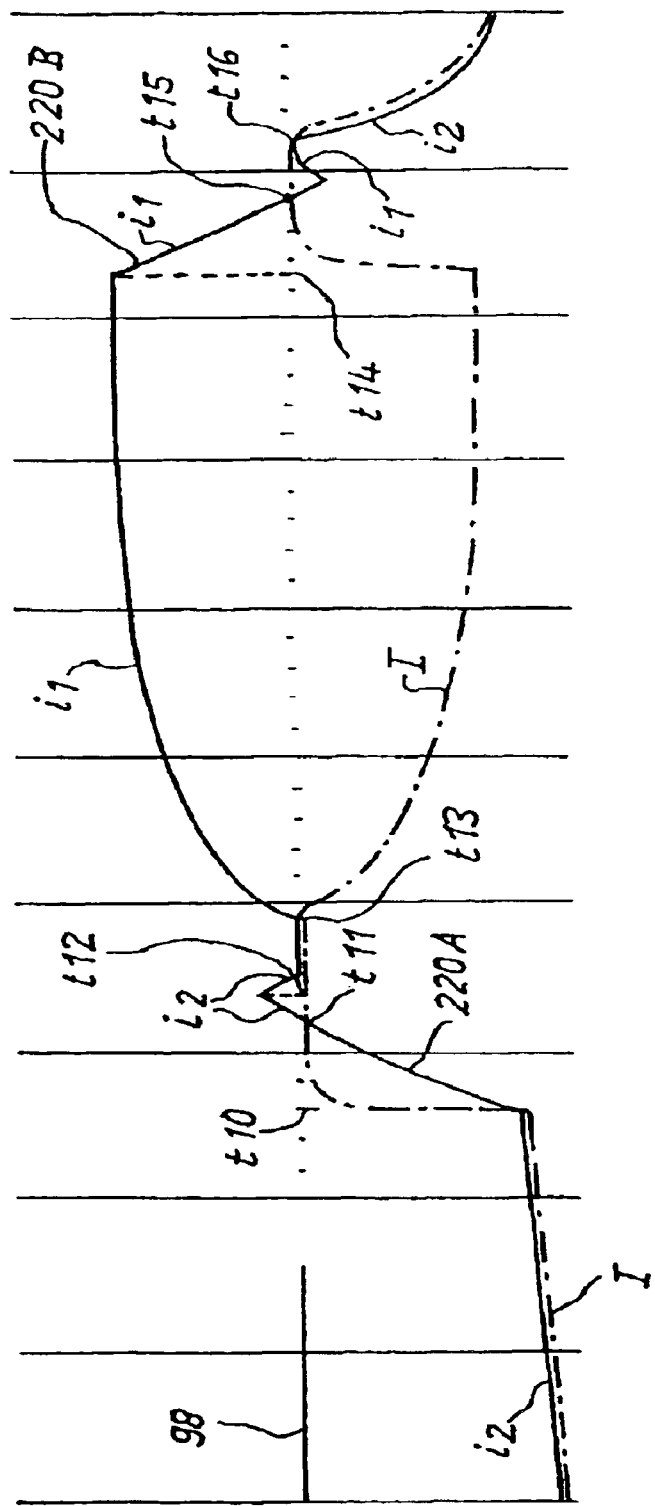
FIG. 4 is a diagram of the current as measured in the course of a commutation procedure.

FIG. 4 shows the current through winding 102 that is actually measured during operation and, for comparison, current I in supply lead 116 (FIG. 1). The current through winding 102 changes direction as rotor 108 rotates, while current I flows in only one direction. For better comparison, current I is plotted downward from a zero line 98.

Current i2 receives its shutoff command at a time t10 in this case, so that high-side transistor 130 is blocked and, after a short delay, both low-side transistors 132, 135 are switched on, causing current i2 to decay along a curve 220A.

Current i2 passes through zero at a time t11, and at a time t12 the Imin interrupt (already described) becomes effective, causing all four transistors 114, 130, 134, 136 to be blocked so that no current flows in winding 102 from a time shortly after t12 until a time t13.

At time t13 which is calculated in μC 40 (cf. FIG. 30), current i1 is switched on by making transistors 114 and 136 conductive, so that current i1 rises as depicted. At a time t14 that is calculated in μC 40, i1 is shut off by blocking high-side transistor 114 and making both low-side transistors 132, 136 conductive, so that current i1 decreases along a curve 220B and reaches a value of zero at time t15. Shortly thereafter, the Imin interrupt takes effect and blocks all four transistors 114, 130, 132, 136 until a time t16 at which transistors 130 and 132 are switched on so that current i2 can flow.

FIG. 4 shows that to the left of t10, current I in supply lead 116 is identical to current i2 in winding 102.

At time t10, current I can no longer flow out of positive line 116 because high-side transistor 130 is open and the two low-side transistors 132, 136 are conductive, so that current i2 continues to flow only through these two transistors. From t10 to t13, the value of current I therefore remains practically at zero.

From t13 until t14, the profile of I is the mirror image of i1, i.e. the two currents are identical in magnitude. From t14 to t16, I has a value of zero, and after t16 I once again has practically the same value as i2, although some additional energy may possibly be conveyed out of capacitor 126 shortly after t16.

The invention therefore largely prevents energy from shuttling back and forth between winding 102 and capacitor 126, so that the dimensions of capacitor 126 can be correspondingly smaller.

Figure 5:
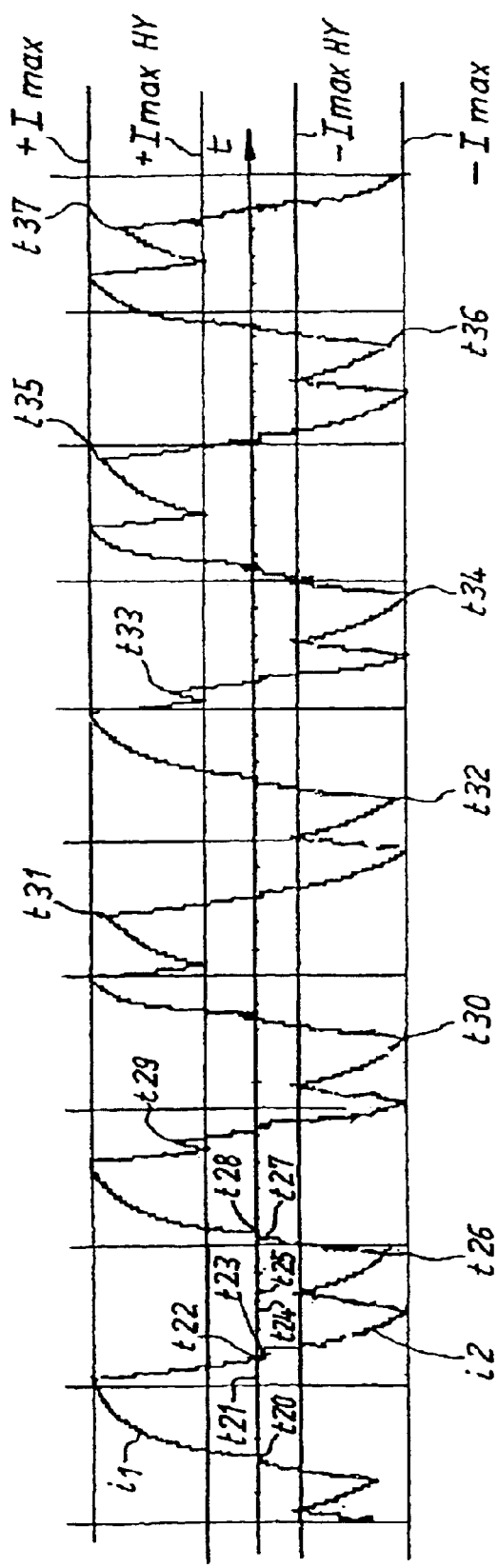
FIG. 5 is a diagram of a current profile measured when a maximum current limiter is applied.

FIG. 5 shows, on an oscillogram, a typical profile of the currents that occur when the current limiter takes effect. This limits currents i1 and i2, in this exemplary embodiment, to a value Imax=3 A.

Current i1 begins at t20. The commutation control system in μC 40 causes current i1 to be interrupted at a time t21 by the opening of transistor 114; and from t21 until a time t22, winding 102 is short-circuited because both transistors 132, 136 are conducting.

At t23 transistors 130, 132 are switched on so that a current i2 flows.
This current rises rapidly to the negative current limit value −Imax. There, at time t24, high-side transistor 130 is blocked by signal Imax, so that current i2 drops until a time t25, both transistors 132, 136 being made conductive. At t25, transistor 188 shuts off signal Imax again because i2 has dropped to 1.6 A, so that i2 once again rises because transistor 130 is once again conductive.

At a time t26 the commutation control system opens transistor 130, and both low-side transistors 132, 136 are switched on so that i2 reaches a value of zero at t27. At t28, i1 is switched on again by making transistors 114 and 136 conductive.

Each time signal Imax becomes low, pulse duty factor pwm of signal PWM is reduced slightly (cf. S508 in FIG. 17) so that after a few revolutions the values +Imax and −Imax are no longer reached and the "smooth" current profile shown in FIG. 3 is once again obtained. While the maximum current is being lowered below Imax (3 A), value BW is increased by the controller (FIG. 30), if possible, and pulse duty factor pwm is also, if applicable, slowly raised until the motor is once again running normally, i.e. at the desired rotation speed. The operation may possibly also repeat, i.e. signal Imax may occur again, if pwm is raised excessively.

In FIG. 5, the points at which the commutation control system interrupts the relevant current are labeled t29 through t37. The values at which current limiting is applied are labeled +Imax and −Imax, and the current values resulting from switching hysteresis are labeled +ImaxHY and −ImaxHY. In the exemplary embodiment, Imax=3 A and ImaxHY=1.6 A.

Figure 6:
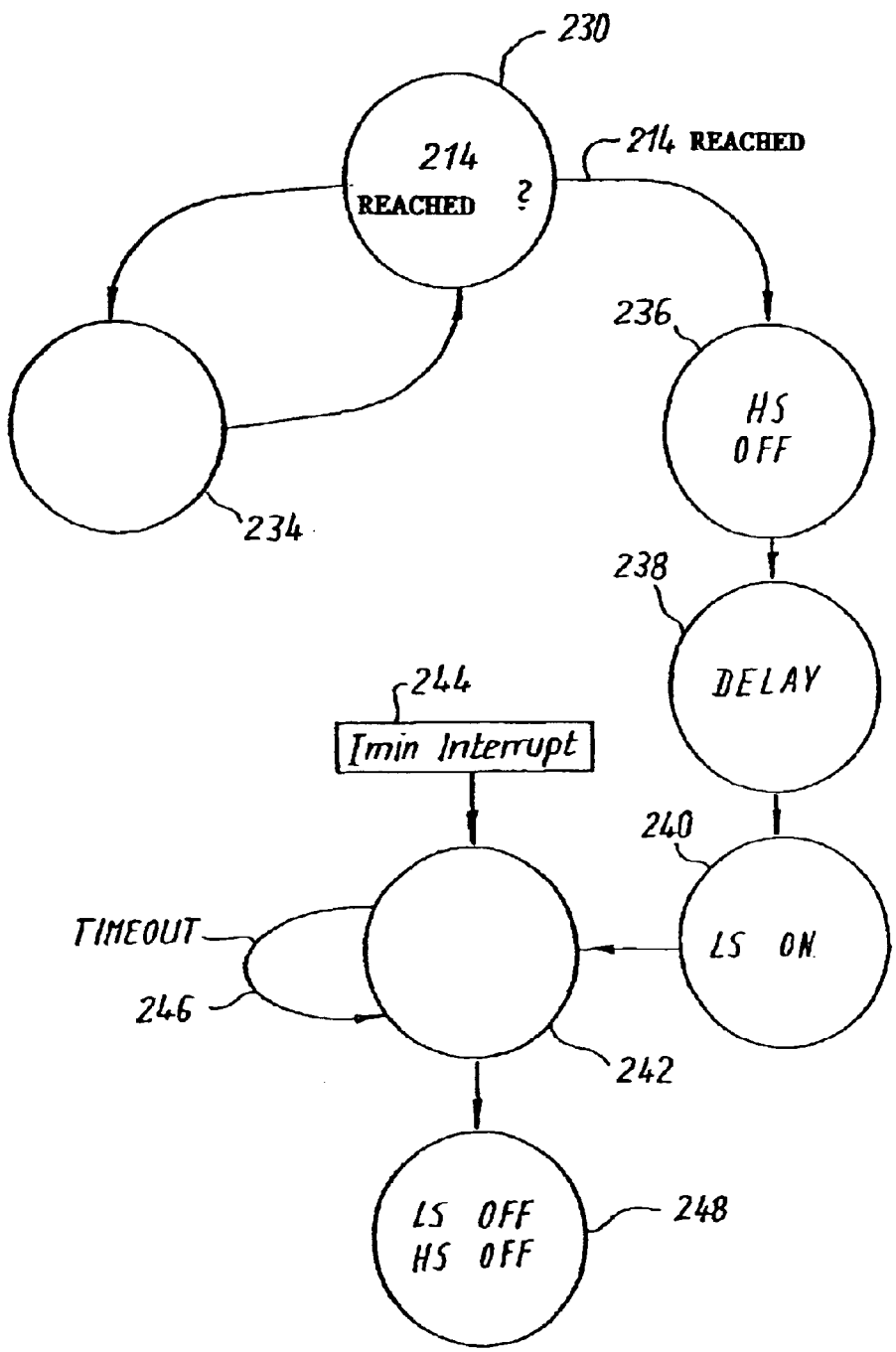
FIG. 6 is a state diagram to explain the invention.

FIG. 6 once again shows the operations just described, in graphic fashion with reference to a state diagram. At 230, motor 100 is in region 210, 211 of FIG. 3, and the system monitors whether point 214, at which energy delivery from lines 116, 122 to motor 100 needs to be terminated, has been reached, If it is determined at 230 that the end of current flow has not yet been reached, current flow is then continued in state 234, and monitoring then continues at 230 to determine whether time 214 has been reached. If so, motor 100 then enters state 236 HS OFF, in which both high-side transistors 114, 130 are shut off, interrupting energy delivery to motor 100.

The program then enters a short DELAY 238 and then, in state LS ON 240, switches on both low-side transistors 132, 136 so that winding 102 is essentially operated in short circuit and the current decays along curve 220 (FIG. 3). This is monitored in the next state 242 ("Wait until current has dropped to zero"), while the current in winding 102 continues to drive rotor 108.

When the current reaches a value of zero, comparator 202 generates a signal Imin and causes an Imin interrupt 244.

Simultaneously, at 246 the TIMEOUT function monitors whether the predefined time T3 (FIG. 3) has elapsed.

The earlier of the two events (TIMEOUT 246 or Imin interrupt 244) causes the transition to state 248, i.e. complete shutoff of all four transistors of H-bridge 137 (LS OFF & HS OFF). In this state, the kinetic energy of rotor 108 cannot be transported in generator mode into capacitor 126, since the instantaneous value of the voltage produced in generator mode by rotor 108 is lower than the voltage between lines 116 and 122.

The "breathing" of motor 100 described initially is therefore largely suppressed here by skillful energy management, i.e. during normal operation of motor 100, very little reactive power flows back and forth between winding 102 and capacitor 126. Because of the duration of the requisite calculation steps, however, Imin interrupt 244 cannot be generated exactly at the zero transition time 222 (FIG. 3) but instead only slightly thereafter, and therefore a capacitor 126 is still necessary for temporary storage of energy from the motor, although it can be smaller than before. This capacitor is also needed in order to absorb energy when the motor is shut off, and to prevent an excessive rise in the voltage between lines 116 and 122.

Maximum Current Detection Function

Maximum current detection by means of comparators 172 and 198 has already been described in FIGS. 1, 3, 4, and 5. This function generates signal Imax, which acts via logic elements 152, 160 (FIG. 1) directly on high-side transistors 114, 130 and, in the event of overcurrent, immediately shuts off transistor 114 or 130 that is conductive at that moment. In addition, signal Imax is also conveyed to μC 40 and generates an Imax interrupt there. The result of this, inter alia, is to initiate program steps that, in the context of subsequent current pulses, lower the current through winding 102 sufficiently that overcurrent no longer recurs.

Specifically, if the current through measuring resistors 134, 138 exceeds a value set at resistor 176 (referred to in FIG. 1 as Uref), an Imax interrupt is therefore generated in μC 40 and high-side transistors 114, 130 are shut off directly by hardware. After a short delay has elapsed, both low-side transistors 132, 136 are switched on so that terminals 104, 106 of winding 102 are short-circuited through the two FETs 132, 136. The next program steps depend essentially on the type of motor and its rotation speed, i.e. several variants are possible.

In one variant, when the current in winding 102 reaches a value of zero, Imin interrupt 244 is generated in the manner already described. For safety's sake, the time since LS ON 240 (FIG. 6) is additionally measured by means of TIMEOUT function 246 (already described).

If the TIMEOUT time expires before Imin interrupt 244 is generated, this causes an OFF command for both low-side transistors 132, 136. If the Imin interrupt occurs first, it causes the LS OFF signal. After a delay, current flow through winding 102 is then continued; i.e. if, in the instantaneous rotational position of rotor 108, the current in winding 102 should be flowing from 104 to 106, transistors 114, 136 are switched back on and transistors 130, 132 remain shut off. For a current in the opposite direction (from 106 to 104), the converse applies accordingly.

Figure 7:
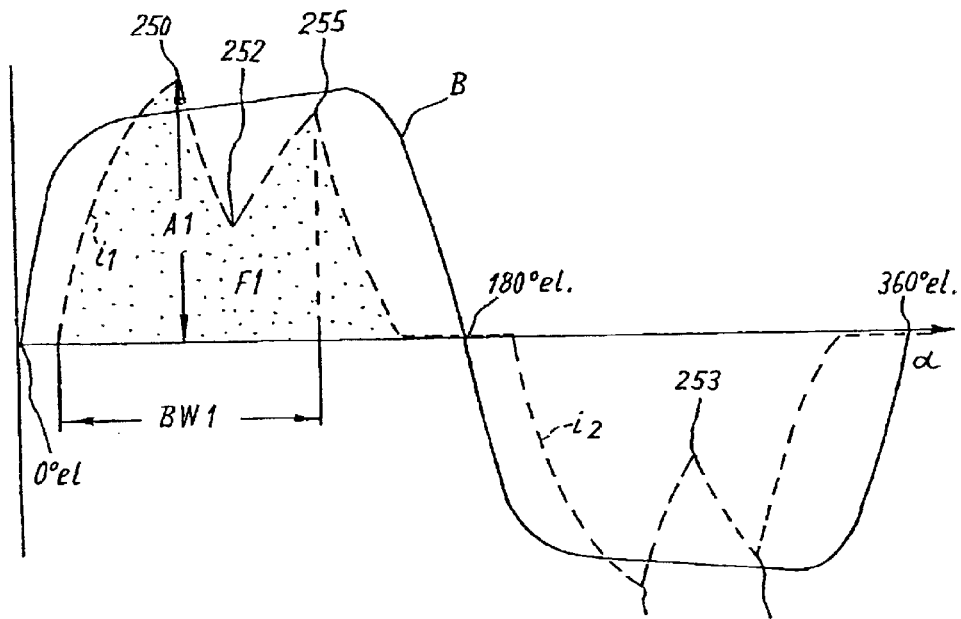
FIG. 7 depicts the change in magnetic flux density in the rotor over a range of 360° el., and a motor current profile in which the current limiter is applied.

FIG. 7 schematically shows current pulses i1, i2 whose amplitude A1 reaches that of current Imax (3 A) at points 250, 251, so that at these points the current limiter takes effect and the current drops until a point 252 or 253 is reached. There the current is switched back on because the (low-active) signal Imax is no longer being generated, and the current rises again until points 255 or 257, where the shutoff command is issued by μC 40. At both points 250 and 251, pulse duty factor pwm is reduced by program step S508 of FIG. 17 in order to reduce amplitude A1.

Figure 8:
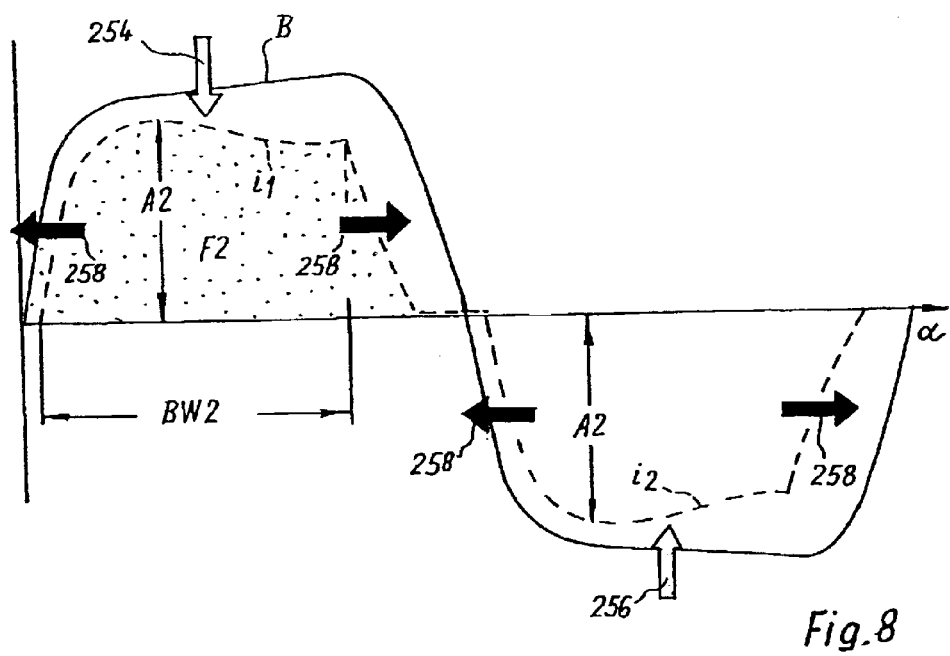
FIG. 8 is a depiction similar to FIG. 7, showing, in highly schematic fashion, the consequences of the application of current limitation because an adaptive controller, associated with the motor and correspondingly increasing the length BW of the current blocks, becomes effective.

As shown in FIG. 8, the result of this reduction of pulse duty factor pwm is that, after a time delay, amplitude A2 of the current in motor 100 is reduced to a value that is less than 3 A, as symbolized by white arrows 254, 256 of FIG. 8. In FIG. 7, the block length of a pulse—namely the time from the switch-on command to the switch-off command—has the value BW1.

As compensation for the reduction in amplitude from A1 to A2, in FIG. 8 the block length BW for controlling pulses i1, i2 is extended to a value BW2, as symbolically indicated by black arrows 258, so that there is no change in the energy delivered to motor 100, i.e. area F1 under curve i1 of FIG. 7 corresponds substantially to area F2 under curve i1 of FIG. 8. To explain this in illustrative terms, in FIG. 8 a force 254, 256 slightly widens the width of pulses i1, i2 so that amplitude A1 is no longer reached, the lower amplitude A2 of currents i1, i2 being compensated for in FIG. 8 by increasing their block length BW2.

This is important because losses resulting from the processes described in FIG. 5 increase when the maximum current is exceeded, and there is a risk of overloading the MOSFETs. Motor 100 also runs more quietly when it is operated at a current below its preset maximum current. Of course block length BW attained by pulses i1 and i2 must always be slightly less than 180° el., since otherwise a bridge short circuit might occur.

If block length BW of pulses i1, i2 becomes too long, it is shortened by the motor's software; and as compensation in such a case, the amplitude is increased, i.e. the motor then tends to go from the state shown in FIG. 8 to the state shown in FIG. 7. In such a case the direction of arrows 254, 256, 258 is reversed.

At startup, the startup current may optionally be limited by the current limiter, but it is also possible to start up without overcurrent by slowly increasing pulse duty factor pwm of signal PWM (FIG. 1) in ramped fashion.

In order to implement the invention, the motor's software calculates:

a) the pulse duty factor pwm that signal PWM should have at each moment;

b) the time at which a current pulse must be switched on; and c) the time at which a current pulse must be shut off.

This is explained below.

In the exemplary embodiment, block length BW is calculated by a rotation speed controller that is described below in FIG. 30. BW is thus predefined for calculation purposes, and is independent of pulse duty factor pwm of signal PWM. (The pulse duty factor can, of course, also be completely or partially taken into consideration in calculating BW, but omitting such consideration makes the program shorter, which is important in a motor.)

Figure 9:
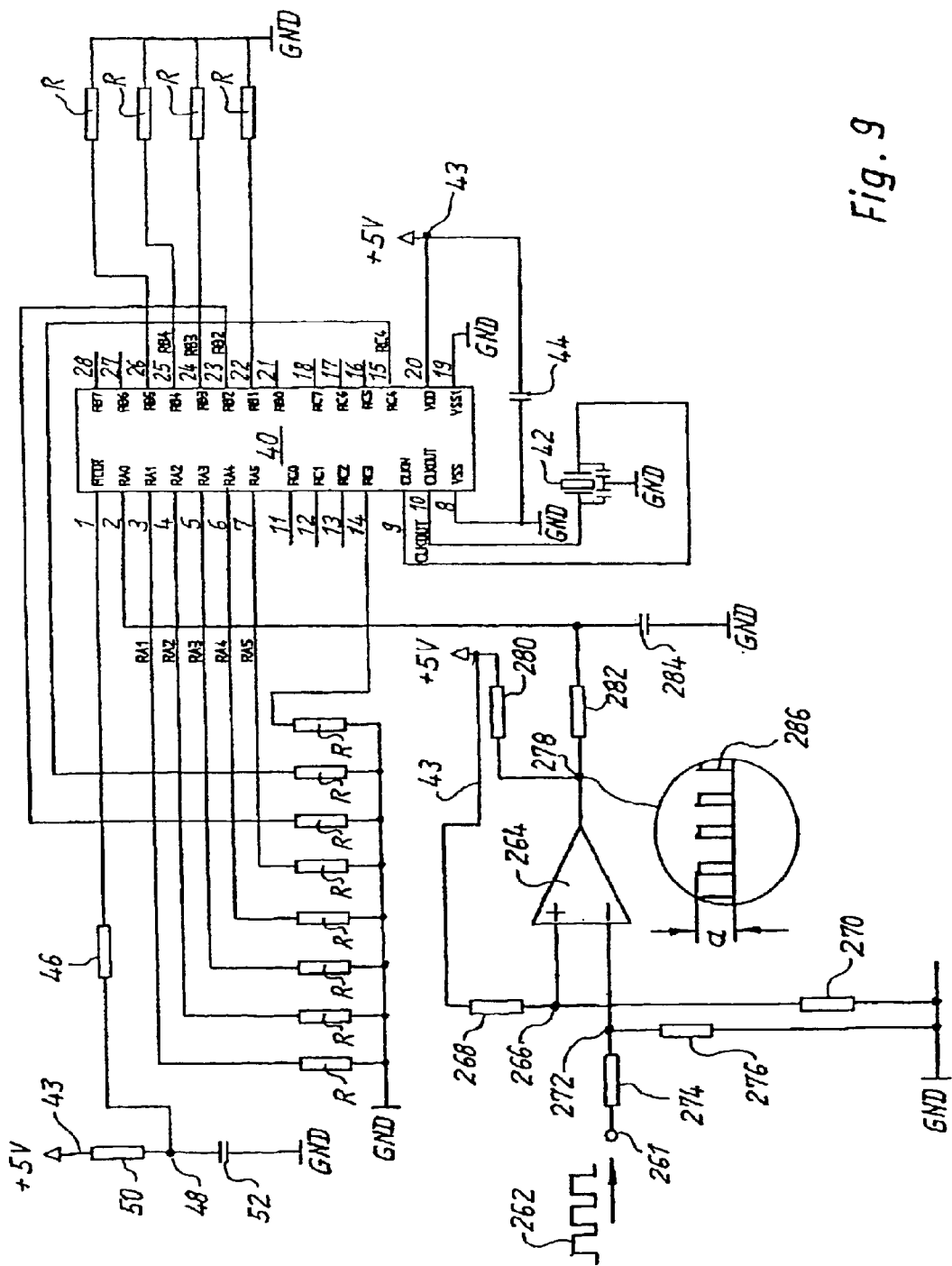
FIG. 9 shows a specific exemplary embodiment comprising an Arizona Microchip microcontroller; this Figure shows a portion of the microcontroller's circuit, and that portion is not repeated in FIG. 10 below.

FIG. 9 shows a portion of the circuitry of microcontroller (μC) 40 used in the exemplary embodiment, in this case a PIC16C72A of Arizona Microchip. This operates here at a clock frequency of 4 MHz. It has 28 inputs 1 through 28, designated as follows:

1 MCLR/ (reset input)
2 through 7 RA0–RA5
8 VSS (ground terminal)
9 CLKIN
10 CLKOUT
11 through 18 RC0–RC7
19 VSS1 (ground terminal)
20 VDD (+5 V)
21 through 28 RB0–RB7

Terminals RA1 through RA5, RC3, RC4, and RB1 through RB5 are each connected via a resistor R (10 kilohm) to ground GND, since these terminals are not used. These resistors are not depicted in FIG. 10 to enhance the clarity of that depiction.

Terminals CLKIN and CLKOUT are connected to a quartz oscillator 42. Terminals VSS and VSS1 are connected to ground, and terminal VDD to a positive line at +5 V (regulated). A filter capacitor 44 (e.g. 100 nF) is present between terminals VDD and VSS.

Reset input MCLR/ is connected via a resistor 46 to a node 48 that is connected via a resistor 50 to +5 V and via a capacitor 52 to GND. Capacitor 52 is discharged upon startup, so that input MCLR/ then has a potential of 0 V, triggering a reset operation at startup. Capacitor 52 then charges through resistor 50 to 5 V.

RA0 is the input of an A/D converter internal to μC 40. A voltage between 0 and 4.5 V (Vcc) can be conveyed to this input, and is converted into a digital signal. The signal at RA0 corresponds to the desired rotation speed. It is conveyed to an input 261 as PWM signal 262, whose pulse duty factor pwm contains the rotation speed information.

A comparator 264 serves to process PWM signal 262 and standardize it to a regulated amplitude a. Its positive input is connected to a node 266 that is connected via a resistor 268 to a regulated +5 V voltage which is also supplied to μC 40, and via a resistor 270 to GND. Resistors 268, 270 are selected so that a potential of +2.3 V is present at node 266.

The negative input of amplifier 264 is connected to a node 272 that is connected via a resistor 274 to input 261 and via a resistor 276 to GND. Resistors 274, 276 can be of identical size.

Output 278 of amplifier 264 is connected via a pull-up resistor 280 to +5 V and via a resistor 282 to RA0. A capacitor 284 is present between RA0 and GND. Components 282 and 284 together constitute a lowpass filter.

Signal 262 is inverted by amplifier 264 to yield signal 286 at output 278, which has a constant amplitude a, and that signal 286 is smoothed by lowpass filter 282, 284 to produce a DC voltage which is conveyed to input RA0 and converted there, at each request, into a digital value. Since signal 286, unlike signal 262, has a defined amplitude a, its pulse duty factor is converted into a defined DC voltage and into a defined digital value.

Alternatively, the signal at input RA0 can be generated in any other manner, e.g. by means of a potentiometer. In this processor, the maximum amplitude at RA0 corresponds to 5 V. This corresponds to the internal A/D reference.

μC 40 has a ring counter TIMER1 as well as a RAM and a ROM. An external RAM, EEPROM, or the like can additionally be provided, as is self-evident to one skilled in the art.

Figure 10:
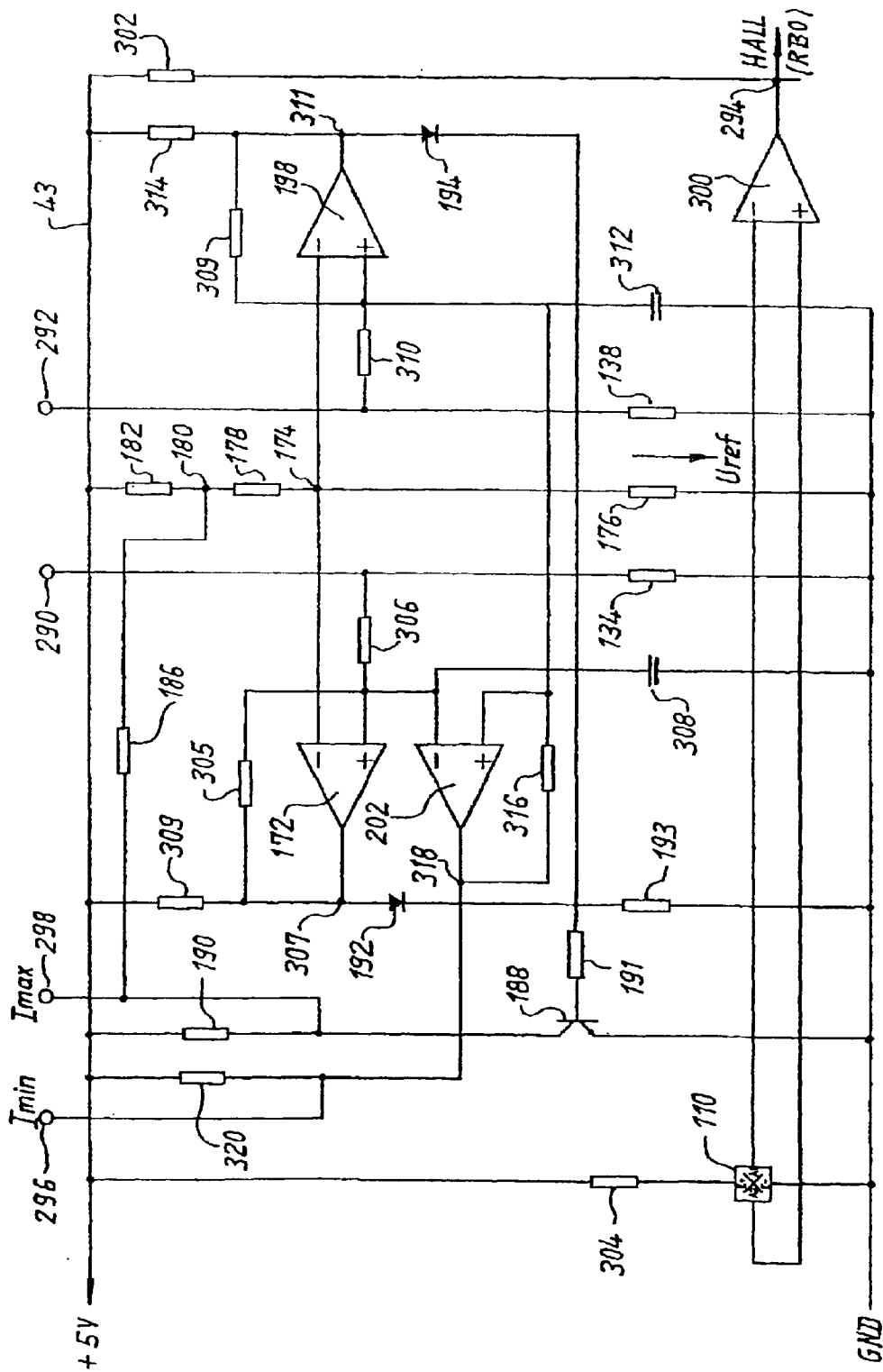
FIG. 10 is a detailed circuit diagram of the hardware for generating signals Imin and Imax.
Figure 11:
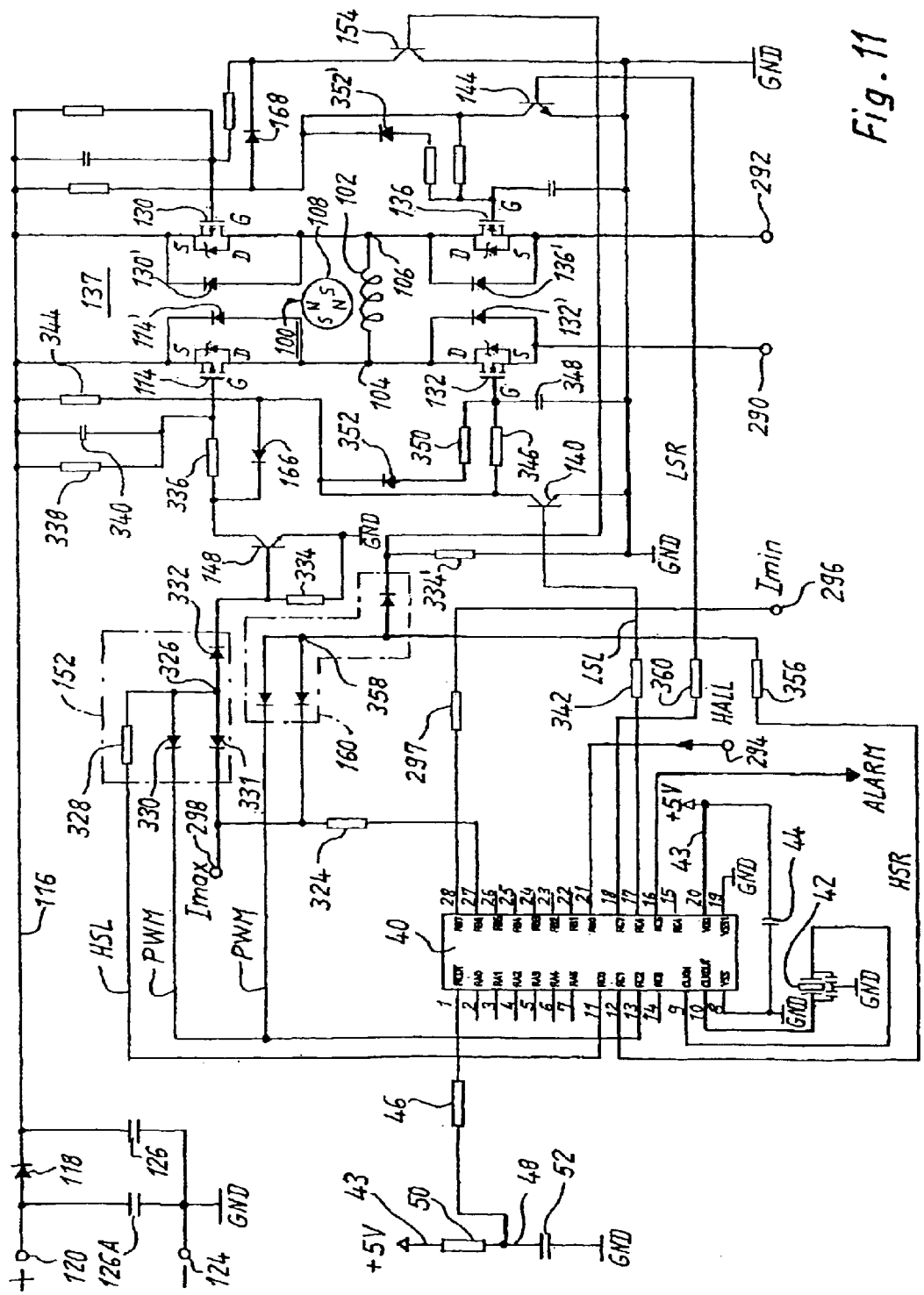
FIG. 11 is a detailed circuit diagram of the hardware for controlling H-bridge 137.

FIGS. 10 and 11 show a detailed exemplary embodiment of the circuit in FIG. 1. FIG. 10 shows the hardware for detecting Imax and Imin, as well as Hall generator 110. FIG. 11 shows μC 40 and H-bridge 137 that it controls. Parts identical to, or having the same function as, parts in the previous Figures are labeled with the same reference characters as therein, and usually are not described again.

The transitions from FIG. 10 to FIG. 11 are labeled 290, 292 (for H-bridge 137), 294 for signal HALL, 296 for signal Imin, and 298 for signal Imax. These are also shown in FIG. 1.

FIG. 10 shows Hall generator 110, whose output signal is amplified by means of a comparator 300 whose output 294 is connected via a pull-up resistor 302 to positive line 43 (+5 V, regulated). The square-wave HALL signals are conveyed to input RB0 of μC 40, where each edge of this signal causes a Hall interrupt (cf. FIG. 16). Hall generator 110 is supplied with current from line 43 through a resistor 304.

The positive input of comparator 172 is connected via a resistor 305 to its output 307, via a resistor 306 to node 290 and additionally to the negative input of comparator 202, and via a capacitor 308 to GND. Resistor 306 and capacitor 308 together constitute lowpass filter 170 of FIG. 1. Output 307 is connected via a resistor 309 to positive line 43.

Similarly, the positive input of comparator 198 is connected via a resistor 309 to its output 311, via a resistor 310 to node 292 and to the positive input of comparator 202, and via a capacitor 312 to GND. Resistor 310 and capacitor 312 together constitute lowpass filter 196 of FIG. 1. Output 311 is connected via a resistor 314 to positive line 43.

The negative inputs of comparators 172, 198 are connected to node 174, at which reference potential Uref is present at resistor 176.

The positive input of comparator 202 is connected via a resistor 316 to its output 318, which is connected via a resistor 320 to positive line 43.

Signal Imin is obtained at output 318 of comparator 202. It is conveyed through a resistor 297 to port RB7 of μC 40. Output 318 changes its potential at the zero transition of the motor current, as already described, and the switching edge at the transition causes an Imin interrupt in μC 40 (cf. FIG. 19 below).

When, as a result of a stator current of e.g. 3 A, the voltage drop at resistor 134 becomes greater than voltage Uref at resistor 176, the output of comparator 172 becomes high-resistance and acquires a high potential. As a result, a base current flows through resistor 309 and diode 192 to transistor 188 and makes the latter conductive, so that signal Imax at node 298 becomes low and thereby reduces the potential at nodes 180 and 174. This implements the switching hysteresis already described, i.e. voltage Uref becomes correspondingly lower so that signal Imax becomes high again only when the current in resistor 134 has dropped to, for example, 1.6 A. The cathodes of diodes 192, 194 are connected via a common resistor 193 to GND.

Because of the symmetry of the arrangement, the same applies when the stator current through resistor 138 exceeds a value of 3 A. In this case as well, transistor 188 becomes conductive, implements the aforementioned switching hysteresis, and generates a low signal Imax at terminal 298 which does not become high again until that current has dropped to, for example, 1.6 A.

As shown in FIG. 11, signal Imax is conveyed directly to logic elements 152 and 160, and by way of them blocks high-side MOSFETs 114, 130. It is also conveyed, via a resistor 324, to input RB6 of μC 40. As a result, both signals HSL and HSR are switched to low, so that one of the high-side transistors 114, 130 can switch back on only when
a) signal Imax has once again become high; and
b) the associated signal HSL or HSR has also once again become high.

The results of this are as follows:
Upon generation of signal Imax, e.g. at a current of 3 A, high-side transistors 114, 130 are blocked directly by the hardware and, shortly thereafter, additionally by μC 40.

After signal Imax has ended, μC 40 can retain control over highside transistors 114, 130 and, for example, continue to block them if time BW (FIGS. 7 and 8) has elapsed.

FIG. 11 shows that logic element 152 has a node 326 that is connected via a resistor 328 to port RC0 of μC 40 and receives from there signal HSL for commutation. Also connected to node 326 are the anodes of three diodes 330, 331, 332. The cathode of diode 330 is connected to port RC2, at which a PWM signal PWM (20 kHZ), whose pulse duty factor pwm is modifiable by means of software commands, is continuously generated. The cathode of diode 331 is connected to node 298, to which signal Imax is conveyed. The cathode of diode 332 is connected to the base of npn transistor 148 and via a resistor 334 to GND. The emitter of transistor 148 is connected to GND, and its collector is connected via a resistor 336 to gate G of MOSFET 114. The latter is connected via resistor 338 and a capacitor 340 parallel thereto to line 116, i.e. to the operating voltage of motor 100, which is also referred to as the DC link voltage.

As long as diodes 330, 331 are not conductive, and a high signal HSL is being conveyed from port RC0, node 326 has a high potential and diode 332 is conductive and conveys a base current to transistor 148 so that the latter is conductive and a current flows through resistors 338, 336, thus generating at gate G of transistor 114 a signal that is a few volts more negative than the signal at its source S, so that transistor 114 is completely switched on. Capacitor 340 causes a slight delay in the switching operations and prevents oscillations.

The cathode of interlock diode 166 also receives GND potential, so that gate G of MOSFET 132 cannot have any positive potential conveyed to it in order to switch it on; in other words, transistors 114, 132 are interlocked with respect to one another.

When the potential of node 326 becomes low, for example because one of diodes 330, 331 becomes conductive or is receiving a low signal HSL from port RC0, diode 332 is blocked so that transistor 148 no longer receives base current and is also blocked. As a result, gate G of MOSFET 114 receives, through resistor 338, the potential of positive line 116, so that MOSFET 114 is blocked. The cathode of interlock diode 166 thereby receives a high potential, so that low-side MOSFET 132 can now be switched on.

Signal LSL is conveyed from port RC6 via a resistor 342 to the base of npn transistor 140. As long as this signal is high, or the cathode of interlock diode 166 is at a low potential, a low potential is present at the collector of transistor 140 and is conveyed via a resistor 346 to the gate of MOSFET 132 and blocks it. This gate is connected via a capacitor 348 to GND in order to delay the switching operations slightly.

When signal LSL at port RC6 is low, transistor 140 is blocked. If the potential at the cathode of diode 166 is high, a high potential is now obtained via resistor 344 at the collector of transistor 140, and this, via resistor 346, makes MOSFET 132 conductive. The gate of MOSFET 132 is connected via a resistor 350 and a diode 352 to the anode of diode 166, and when the latter's cathode is at GND, a positive potential at the gate of MOSFET 132 is immediately discharged through resistor 350, diode 352, and diode 166 to GND, so that MOSFET 132 becomes blocked. Since resistor 350 is preferably smaller than resistor 346, the ratio between charging time constant and discharging time constant can be varied. These constants are also a function of the gate capacitance and other capacitances in the circuit.

The right half of the circuit shown in FIG. 11 is entirely symmetrical in configuration to the left half, and is therefore not described separately because the person skilled in the art will immediately understand, from the detailed description of the left half, how the right half works. For example, diode 352 on the left half has a corresponding diode 352' on the right half. The right-hand interlock diode 168 has the same operating principle as interlock diode 166 on the left side, and prevents MOSFETs 130 and 136 from being conductive simultaneously.

Signal HSR is conveyed from port RC1 via a resistor 356 to a node 358 in logic element 160, and signal LSR is conveyed from port RC7 through a resistor 360 to the base of npn transistor 144. An ALARM signal can be generated at port RC5 if motor 100 jams, i.e. is prevented from rotating.

Interlock diodes 166, 168 serve principally to protect against uncontrollable switching states resulting from EMC-related current spikes. The switching operations (switching on and shutting off the MOSFETs) always take a certain amount of time, since gate G of the transistor in question must be charged or discharged, so that perfect protection is not possible; but this simple feature relieves a great deal of stress on the transistors in H-bridge 137 if such spikes should occur.

Preferred Values of Components in FIGS. 10 AND 11

| | |
|---|---|
| Quartz oscillator 42 | 4 MHz |
| Capacitor 44 | 100 nF |
| Resistor 46 | 100 ohm |
| Resistors 50, 176, 302, 306, 310, 314, 320 | 10 kilohm |
| Capacitors 52, 308, 312, 340 | 1 nF |
| Hall generator 110 | HW101G |
| Op amplifiers 172, 198, 202, 300 | LM2901P |
| Resistors 134, 138 | 0.15 ohm |
| Resistor 178 | 75 kilohm |
| Resistor 182 | 33 kilohm |
| Resistor 186 | 15 kilohm |
| Transistor 188 | BC846B |
| Resistor 190 | 22 kilohm |
| Resistor 191 | 0.1 kilohm |
| Resistors 193, 309, 316 | 1 Megohm |
| Diodes 192, 194 | BAV70 |
| Resistor 280 | 3.3 kilohm |
| Resistor 282 | 6.8 kilohm |
| Capacitor 284 | 220 nF |
| Resistor 297 | 2 kilohm |
| Resistor 304 | 1.2 kilohm |
| MOSFETs 114, 130, 132, 136 | 1RF7379 |
| (Component IRF 7379 contains one p-channel MOSFET and one n-channel MOSFET in the same housing.) | |
| Resistors 328, 338 | 2.2 kilohm |
| Diodes 330, 331, 332 | BAW56S |
| Resistors 334, 334', 344 | 5.1 kilohm |
| Transistors 140, 144, 148, 154 | BC847BS |
| Resistor 336 | 1.1 kilohm |
| Diodes 166, 168, 352, 352' | BAS316 |
| Diodes 114', 118, 130', 132', 136' | SMS2100 |
| Resistor 350 | 100 ohm |
| Resistor 346 | 330 ohm |
| Capacitor 348 | 4.7 nF |
| Resistors 342, 360 | 2.7 kilohm |
| Capacitor 126 | 100 pF, 35 V |
| Capacitor 126A | 100 nF |
| Resistor 356 | 0.8 ohm |

These are, of course, only examples that refer here to a motor 100 which is operated on a 12-volt battery.

Software of Motor 100

Figure 12:
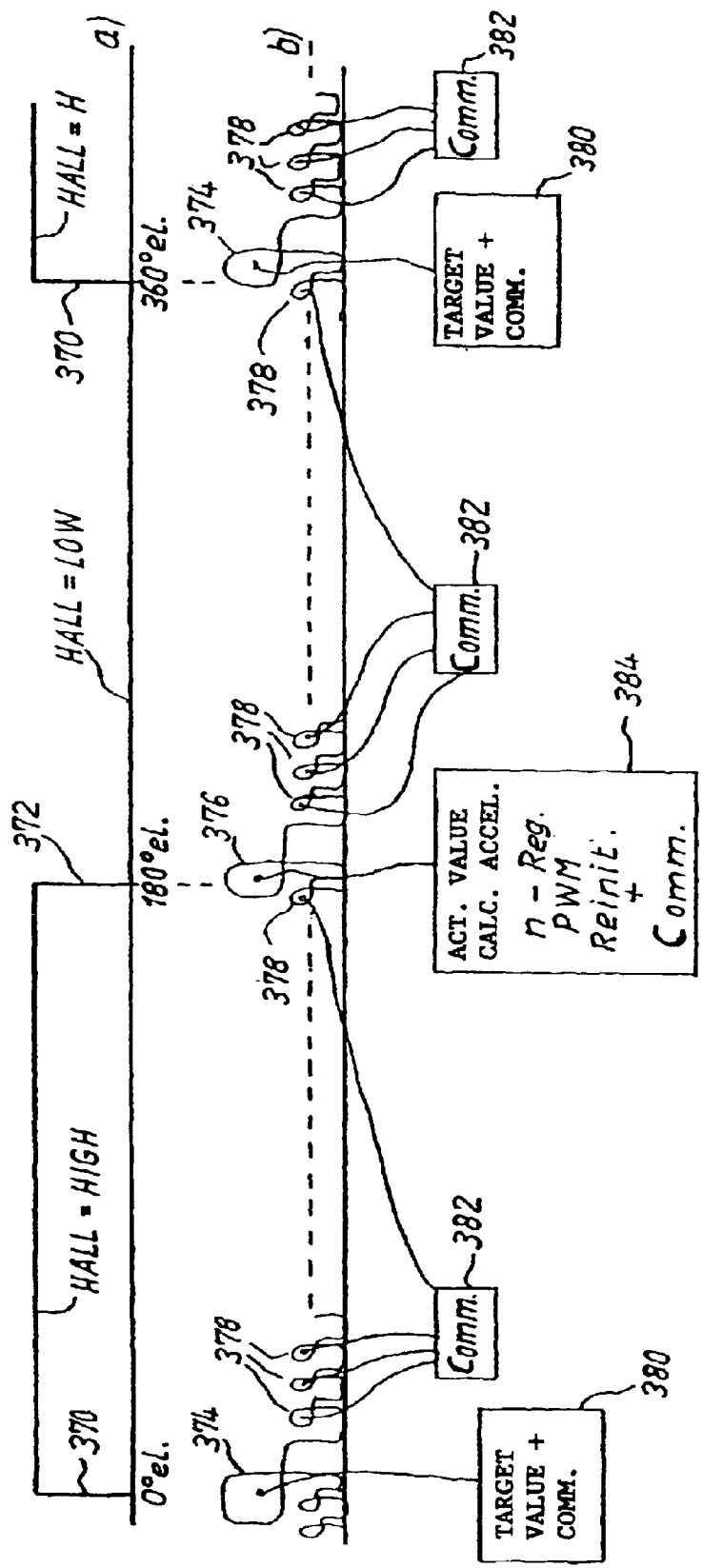
FIG. 12 is an overview diagram explaining the basic structure of the software that is used.

FIG. 12 explains, in an overview diagram, the execution of the program steps in motor 100 as a function of the rotational position of rotor 108. An electric motor that is controlled by a μC 40 can have a large number of additional functions depending on its application, for example rotation speed regulation, rotation speed limitation, current limitation, regulation to constant current, arrangements for outputting alarm signals, error handling routines, etc.

In the present exemplary embodiment, the rotation speed of the motor is regulated to a target value (e.g. 3000 rpm) that in turn can be dependent, for example, on the ambient temperature. This target value for the control program must therefore be frequently and automatically updated.

For a rotation speed control function, it is also necessary to know the instantaneous rotation speed of the motor, e.g. 2990 rpm. This actual value of the rotation speed also must be frequently and automatically updated.

It may also be necessary in such a motor to calculate acceleration; a PWM signal for the motor current must also be outputted, the calculation operations of the rotation speed control function must be performed (repeatedly), and it may be necessary to reinitialize certain parameters from time to time in order to ensure stable motor operation.

In addition, μC 40 must, in accordance with the calculations of the rotation speed controller, switch the current to the motor on and off, and also switch over the direction of the motor current as a function of the instantaneous rotational position. All these operations are referred to in electrical engineering as "commutation." This should be performed with great precision, since a motor runs smoothly only if the commutations commands are executed very accurately. This means that the program must check very frequently whether a commutation program command is pending and requires execution.

As shown in FIG. 12, directly after an edge 370, 372 of signal HALL there is therefore a large calculation loop 374, 376 in which longer calculation procedures are performed depending on the value of counter HALL_CNT, followed by many short calculation loops 378 in which commutation is merely checked and, if applicable, controlled. Since these short loops 378 occur in quick succession, they result in high resolution; in other words, and as an example, every 60 to 100 μs a check is made to determine whether any changes in commutation need to be made.

FIG. 12 shows, for example, that directly after an edge 370 of signal HALL a long loop 374 is executed in which, as described in legend 380, the target value for regulating the rotation speed is calculated and commutation is also checked.

Large loop 374 is followed by many short loops 378 in which, as shown in legend 382, commutation is simply checked and modified as applicable.

In this example, an edge 372 of signal HALL is followed by a long loop 376 in which, as described in legend 384, the following calculation steps are performed:

Actual value calculation

Calculation of acceleration

Rotation speed regulation

Calculation of pulse duty factor pwm of signal PWM

Reinitialization of certain registers

Commutation.

This long loop 376 is once again followed by short loops 378 for monitoring and controlling commutation.

At the next edge of signal HALL, a long loop 374 of the kind already described then follows, i.e. in this exemplary embodiment, the operations repeat every 360° el.

Figure 13:
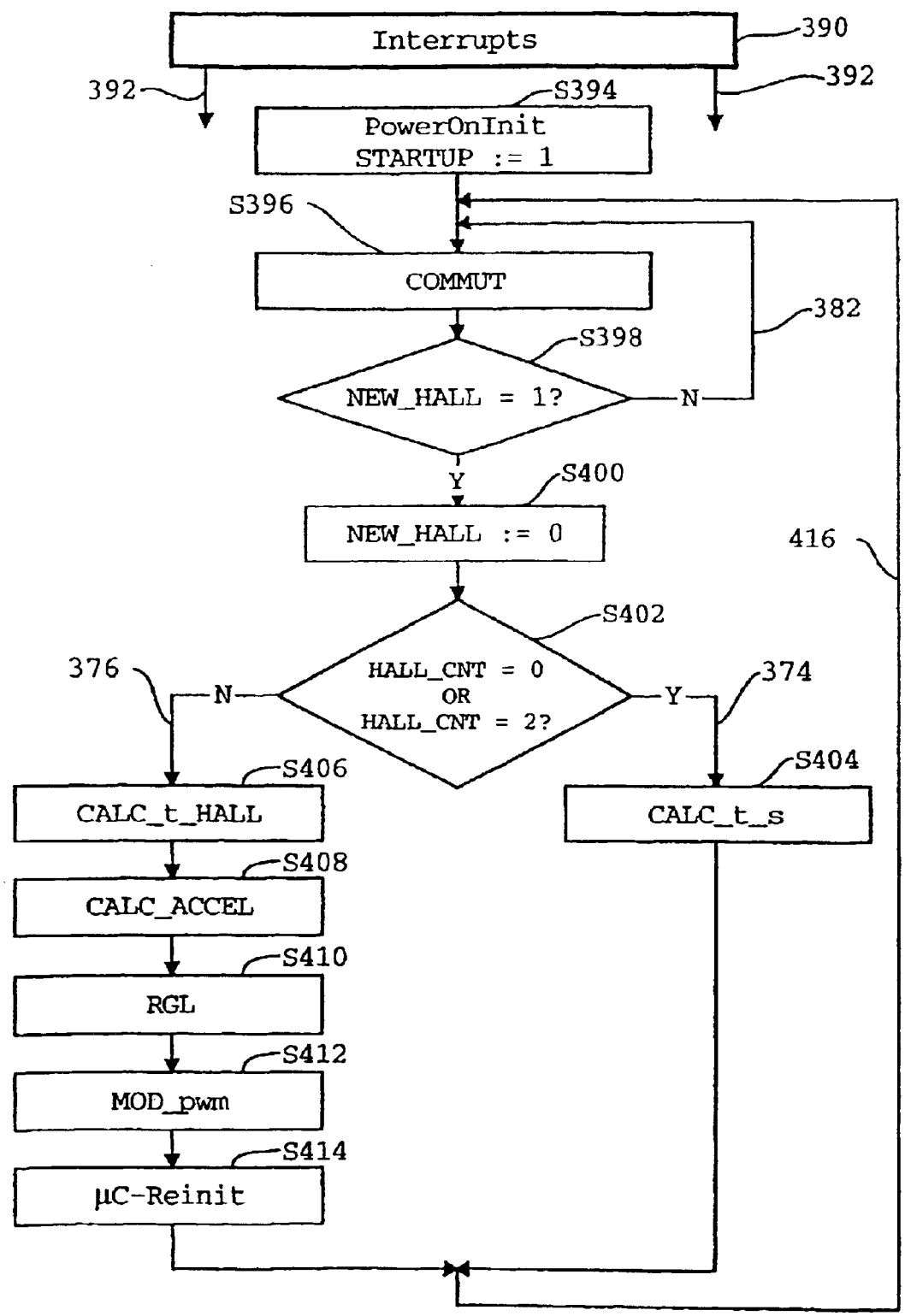
FIG. 13 is a flow chart indicating the basic execution of the program in motor 100.

FIG. 13 shows the relevant flow chart, illustrating in a rough overview the general execution of the loops just described.

Depicted at the very top of FIG. 13 (at 390) are the interrupts, which will be described in more detail below in FIGS. 14 through 20 and which interrupt normal program execution when they occur; this is symbolized by arrows 392.

When motor 100 is switched on, an initialization of μC 40 takes place in step S394 in the usual way. Here, in particular, a STARTUP flag is set to 1 to indicate that the program steps for accelerating motor 100 must be executed first. These steps differ from the program steps that are executed in the motor's nominal rotation speed range.

This is followed, in S396, by commutation control, which is explained in more detail in FIGS. 23 through 26. This control function is highly time-critical and is therefore placed at the beginning of the flow chart in a short loop 382.

S398 then checks whether the NEW_HALL flag indicates that a large loop 374 or 376 has already been cycled through since the last edge of signal HALL.

If this flag still has a value of 1, the program goes to S400 where it sets the flag to 0. It then checks (in S402) whether HALL_CNT is equal to either 0 or 2. (The HALL_CNT variable is generated in FIG. 16 in S454. This variable corresponds to specific rotor positions that are defined arbitrarily when the motor is switched on, e.g. 0° el. and 360° el., or 180° el. and 540° el.). If Yes, the program goes into long loop 374 and, at S404 performs the calculation of target value t_s which, in this exemplary embodiment, is calculated from the analog signal at input RA0 (cf. FIG. 9).

If the response in S402 is No, the program goes into long loop 376 and therein to steps S406 and S408, where actual value t_HALL and the acceleration (FIG. 29) are calculated. The procedure for sensing the actual value is as follows:

Below 2000 rpm, time t_HALL is measured between two adjacent edges 370, 372 or 372 and 370 of signal HALL, i.e. the time to rotate through 180° el.

Above 2000 rpm, the time is measured between a first and a fourth edge of signal HALL, which in the case of the four-pole rotor 108 used here corresponds to one complete revolution of 360° mech.=720° el. In other words, the time for one complete revolution is measured, and is divided by four to obtain t_HALL.

These operations are explained in more detail with reference to FIGS. 27 and 28.

S408 is followed by S410, where the calculation operations of rotation speed controller RGL (explained in more detail in FIG. 30) are performed.

Figure 31:
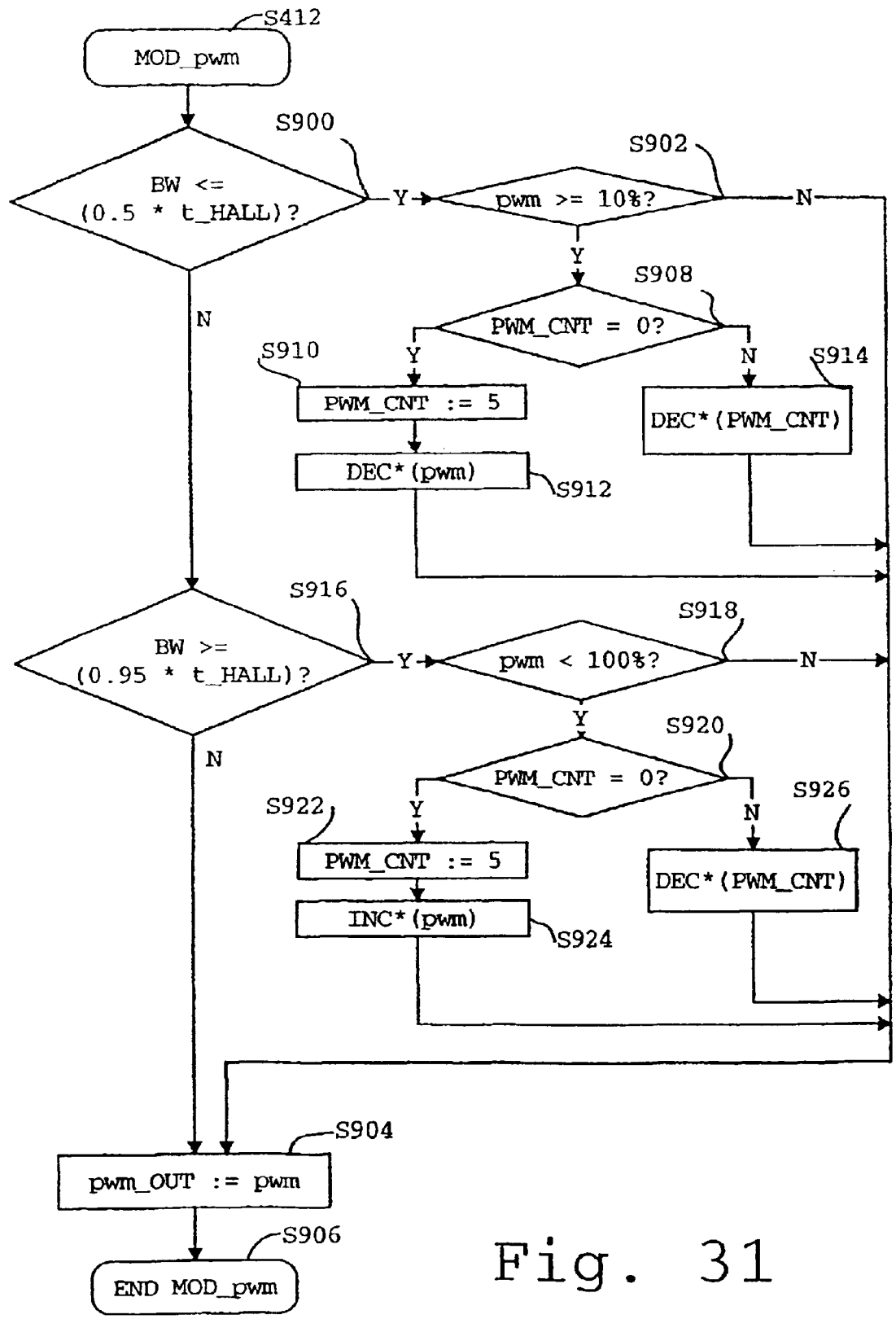
FIG. 31 shows a routine for adaptive modification of pulse duty factor pwm as a function of operating conditions of the motor.

In S412 that follows, pulse duty factor pwm of signal PWM is calculated, and is set at output RC2 (cf. FIG. 31).

This is followed by S414, where certain registers are reset. These are registers whose values are known and do not change, e.g. registers for rotation direction or for configuration of a comparator. These registers may have lost their contents due to severe EMC-related interference. Initialization restores those contents. This is done, in the exemplary embodiment, twice per revolution of the rotor.

Subsequent to program steps S404 or S414, the program enters an endless loop back to step S396. Since the NEW_HALL flag was switched over to 0 in step S400—meaning that one of the large loops 374, 376 has been cycled through—the response in S398 is then No, and only the short loops 382 (which take a few μs) are executed.

At the next Hall edge 370 or 372, the NEW_HALL flag is switched back over during the HALL interrupt to "1" (cf. S452 in FIG. 16) so that once again one of the large loops 374 or 376 is cycled through once, depending on the instantaneous value of the HALL_CNT variable.

If motor 100 has a four-pole rotor 108 and is rotating at 3000 rpm=50 revolutions per second, the target value and actual value are updated 100 times per second, which allows high-quality rotation speed regulation.

Figure 14:
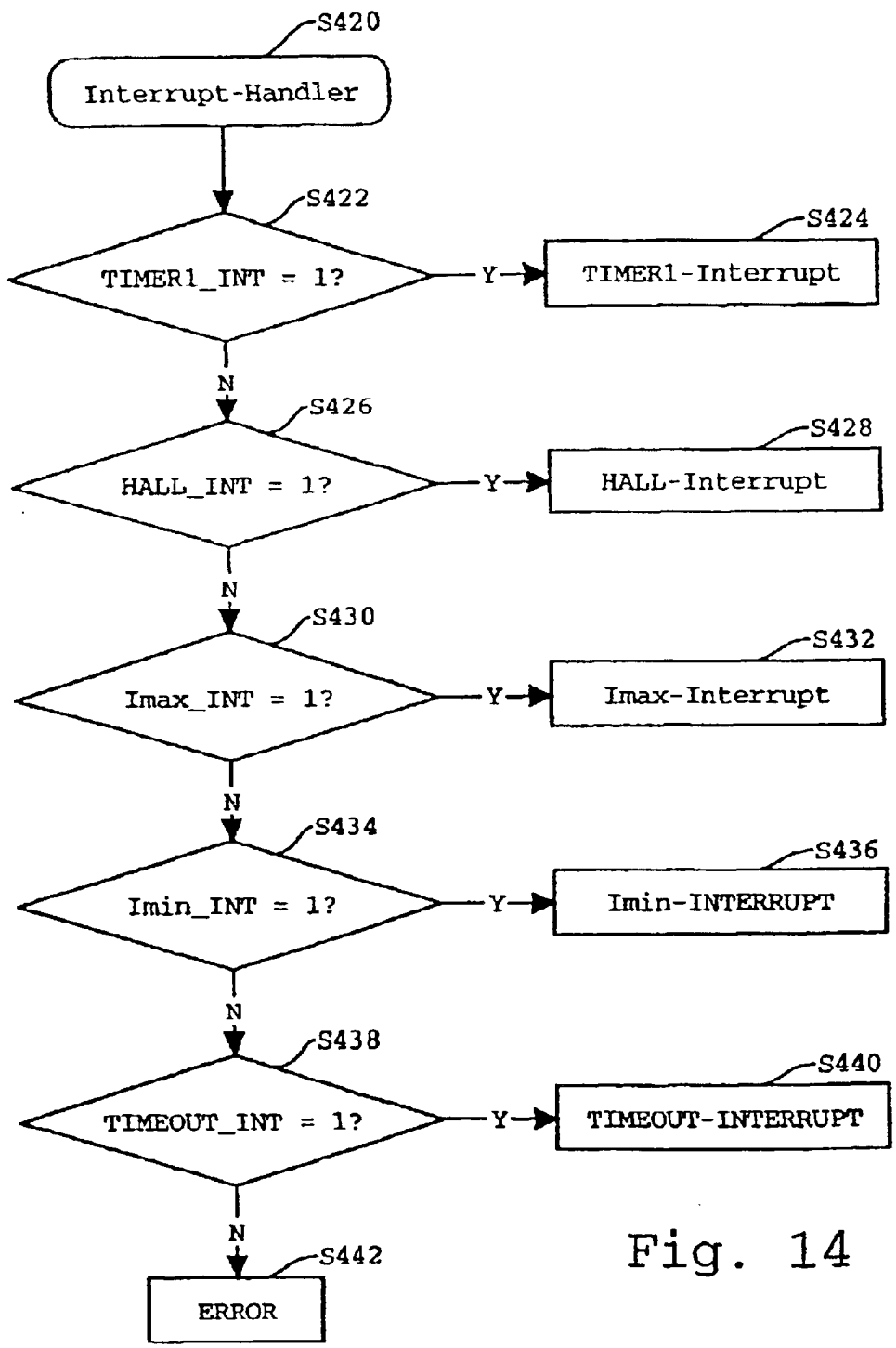
FIG. 14 is a flow chart of the interrupt handler for detecting and servicing the various interrupts.

FIG. 14 shows interrupt handler S420 that processes interrupts 390 (FIG. 13). The processor used here has an interrupt handler that is activated at any interrupt, identifies the interrupt in question, and then executes the necessary routine for processing that interrupt. Prior to processing of an interrupt, S420 therefore identifies the source of the interrupt, e.g. the occurrence of a signal Imin or a change in the level of signal HALL.

Figure 16:
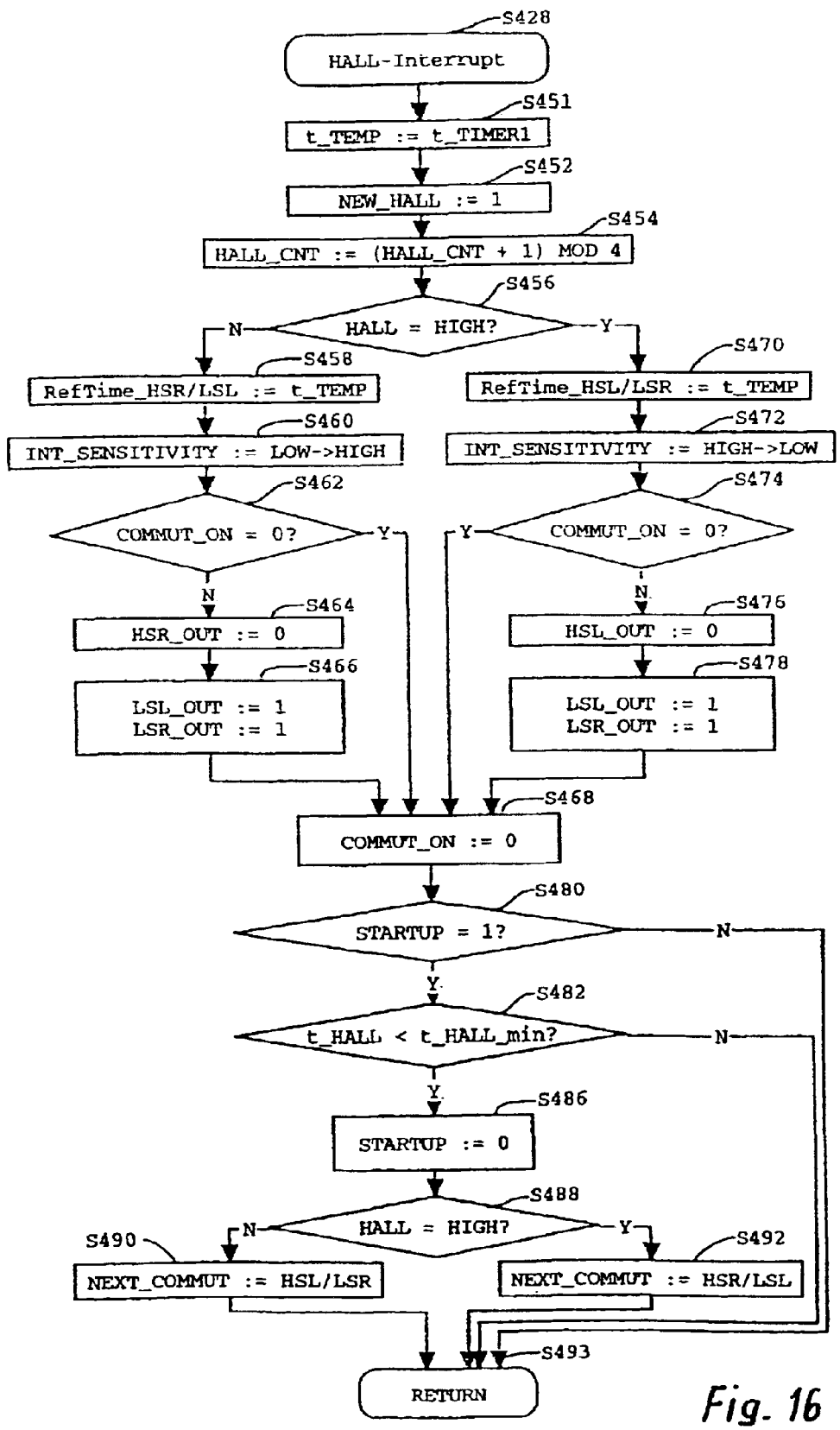
FIG. 16 is a flow chart of the Hall Interrupt routine that is executed upon occurrence of an edge of signal HALL.

Interrupt handler S420 begins in S422 by querying whether an interrupt of ring counter TIMER1 in μC 40 is present. If so, the corresponding routine is executed in S424. This is part of the standard software of μC 40. If a ring counter interrupt is not present, S426 queries whether a Hall interrupt HALL_INT is present. If so, the corresponding routine is executed at S428. This is depicted in FIG. 16.

If the response in S426 is No, S430 checks whether an Imax interrupt is present. If Yes, the Imax interrupt routine (depicted in FIG. 17) is executed at S432.

If the answer in S430 is No, S434 checks whether an Imin interrupt is present. If Yes, the Imin interrupt routine (depicted in FIG. 19) is executed in S436.

If the response in S434 is No, S438 checks whether a TIMEOUT interrupt is present. The TIMEOUT function has already been described in FIG. 6, 242. If such an interrupt is present, the TIMEOUT interrupt routine (depicted in FIG. 20) is executed at S440.

Interrupt handler S420 has now arrived at its end. If the response in S438 is also No, however, then there must be an error, and the program goes to step S442 where a corresponding error handling routine, which can be implemented in μC 40, takes place.

FIG. 15 serves to explain the routine depicted in FIG. 16 for processing a Hall interrupt.

FIG. 15a shows signal PWM at port RC2 of μC 40. This signal is generated continuously and has a frequency of e.g. 20 kHz. Its pulse duty factor pwm can be adjusted in program-controlled fashion (cf. FIGS. 21 and 22).

FIG. 15b shows signal HALL. It has leading edges 370 at the transition from Low to High, and trailing edges 372 at the transition from High to Low.

Times t1, t2, etc. at which the edges occur are measured by ring counter TIMER1 and saved in a temporary variable t_TEMP. As FIG. 15 shows, leading edges 370 govern the switching on of transistors HSL 114 and LSR 136, i.e. of current i1 (FIG. 1). Trailing edges 372 analogously govern the switching on of transistors HSR 130 and LSL 132, i.e. of current i2 (FIG. 1). The Hall interrupt routine must therefore distinguish between leading edges 370 and trailing edges 372.

The time period t_HALL between two flanks is calculated as $$t\_HALL = t2 - t1 \qquad (2)$$

This duration is an indication of the instantaneous rotation speed of rotor 108, and corresponds to the time needed by the latter to rotate 180° el. This time can, of course, be measured in many different ways, e.g. including by means of the so-called sensorless principle, using optical sensors, magnetoresistive sensors, etc. As soon as the rotation speed is high enough, it is preferable to measure the time for a larger rotation angle, in particular for one complete revolution of rotor 108, which in the case of the exemplary embodiment according to FIG. 1 corresponds to a rotation angle of 720° el. This measurement is explained below.

FIGS. 15c and 15d show, in highly schematic fashion, the signals for controlling H-bridge 137. FIG. 15c shows signals HSR, LSL for controlling transistors 130 and 132, i.e. for switching on current i2. FIG. 15d shows signals HSL, LSR for controlling transistors 114 and 136, i.e. for switching on current i1.

The beginning of a pulse 444 in FIG. 15c is calculated from trailing edge 372 of signal HALL, which is symbolized by an arrow 445; and the beginning of a pulse 446 in FIG. 15d is calculated from leading edge 370 of signal HALL, as symbolized by arrow 447. (The calculation is performed in FIG. 30, S673.) Edges 370, 372 of HALL correspond to defined rotational positions of rotor 108—cf. FIG. 26A where a rotational position of 0° el. is associated with trailing edge 601, a rotational position of 180° el. with leading edge 603, etc. These are the only rotational positions that are precisely known for the calculation of commutation events, and the calculations therefore refer to these "fixed points."

Assuming that control signals 444, 446 are located symmetrically with respect to the pulses of signal HALL, the value obtained for time t3 at which a signal 446 begins is:

$$t3 = t1 + t\_HALL + (t\_HALL - BW)/2 \qquad (3)$$

in which BW=the block length of signals 444, 446. This block length is calculated by rotation speed controller RGL, which is described in FIG. 30 below.

The value correspondingly obtained for time t4 at which control signal 444 should begin is:

$$t4 = t2 + t\_HALL + (t\_HALL - BW)/2 \qquad (4).$$

Note that time t3, for example, is calculated not from time t2 (immediately preceding edge 372 of signal HALL) that is located closest to t3, but instead from an earlier point in time t1, namely from edge 370 before the previous one. The reason is that if BW=t_HALL, time t2 would coincide with time t3; this is impermissible, since calculation steps must be performed between t2 and t3.

If a so-called ignition angle shift is used, for example by a fixed value VZ, the above formulas are modified as follows:

$$t3' = t1 + t\_HALL + ((t\_HALL - BW)/2) - VZ \qquad (3a)$$

$$t4' = t2 + t\_HALL + ((t\_HALL - BW)/2) - VZ \qquad (4a).$$

In this case times t3 and t4 are located farther to the left by an amount equal to the magnitude VZ, as indicated in FIG. 15d for t3'; this means that currents i1 and i2 are switched on slightly earlier, which can result in an improvement in efficiency. It is also evident that in such a case t3' occurs earlier than t2, which is possible only because reference time RefTime for the calculation of t3' is not time t2 (i.e. trailing edge 372) but rather time t1 (i.e. leading Hall edge 370), as symbolically depicted by arrow 447. VZ is usually a constant, but can also be a rotation-speed-dependent function or can be continuously optimized by means of separate program sections (not depicted).

FIG. 16 shows routine S428 that is triggered at an edge 370, 372 (FIG. 15) at a HALL interrupt. Such an interrupt is generated when the signal at RB0 changes from 0 to 1 or from 1 to 0; in other words, input RB0 is edge-sensitive and causes an interrupt upon occurrence of an edge 370 or 372. The routine distinguishes a leading edge 370 from a trailing edge 372, which is important for subsequent processing.

In step S451, the time at which the interrupt occurred is stored in a temporary memory t_TEMP. This point in time is measured by means of the aforementioned ring counter TIMER1 in μC 40.

In step S452, the NEW_HALL flag (FIG. 13) is set to 1 as a signal that one of the large loops 374 or 376 (FIG. 12) must subsequently be executed.

In step S454, Hall counter HALL_CNT is set to a value (HALL_CNT+1) MOD 4, i.e. is incremented by 1 and subjected to the operation modulo 4. The modulo calculation generates the remainder as result. For example, 4 mod 4=0, since 4 is an integer and is divisible by 4 with no remainder. 5 mod 4=1, however, since this calculation yields a remainder of 1. Similarly, 6 mod 4=2, since the remainder here is 2; 7 mod 4 is 3, and 8 mod 4=0. During operation, S454 therefore continuously yields the number sequence 0, 1, 2, 3, 0, 1, 2, 3, 0 etc. for HALL_CNT.

Step S456 queries whether HALL=HIGH. According to FIG. 12a), this means that rotor 108 is in an angular position between 0° el. and 180° el.

If HALL is not high, then in S458 the reference variable for controlling high-side right transistor HSR 130 and low-side left transistor LSL 132 is replaced by the time stored in temporary memory t_TEMP. In the next step S460, the interrupt sensitivity is set so that port RB0 is sensitized, for the next HALL interrupt, to a change from LOW to HIGH.

S462 checks whether the COMMUT_ON flag has a value of 0. This flag is set in the COMMUT routine (FIG. 23) in step S718 as soon as the winding receives current, and is set to zero at the completion of commutation in FIG. 24 or 25 (cf. S764, S812, and S842 therein). If the response is No, this means that a current i2 is still flowing at the time of the Hall change from High to Low.

Figure 19:
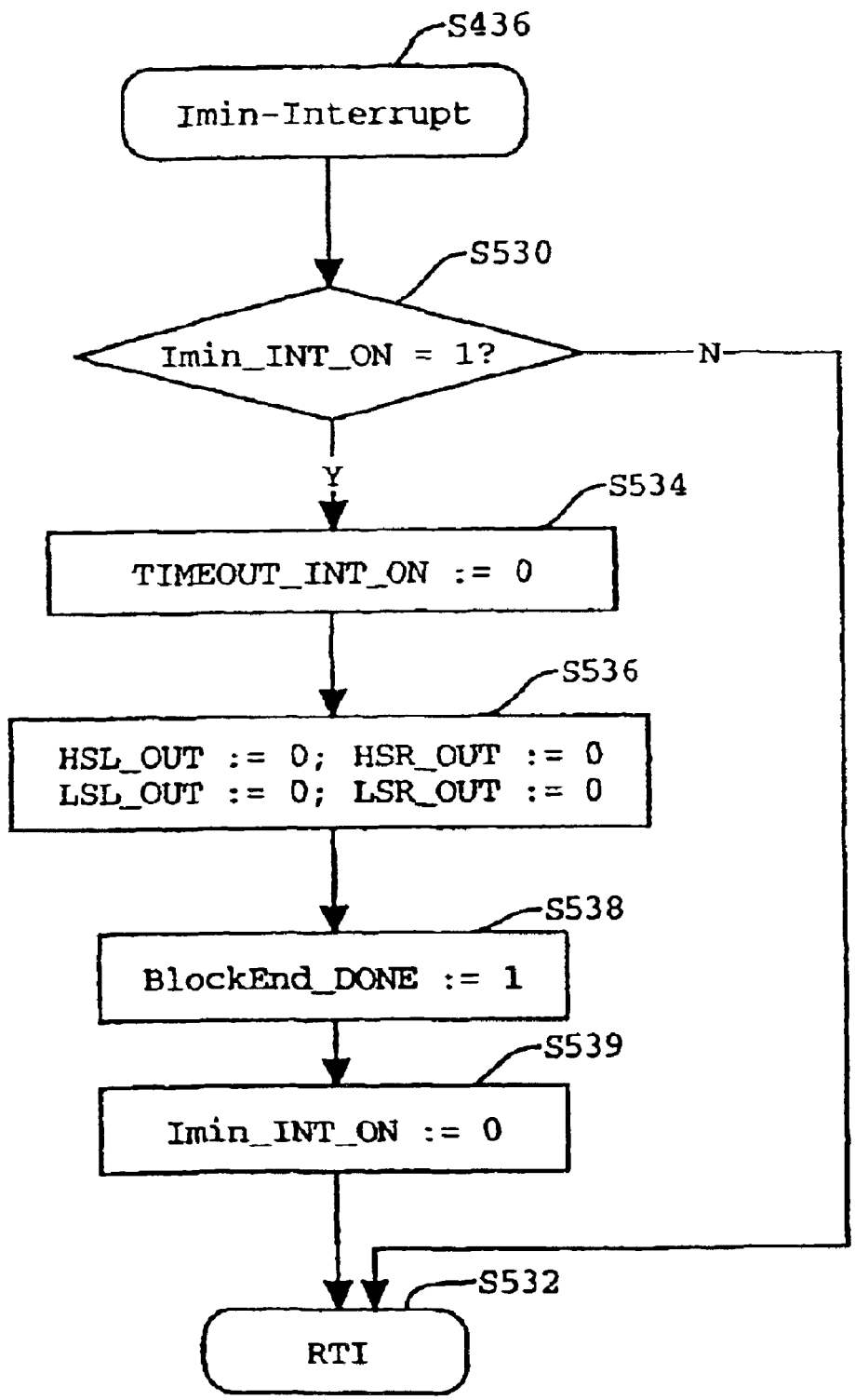
FIG. 19 is a flow chart of the Imin interrupt routine that is executed upon occurrence of signal Imin.

Referring again to FIG. 15, a Hall change 372 from High to Low occurs therein at time t2. Transistor HSR 130 should already have been shut off there so that current i2 no longer flows, and since HSR is still conductive, i2 must be shut off in an "emergency shutoff" procedure. To achieve this, in step S464 HSR 130 is shut off, and in the next step S466 both low-side transistors LSL 132 and LSR 136 are switched on, so that current i2 can decay rapidly through transistors 132, 136 and measuring resistors 134, 138 and thereby generate a torque. (When current i2 transitions through zero, an Imin interrupt according to FIG. 19 is triggered, terminating the shutoff procedure.) The program then goes to step S468, where it is now determined that the shutoff procedure for current i2 has been initiated (COMMUT_ON:=0), which according to FIG. 23, S702 is the prerequisite for switching on current i1.

If it is found in step S462 that current i2 has already been shut off, the program goes directly to step S468.

If it is found in step S456 that signal HALL is high, i.e. that the edge in FIG. 15 is a leading edge 370, the program goes to step S470, where the time stored in temporary memory t_TEMP is taken as the reference variable for controlling transistors HSL 114 and LSR 136, i.e. certain times are now measured and calculated from that variable. In S472 the interrupt sensitivity is then set so that port RB0 is sensitized, for the next HALL interrupt, to a change from HIGH to LOW, i.e. to a trailing edge.

The next step S474 checks whether the COMMUT_ON flag has a value of 0. This flag is set to 1, in the COMMUT routine (FIG. 23) in step S718, as soon as the winding receives current, and is set to zero at the completion of commutation in FIG. 24 or 25 (cf. S764, S812, and S842 therein). If the response is No, because a current i1 is still flowing at this Hall change, that current must be shut off in an "emergency shutoff" procedure, for which purpose current i1 is shut off in step S476 by shutting off high-side transistor HSL 114, and in S478 both low-side transistors LSL 132 and LSR 136 are switched on, so that current i1 can decay rapidly through components 132, 134, 136, 138 and thereby generate a torque on rotor 108. (When current i1 transitions through zero, the shutoff procedure is terminated, e.g. by means of the Imin interrupt of FIG. 19.) S468 then follows, in which COMMUT_ON is set to 0 in order to indicate that the shutoff procedure for i1 has been initiated. If the response in S474 is Yes, the program goes directly to step S468.

Following S468, S480 checks whether the STARTUP flag (FIG. 13, S394) has a value of 1. This means either that no value at all is present for the actual rotation speed, or that the actual rotation speed is less than 1000 rpm. If this flag is not set, the program branches directly to the end S493 of routine S428.

If the response is Yes in S480, the program goes to step S482 and checks there whether t_HALL is less than a value t_HALL_min (cf. equation (7)) which value corresponds e.g. to a rotation speed of 1000 rpm, i.e. it determines whether the rotation speed has risen above 1000 rpm. If No, the program goes to S493.

If the rotation speed has risen above 1000 rpm, the STARTUP flag is set to zero in S486. S488 then checks whether signal HALL is high. If No, S490 defines in the NEXT_COMM predictive variable that the next current block will be a current block 446 (FIG. 15), i.e. that HSL 114 and LSR 136 must be switched on in it. If the response in S488 is Yes, it is then stipulated at S492 that the next current block will be a current block 444 (FIG. 15), i.e. that HSR 130 and LSL 132 must be switched on in it. After S490 or S492, the program goes to S493 and terminates routine S428. The values for NEXT_COMMUT are queried in FIG. 24, S752 and FIG. 25, S806, and enable the transition to commutation at higher rotation speeds.

Figure 17:
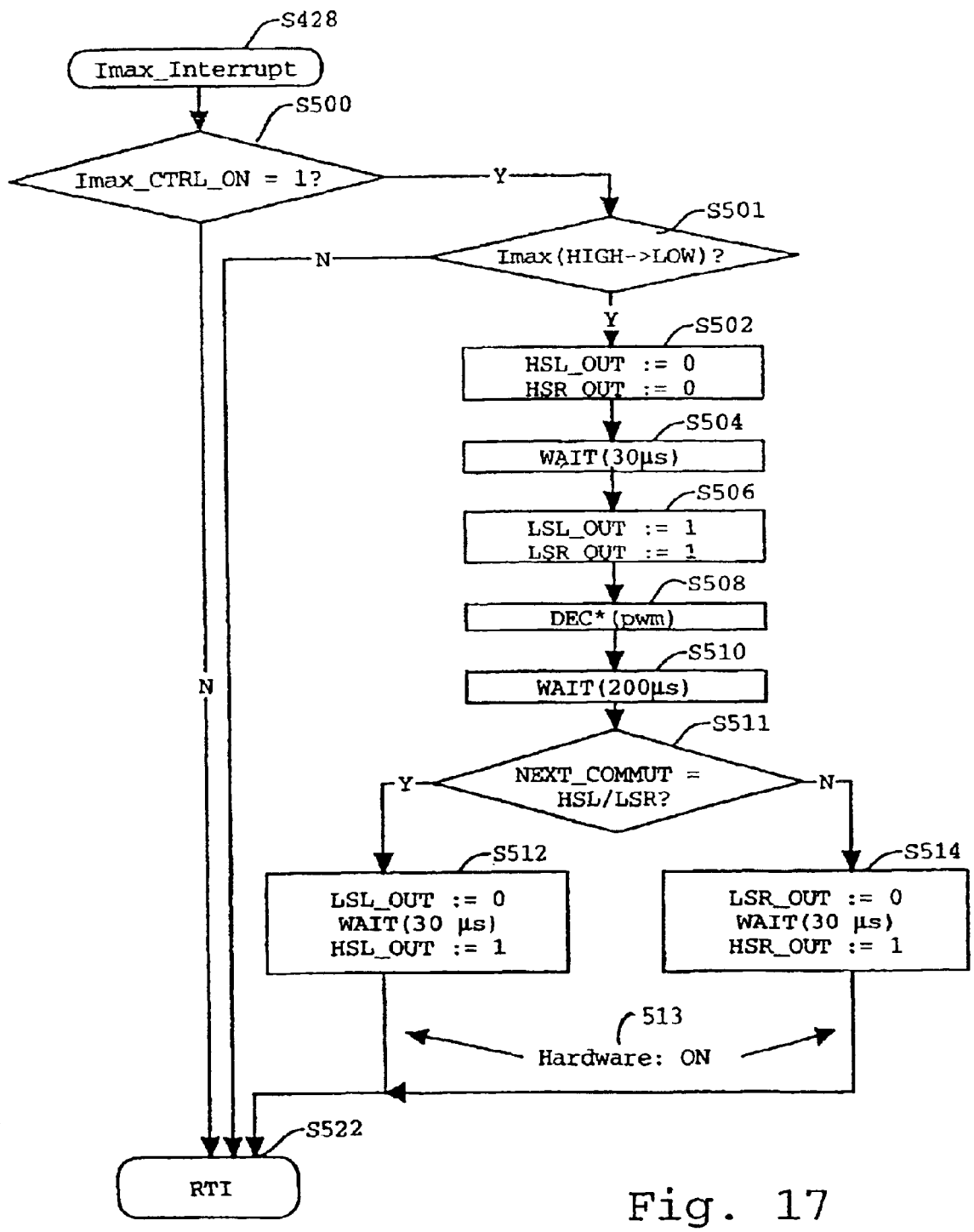
FIG. 17 is a flow chart of the Imax interrupt routine that is executed at an edge of signal Imax.

FIG. 17 shows a preferred embodiment of routine S428 for processing an Imax interrupt S428. The operation of this routine is then explained with reference to FIG. 18.

Step S500 checks whether the Imax_CTRL_ON flag was set to 1 in the COMMUT_CTRL routine (FIG. 25). The result of this is that routine S428 can be initiated by signal Imax only if a current is flowing in winding 102, but not by interference signals when the winding is currentless. If the response in S500 is Yes, S501 checks whether the Imax_ Interrupt was generated at the upper limit (3 A) or lower limit (1.6 A). For an interrupt at the upper current limit, signal Imax goes from High to Low because transistor 188 (FIG. 1) becomes conductive, and the current to stator winding 102 has already been shut off by the hardware by means of the low-active signal Imax, by blocking both high-side transistors 114 and 130. This has already been described in FIG. 1. Additionally and redundantly, if the response in S501 is Yes, in S502 signals HSL_OUT and HSR_OUT for highside transistors 114 and 130 are set to zero for additional control of these two transistors by means of software, i.e. they can be switched back on only when permitted by the software. If the response in S500 is No, the routine goes directly to its end, i.e. S522. The routine also goes directly to S522 if the interrupt was generated at the lower current limit (1.6 A) (S501: No).

At S504, S502 is followed by a 30-μs wait time. During this time, the current in the lower portion of bridge 137 flows, for example, through conducting transistor 136 and free-wheeling diode 132', or conversely through conducting transistor 132 and free-wheeling diode 136'.

Then, at S506, both low-side transistors LSL 132 and LSR 136 are switched on so that the current in winding 102 can decay through components 132, 134, 136, 138, generating a torque on rotor 108.

Figure 22:
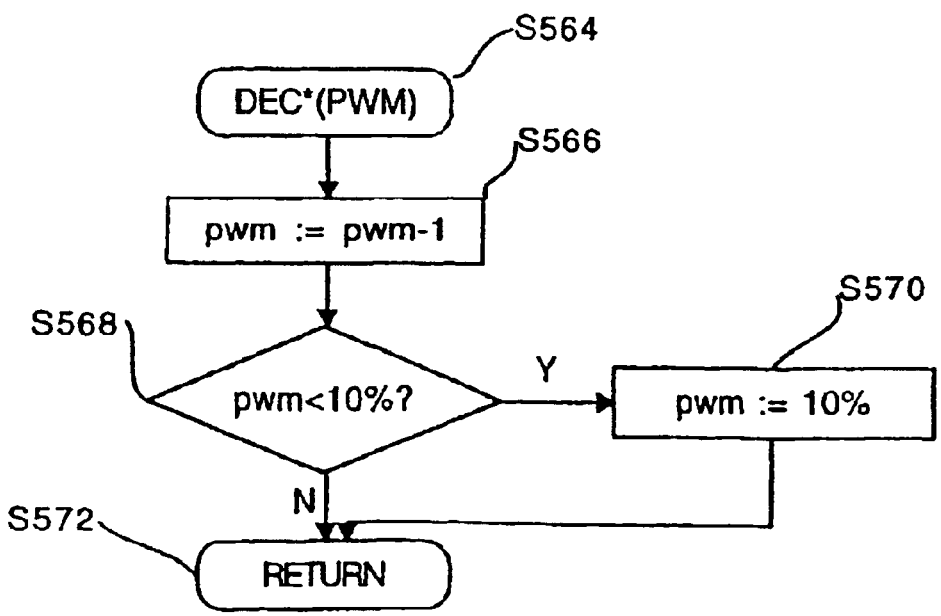
FIG. 22 is a flow chart for decrementing pulse duty factor pwm.

Next, at S508, comes the DEC*(pwm) routine, which is depicted in FIG. 22 and in which pulse duty factor pwm of signal PWM is reduced one step so that the current through winding 102 decreases and no longer reaches the upper limit (here 3 A). The result is to adaptively prevent the motor from operating unnecessarily with current limiting, and the reduced current is compensated for by increasing the value BW (in controller RGL).

This is followed in step S510 by a wait time of e.g. 200 μs so that the current in winding 102 has enough time to decay. S511 checks whether the variable for the next transistors to be switched on is HSL/LSR. If Yes, then in S512 transistor LSR 136 remains conductive and transistor LSL 132 is shut off, so that the short-circuit current now flows through transistor 136 and free-wheeling diode 132'. Following this in S512 there is a wait time of e.g. 30 μs, and then high-side transistor HSL 114 is once again made ready to be switched on, i.e. it can be switched on by the hardware when signal Imax becomes high. This is indicated symbolically in FIG. 17 at 513 by "Hardware: ON." Switching on is therefore accomplished not by means of the command HSL_OUT:=1, but only by a logical association between this signal and the change in signal Imax when the current drops below 1.6 A. Below 1.6 A the motor therefore immediately begins receiving energy from DC power network 121 again, and i1 rises again.

If the response in S511 is No, then in S514 transistor LSR 136 is blocked and transistor LSL 134 remains switched on (cf. S506), so that the short-circuit current flows through transistor 134 and free-wheeling diode 136'. There is then a 30 μs wait time, and high-side transistor HSR 130 is then once again made ready to be switched on, i.e. it can now be switched on by the hardware, as indicated at 513, as soon as signal Imax once again becomes high, i.e. at a current below 1.6 A. Here again, switching on is accomplished not by means of signal HSR_OUT:=1, but only by way of the change in signal Imax at 1.6 A, in other words by means of a conjunctive association between signal HSR_OUT:=1 and signal Imax =1. After the current drops below 1.6 A, motor 100 therefore once again receives current from DC link 121, and current i2 rises again.

Subsequent to S512 or S514, routine S428 goes to S522 where it ends.

It should be noted here that signals HSL_OUT, HSR_OUT, etc. remain stored until a different signal is generated at the relevant output of μC 40. Subsequent to S502, for example, signal HSL_OUT remains at 0 until it is switched over to 1 in S512, and subsequent to S512 it remains at 1 until it is switched back to 0 at some other time.

Figure 18:
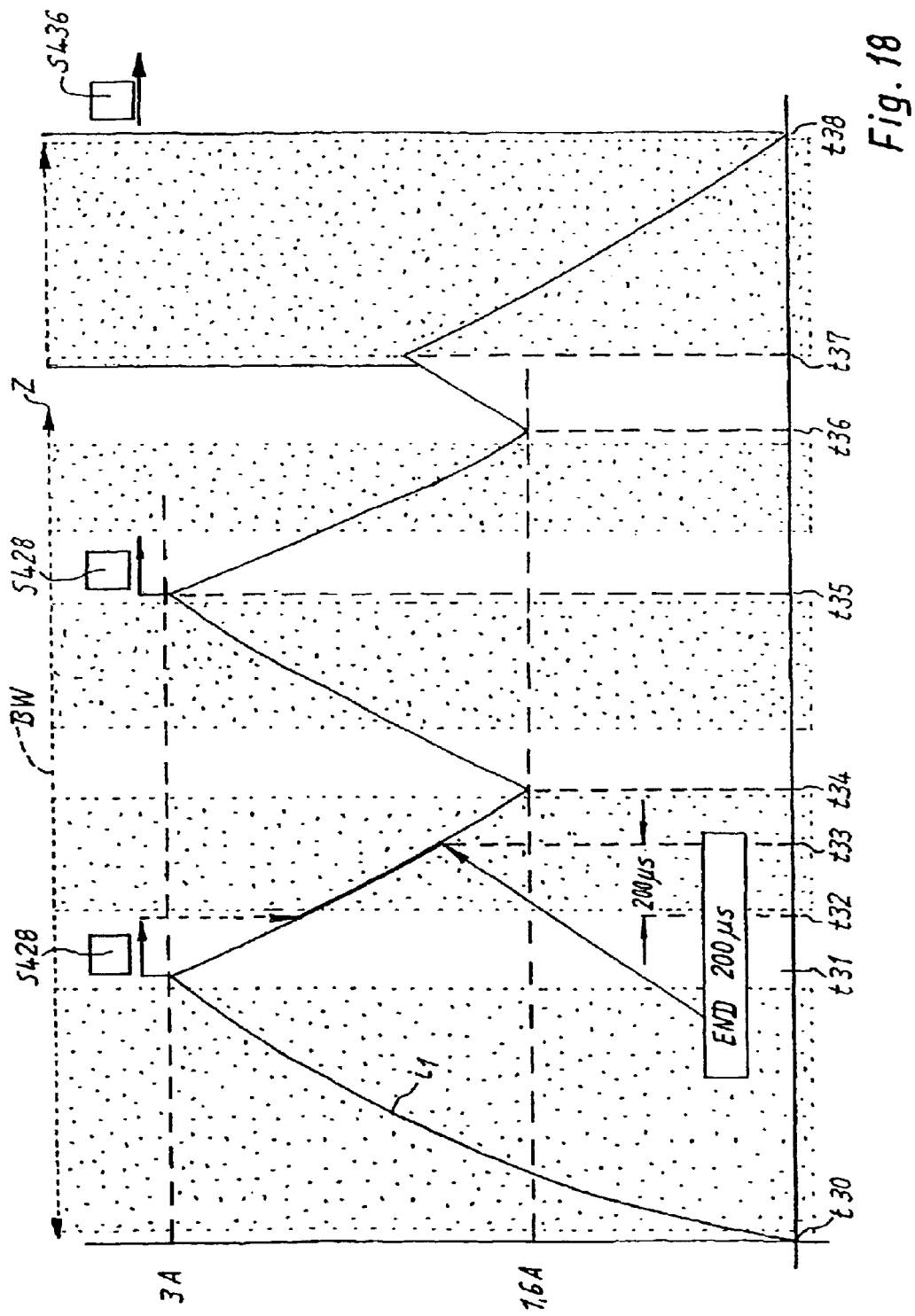
FIG. 18 is a diagram explaining the response of the maximum current limiter when a motor is rotating rapidly.

FIG. 18 explains the manner of operation of the routine shown in FIG. 17. In FIG. 18, a value of 3 A is shown for the upper current threshold, and a value of 1.6 A for the lower current threshold, in order to improve comprehension. These numerical values may, of course, be different depending on the motor.

At t30, current i1 is switched on by switching on transistors 114 and 136. At t31, i1 reaches the permissible maximum value of 3 A, and as a result of the change in signal Imax to Low, transistor 114 is immediately shut off by the hardware. At the same time, starting at t31, routine S428 is executed as shown in FIG. 17. This routine, by means of S506, additionally switches on low-side transistor 132 at t32, so that winding 102 is operated in short circuit. This lasts for 200 μs until t33, when transistor 132 is shut off again so that only transistor 136 is conductive, and the software shutoff of high-side transistor 114 is cancelled by steps S516 and S518. High-side transistor 114 does not conduct until after t34, however, namely when the lower current threshold of 1.6 A is reached, thereby making signal Imax high again so that current i1 is switched on and rises again. At t35 it again reaches the 3 A level, and transistor 114 is once again shut off by the hardware, routine S428 is started again, and the procedure just described repeats.

At t36 transistor 114 is once again switched on by the hardware, and at t37 the shutoff command becomes effective because the duration BW of the current block has elapsed.

Inherently, current i1 should already have been shut off at point Z at which time BW elapsed, but the shutoff command can take effect only in the areas shaded in gray in FIG. 18, i.e. in this case not until time t37, with the result that the shutoff is slightly delayed.

At time t38 current i1 transitions through zero, and Imin interrupt S436 (described below) is therefore generated there.

It is somewhat disadvantageous in the context of FIGS. 17 and 18 that increased losses occur, for example, between times t33 and t34 because i1 is then flowing through free-wheeling diode 132' because transistor 132 is no longer conductive. A variant with which these losses can be further reduced, and which is especially suitable for slow motors, will also be described below. The approach according to FIGS. 17 and 18 represents the optimum for fast-running motors based on present knowledge, since in such motors the current changes occur extremely fast and therefore the calculation times in μC 40 are too long compared to the times within which those current changes take place. Even better solutions would probably be possible with faster processors, but at present these are still too expensive for motors.

FIG. 19 shows the execution of service routine 436 for processing an Imin interrupt.

S530 queries whether the Imin_INT_ON flag is equal to 1. This flag is set in the COMMUT_CTRL routine (FIG. 25, S824). If a TIMEOUT interrupt (FIG. 20) has directly preceded (FIG. 20), this flag has a value of 0, and the program goes directly to the end, i.e. to S532 of this routine.

If the response in S530 is Yes, in S534 the TIMEOUT_INT_ON flag is set to 0 so that a subsequent TIMEOUT interrupt is no longer processed; and then at S536 all four transistors 114, 130, 132, 136 are blocked, because winding 102 is substantially currentless and contains no stored inductive energy (which has been converted into kinetic energy of rotor 108).

Then, at S538, the BlockEnd_DONE flag (which is queried in FIG. 24 at S762 during the COMMUT_NORMAL routine and serves to prepare the next commutation) is set to 1, and at S539 Imin_INT_ON is set to 0 because the routine has been executed.

Figure 20:
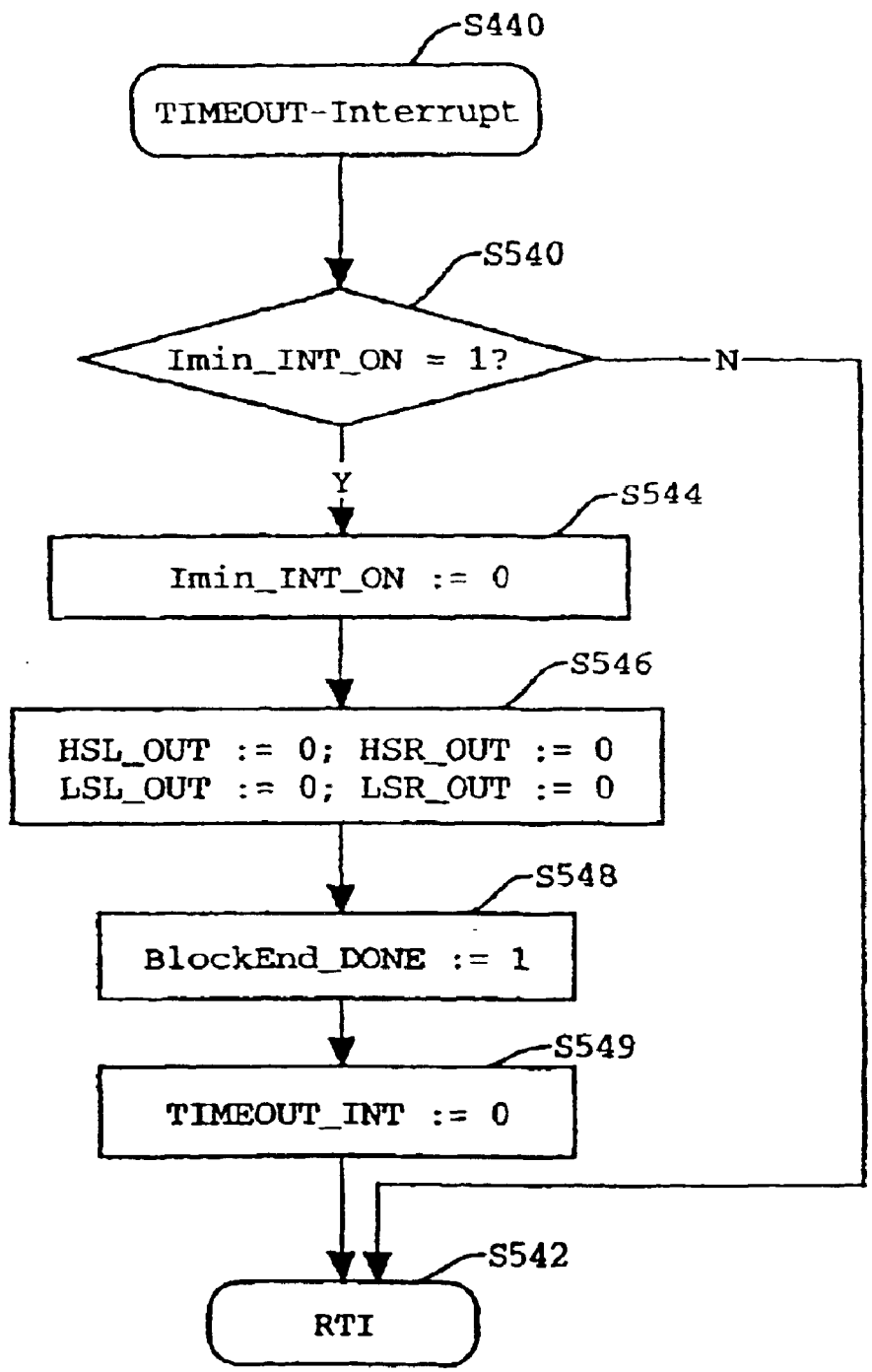
FIG. 20 is a flow chart of the TIMEOUT interrupt routine.

FIG. 20 shows the execution of service routine S440 for processing a TIMEOUT interrupt.

S540 queries whether the TIMEOUT_INT_ON flag has a value of 1. If an Imin interrupt (FIG. 19) has preceded, this flag has a value of 0, and in that case the routine goes directly to its end at S542.

If the response in S540 is Yes, the routine goes to step S544 where it sets the Imin_INT_ON flag to 0 so that a subsequent Imin interrupt is not processed (cf. S530 in FIG. 19).

In the next step (S546), all four transistors 114, 130, 132, 136 are blocked because the current in winding 102 has a low value at the expiration of TIMEOUT, and winding 102 is consequently no longer storing a large amount of inductive energy. Winding 102 is thereby made currentless.

At S548 the BlockEnd_DONE flag (which is queried in FIG. 24 in S762 during the COMMUT_NORMAL routine) is then set to 1, and in S549 TIMEOUT_INT is set to 0 because the interrupt has been processed.

Figure 21:
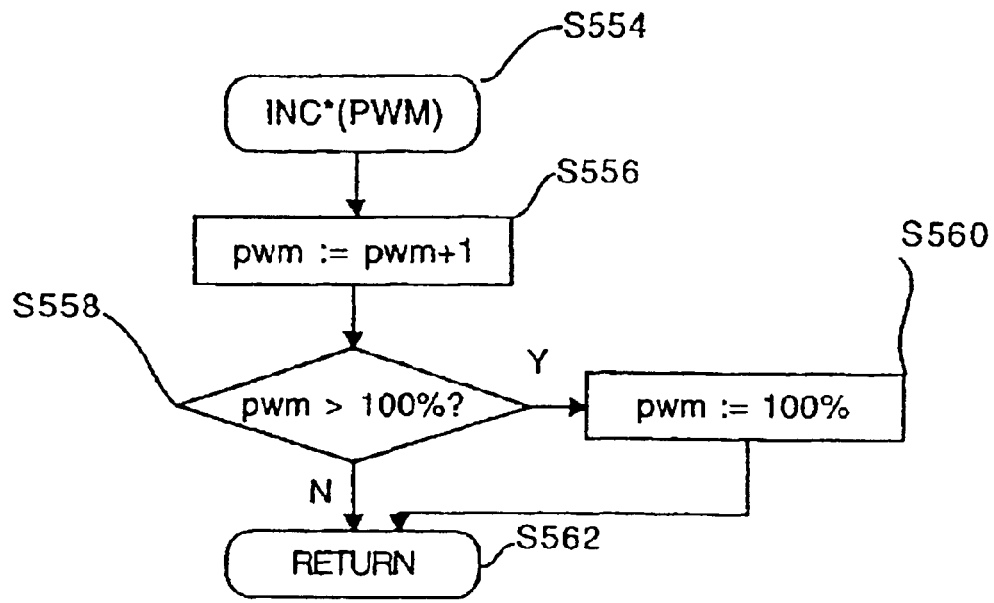
FIG. 21 is a flow chart for incrementing pulse duty factor pwm.

FIG. 21 shows INC*(PWM) routine S554 for increasing pulse duty factor pwm of signal PWM at output RC7 of μC 40. At S556 the value in the PWM register is incremented by 1, corresponding to a 1% increase in the pulse duty factor.

Step S558 checks whether the increase has caused pwm to become greater than 100%. If Yes, the program goes to S560, where pwm is then set to 100%, meaning that current i1 or i2 is switched completely on.

If the response in S558 is No, the routine goes to its end S562; the same occurs subsequent to S560.

FIG. 22 shows DEC*(PWM) routine S564 for decreasing pulse duty factor pwm. At S566 the pwm variable is decremented by 1, corresponding to 0.5%. S568 checks whether this has caused pwm to drop below 10%. If Yes, the routine goes to S570 where a lower limit of 10% is imposed on pwm. If the response in S568 is No, the routine goes to its end S572; the same occurs subsequent to S570.

The routines shown in FIGS. 21 and 22 play a part principally in the context of the adaptive controller, which is described below with reference to FIG. 31.

Figure 23:
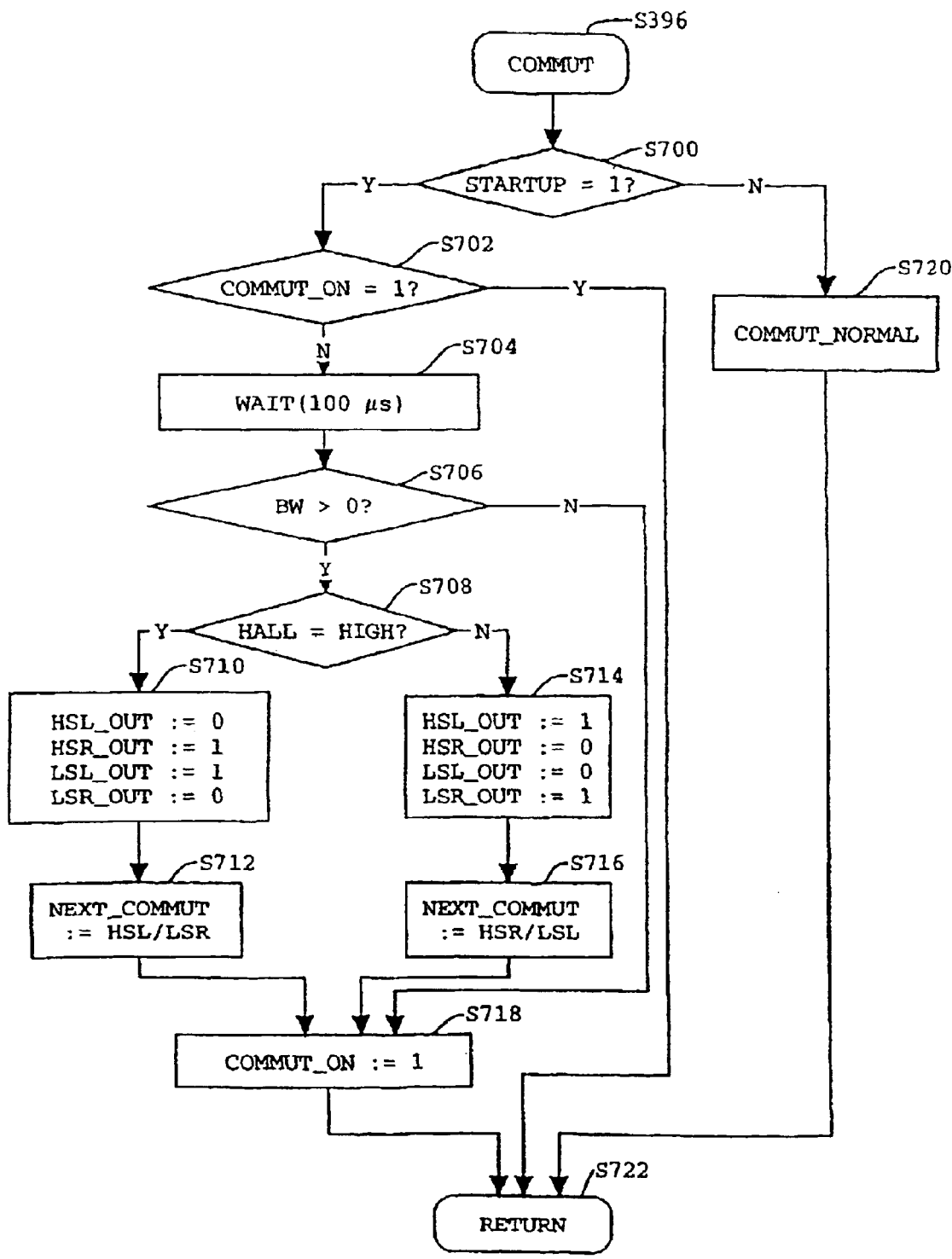
FIG. 23 is a flow chart to explain the operations that occur during a commutation.
Figure 24:
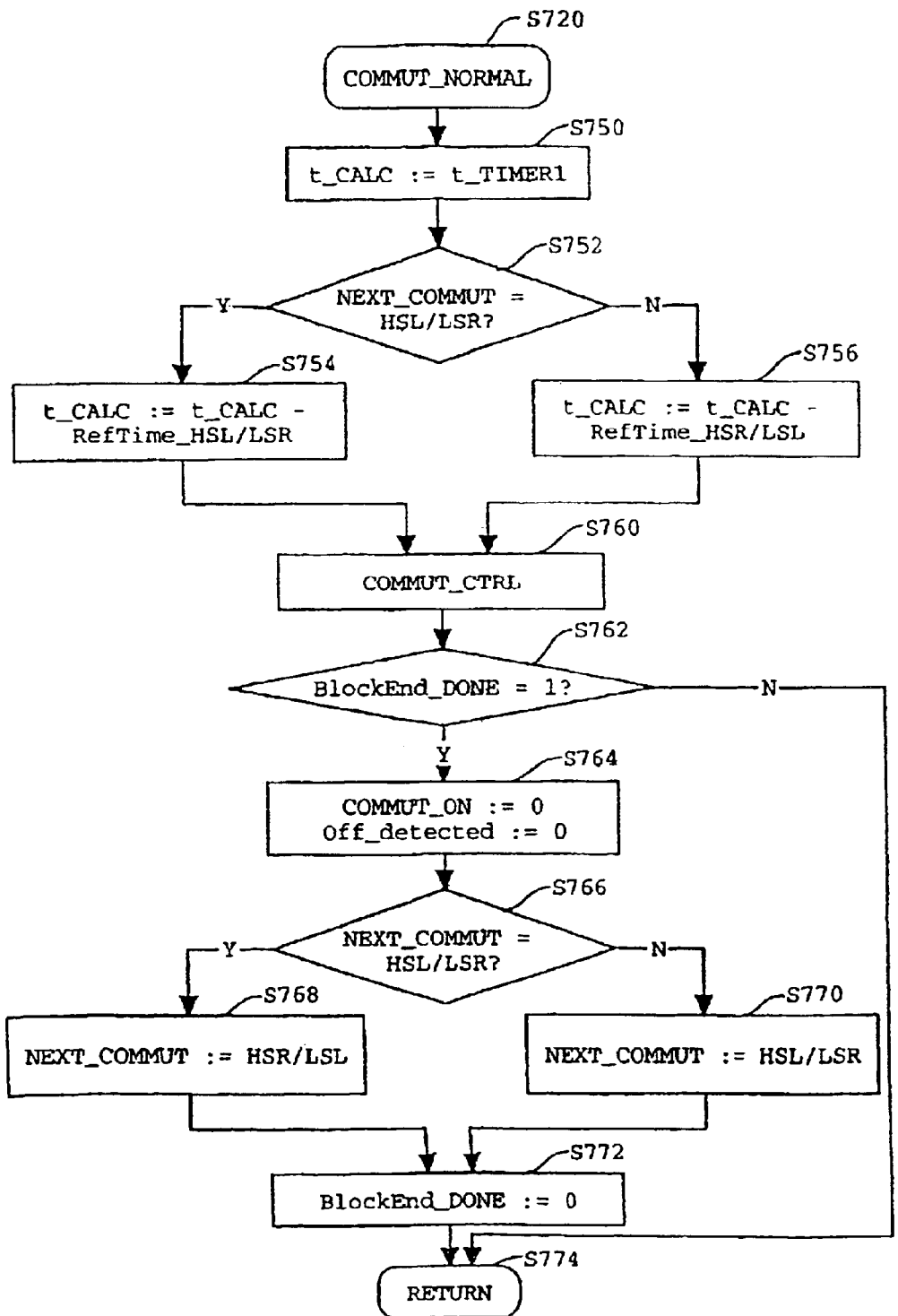
FIG. 24 is a flow chart to explain commutation at a normal rotation speed of motor 100.

FIGS. 23 through 25 shown COMMUT routine S396, which is continuously called in the main program (FIG. 13) and controls currents i1, i2, in winding 102. Commutation control is the function executed most frequently. It comprises two sections:

1. The start-up section for starting and acceleration;
2. The section for normal operation.

In the start-up program section, the motor is at a standstill or is just beginning to accelerate. Once supply voltage has been connected, the STARTUP flag is set in FIG. 13 in step S394 so that the motor begins the STARTUP routine. The COMMUT_ON flag is also set to 0 during initialization so that a new current flow operation can start.

S700 checks whether motor 100 is in start-up (STARTUP=1). If Yes, execution branches to S702 and a simplified commutation is performed.

Commutation at Low Rotation Speeds

At low rotation speeds, the current through winding 102 is switched on by means of COMMUT routine S396 (FIG. 23), and is shut off again in the respectively subsequent Hall interrupt routine (FIG. 16). S702 first checks whether the current block has already been started in this Hall period. If Yes, execution branches to the end S722, since a current flow will take place only after the next Hall change. If it was found in S702 that COMMUT_ON=0, however, this is the first call of COMMUT routine S396, and current flow is started.

To accomplish this, there is a 100 μs wait time in S704 to create a current gap so that the MOSFETs are not all conductive simultaneously. S706 checks whether block length BW is greater than zero. If No, the motor should receive no current. The routine therefore branches to the end S722.

If BW>0, the correct current flow to winding 102 (i.e. either i1 or i2) is started as a function of signal HALL (cf. FIG. 1). Rotor 108 then begins to rotate 180° el.

If HALL is high, signals HSR_OUT and LSL_OUT are then set to 1 in S710 so that winding 102 experiences current flow through transistors HSR 130 and LSL 132, and a current i2 flows.

S712 defines predictively that the next commutation must occur via transistors HSL 114 and LSR 136. This is important for changing from this commutation mode to the commutation mode at high rotation speed (cf. the description of FIG. 27, below).

If, however, signal HALL was found in S708 to be Low, then in S714 the other transistors HSL 114 and LSR 136 are switched on so that a current i1 flows; and in S716 NEXT_COMMUT is predictively set to the correct value for the next commutation.

Lastly, in S718 the COMMUT_ON flag is set to 1 so that at the next call of COMMUT routine S396, execution branches directly from S702 to S722, since winding 102 is already receiving current. This continues until rotor 108 has rotated approximately 180° el.

Once 180° el. has been reached, the software detects this by way of a Hall interrupt. The shutoff of current flow, and the setting of COMMUT_ON to 0, are performed in the Hall interrupt routine (FIG. 16, S462 through 478, S468), so that the commutation control function once again, beginning at S704, starts a new current flow in the correct current direction.

Commutation at High Rotation Speeds

Figure 26:
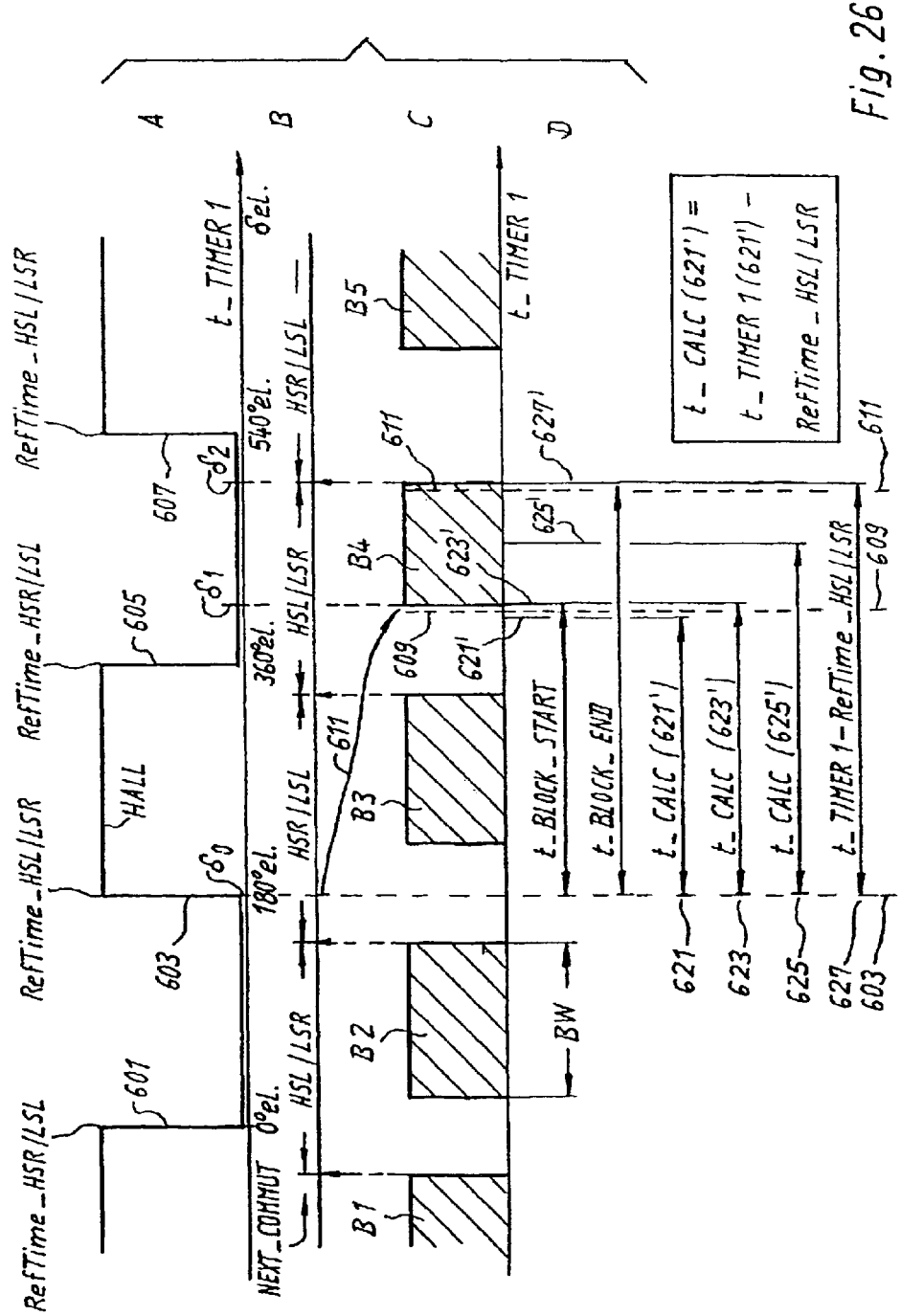
FIG. 26 is a diagram to explain operations during commutation.

If STARTUP=0 in S700, the COMMUT_NORMAL commutation routine S720 for high rotation speeds is performed (cf. FIG. 24). FIG. 26 shows a schematic diagram illustrating the execution of this commutation function.

In S750 in FIG. 24, the instantaneous time t_TIMER1, which is continuously measured by a ring counter, is stored in the t_CALC variable; and in S752 a decision is made, based on the NEXT_COMMUT variable, as to the direction in which current is to flow through winding 102.

If transistors HSL and LSR are to be switched on, execution branches to S754 and the RefTime_HSL/LSR variable, which corresponds to the time of the previous Hall change from Low to High, is subtracted from the t_CALC variable. This is depicted in FIG. 26. FIG. 26A shows signal HALL with Hall changes 601, 603, 605, 607, etc. during which the time of the instantaneous Hall change is stored (S458 and S470 in FIG. 16) in the respective variables RefTime_HSR/LSL (at 601 and 605) and RefTime_HSL/LSR (at 603 and 607).

FIG. 26 explains the basic principle of commutation. For switching on and shutting off a current block, reference is made, after the motor has reached operating speed, to a reference position of the rotor, associated with that current block, which maintains a minimum distance from that current block in all operating states.

For example, a reference position $\partial 0$ (here 180° el.) is used for switching on and shutting off current block B4 (FIG. 26C), and from that reference position $\partial 0$ an angular position $\partial 1$ is calculated for switching on current block B4 (in this case at 405° el.), as well as an angular position $\partial 2$ for shutting off block B4 (in this case at 495° el.).

Angular position $\partial 0$ is therefore the reference point for this current block, and a reference time RefTime_HSL/LSR is therefore measured in TIMER1 at that position, since transistors HSL 114 and LSR 136 must be conductive in current block B4.

Motor 100 does not have a sensor with which rotation angle $\partial$ could be exactly measured in every case; instead, the rotational position can be sensed with some accuracy only at four positions where signal HALL changes, namely at 0° el., 180° el., 360° el., and 540° el. Interpolation is required between these rotational positions; this is possible because there is little change in the angular velocity of rotor 108 in the course of one revolution.

If the intention is therefore to switch on at rotational position $\partial 1$ and shut off at position $\partial 2$, it is known that the angular distance between $\partial 0$ and $\partial 1$ is, for example, 405−180=225° el., and that the angular distance between $\partial 0$ and $\partial 2$ is, for example, 495−180=315° el.

Since it is known that the rotor requires a time t_HALL to rotate 180° el., the time resulting for a rotation of 225° el. is $$t\_HALL*(225/180)=1.25*t\_HALL$$

In this example, this is the time t_BLOCK_START.

The time obtained for 315° el. is similarly $$t\_HALL*(315/180)=1.75*t\_HALL$$

In this example, this is the time t_BLOCK_END.

When rotational position $\partial 0$ is passed through, a reference time is therefore measured, i.e. RefTime_HSL/LSR, e.g. 67.34 ms.

Figure 33:
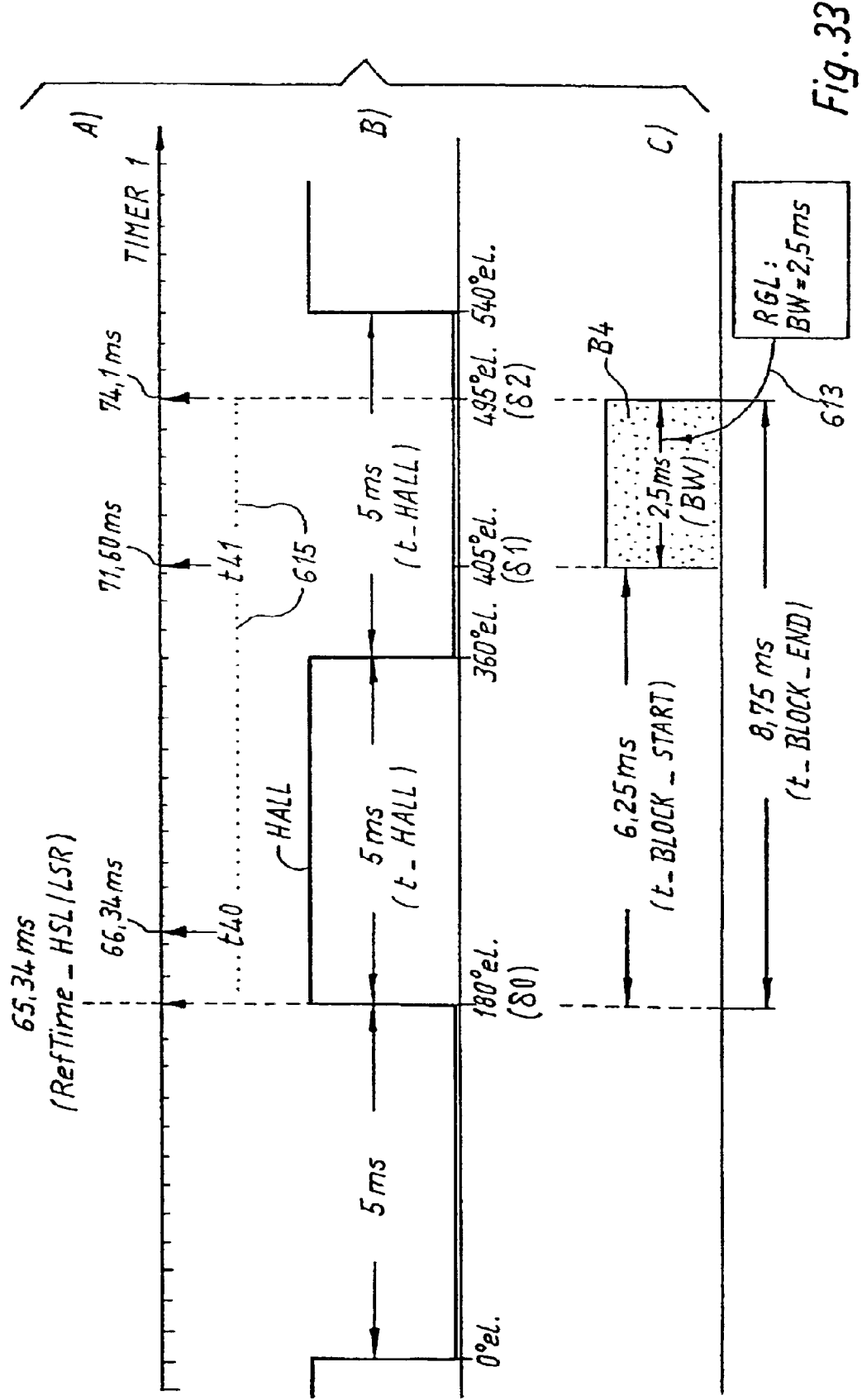
FIG. 33 is a diagram with numerical values for a more detailed explanation of FIG. 26.

FIG. 33 shows the values indicated above in a quantitative example for n=3000 rpm. According to equation (6), time t_HALL=5 ms. This is the time required for rotor 108 to travel 180° el. at 3000 rpm.

Controller RGL (FIG. 30) specifies at 613 (as an example) a block length BW of 2.5 ms, and it is therefore known predictively from FIG. 33 that rotational position $\partial 1$ (405° el.), at which current i1 must be switched on, will be reached after a period of 6.25 ms. It is also known predictively that rotational position $\partial 2$ (495° el.) at which current i1 must be shut off and at which the commutation procedure begins and energy delivery from the DC link must be shut off, will be reached after a period of 8.75 ms.

FIG. 33 furthermore shows, as an example, that a reference time of 65.34 ms is measured in TIMER1 at reference time $\partial 0$. This is the time RefTime_HSL/LSR.

The procedure for monitoring switching on at $\partial 1$ and shutoff at $\partial 2$ is, as shown in FIG. 24 at S754, to continuously calculate the time difference t_CALC between 65.34 ms and the instantaneously measured time (cf. equation (5) regarding t_CALC).

If a time of 66.34 ms is measured, for example, at time t40 by TIMER1, the resulting difference is then $$t\_CALC=66.34-65.34=1\ ms.$$

Since current i1 needs to be switched on only after a period of 6.25 ms, 1 ms is not long enough and current i1 is not yet switched on.

If the present time in TIMER1 at time t41 is 71.60 ms, the resulting difference is then $$t\_CALC = 71.60 - 65.34 = 6.26 \text{ ms.}$$

In this case current i1 is switched on, since t_CALC is greater than 6.25 ms.

Starting at rotational position ∂0, therefore, there is constant monitoring (in FIG. 25, S800) as to whether t_CALC has become greater than t_BLOCK_START; and if that is the case, transistors HSL 114 and LSR 136 are then switched on in this case in S810 of FIG. 25.

Shutoff is accomplished on the same principle, except that t_CALC is compared to the t_BLOCK_END variable (cf. S820 in FIG. 25). In FIG. 33 this variable is 8.75 ms. It corresponds to shutoff angle ∂2, and when it is reached, the commutation procedure according to FIG. 25, S826 through S844 is executed.

Commutation is therefore based on recalculating time t_CALC in the short loops 382 of FIG. 13, at very short intervals of e.g. 0.1 ms, and comparing it to the predictive values t_BLOCK_START and t_BLOCK_END. This occurs in FIG. 33A between the times 65.34 ms and 74.1 ms, and is indicated by dots 615. The departure point for each current block is a reference angle, associated with that block, at which a reference time is measured for that current block and is then used in the comparisons. As rotor 108 rotates, new reference times are continuously being determined and new comparisons made, so that currents i1 and i2 through winding 102 are correctly controlled, i.e. the reference angles continuously "migrate" as the rotor rotates. The same principle can of course also be applied to motors having more than one winding.

If the current is to be switched on earlier, by an amount equal to a time ZV=0.4 ms (also referred to as "ignition advance"), what is then used in FIG. 33 instead of the 6.25 ms time for switch-on is a time of $$6.25 - 0.4 = 5.85 \text{ ms,}$$

and for shutoff:

$$8.75 - 0.4 = 8.35 \text{ ms.}$$

At this rotation speed, angle ∂1 then shifts 14.4° el. to the left to 390.6° el., and angle ∂2 also shifts, at this rotation speed, 14.4° el. Toe the left to 480.6° el., i.e. current i1 is switched on and shut off at earlier times, and the angle defining how much earlier is it switched on and shut off increases as the rotation speed rises; in this case (at 3000 rpm), it is 14.4° el., 28.80 el. at 6000 rpm, etc. ZV will usually be a function of rotation speed. This earlier switching on of the currents in winding 102 can improve the efficiency of motor 100 at higher rotation speeds. It is very easy to implement with the present invention.

FIG. 26B shows the value of the NEXT_COMMUT variable, i.e. either HSL/LSR or HSR/LSL. FIG. 26C symbolically shows current-flow blocks B1 through B5 plotted against time TIMER1. FIG. 26D shows times t_BLOCK_START and t_BLOCK_END for current-flow block B4, which begins at 609 and ends at 611. Block B4 has, as reference time for being switched on and shut off, edge 603 of signal HALL, i.e. the time RefTime_HSL/LSR(603) measured at 603, which is symbolized in FIG. 26C by an arrow 611. At 621, 623, 625, and 627 the time span $$t\_CALC = t\_TIMER1 - RefTime\_HSL/LSR \quad (5)$$

is adapted (by recalculation in the program) to the present time in TIMER1. For example, at 621 a time t_CALC(621') is calculated for time 621', and is used to check whether the beginning of block B4 has already been reached.

At times 621', 623', 625', and 627', the NEXT_COMMUT variable (FIG. 26B) has the value HSL/LSR, so that execution branches from S752 (FIG. 24) to S754, where the instantaneous difference between the value t_TIMER1 stored in S750 and the value RefTime_HSL/LSR(603) is calculated and is assigned to the t_CALC variable. When the COMMUT_NORMAL routine is called at time 621', the t_CALC variable therefore has the value indicated at 621 (FIG. 26D). The analogous calculation takes place at S756 if the NEXT_COMMUT variable has the value HSR/LSL.

Execution thereupon branches into the actual commutation routine COMMUT_CTRL S760, which is depicted in FIG. 25. The portion of FIG. 24 beginning at S762 serves to terminate commutation, i.e. Toe shut off the current; it is executed only after the completion of current flow and will be described later.

In COMMUT_CTRL routine S760, transistors 114, 130, 132, and 136 are switched on and shut off, as described with reference to FIG. 26.

If the time span calculated in t_CALC (e.g. at time 621') is less than t_BLOCK_START, no current flow should take place through winding 102.

At 623', t_CALC is for the first time greater than t_BLOCK_START, and the current to winding 102 is therefore switched on.

At time 625', the value t_CALC has not yet reached the value t_BLOCK_END, so current flow through winding 102 is continued.

At 627', t_CALC has finally exceeded the time span t_BLOCK_END, and energy delivery to winding 102 is therefore now shut off.

The steps just recited are performed in COMMUT_CTRL routine S760. If t_CALC in S800 is less than t_BLOCK_START (time 621'), then nothing happens and execution branches to the end S848.

If, however, t_CALC in S800 is greater than or equal to t_BLOCK_START (times 623', 625', 627'), S802 then checks whether current flow to winding 102 is already activated (COMMUT_ON=1). If No (time 623'), the switch-on procedure takes place starting at S804.

If block length BW=0 in S804, then no current is delivered and execution branches to S812. If, however, BW>0, then depending on the value of the NEXT_COMMUT variable, transistors HSR 130 and LSL 132 are made conductive in S808, or transistors HSL 114 and LSR 136 in S810.

In S812, COMMUT_ON is set to 1 to indicate that current flow to winding 102 is now switched on. Execution then branches to the end S848.

If the value COMMUT_ON=1 in S802 (times 625', 627'), i.e. if a current is flowing to winding 102, S820 then checks whether the t_CALC variable has already reached the value of time span t_BLOCK_END that is calculated in FIG. 30, S673.

If No (time 625'), S822 additionally checks whether t_CALC is greater than or equal to (2*t_HALL−A*). For this motor, (2*t_HALL) is the time needed for rotor 108 to rotate 360° el., and A* is a constant equal to, for example, 400 μs. The effect of S822 is to interrupt current to the winding approximately 400 μs before the next Hall change, even in the event of disruptions in program execution.

That 400-μs period is needed so that the entire shutoff procedure can be executed before the Hall change occurs. The purpose of this is to prevent simultaneous activation of all the power transistors. This "emergency shutoff" is necessary at high rotation speeds because at such speeds, block length BW is almost as great as t_HALL (high power requirement at high rotation speed). At low rotation speeds, the end of a current block is already reached long before the next Hall change occurs, i.e. the response in S822 is always No, and in S824 the Imax interrupt (FIG. 17) is activated to allow reaction, if necessary, to an excessive motor current.

If, however, the value of t_CALC in S820 is greater than or equal to t_BLOCK_END, or if the response in S822 is Yes, the shutoff procedure is then called in S826.

S826 checks, on the basis of the Off_detected variable, whether the shutoff of current flow (i.e. the commutation procedure for shutoff) has already been initiated. If Yes, execution branches to the end S848. If this is the first call, however, execution branches from S826 to S828.

The Off_detected variable is set to 1 in S828. In S830 the Imax interrupt is deactivated, and in S832 the Imin interrupt is activated. (It is very advantageous if the interrupts are activated only in the regions in which they can occur in accordance with the program's logic.)

In S834 both high-side transistors HSL 114 and HSR 130 are shut off. In S836 there is a 30-μs wait time, and in S838 the TIMEOUT interrupt (FIG. 20) is activated and a TIMEOUT time t_TIMEOUT is calculated from the instantaneous value of TIMER1 and a constant t_T0.

At S840, both low-side transistors LSL 132 and LSR 136 are then made conductive so that the current in winding 102 decays in short circuit and can thereby generate kinetic energy in rotor 108. At S842 the COMMUT_ON flag is set to 0, and in S844 the BlockEnd_DONE variable is set to 0 to indicate that commutation is not yet completely finished. Whichever of the two interrupt routines (Imin interrupt and TIMEOUT interrupt) is called first then shuts off both low-side transistors LSL 132 and LSR 136 (cf. S536 of FIG. 19 and S546 of FIG. 20) and sets BlockEnd_DONE to 1 (cf. S538 of FIG. 19 and S548 of FIG. 20). Shutoff is thereby completely terminated, and this is indicated by BlockEnd_DONE=1.

At the next call of COMMUT_NORMAL routine S720, in FIG. 24, S762 execution branches to S764. In S764, COMMUT_ON and Off_detected are set to 0 because current flow is shut off, and in S766 through S770 the predictive value of NEXT_COMMUT is changed, i.e. the value HSL/LSR is changed to LSR/LSL and vice versa (cf. FIG. 26B). The result is that even in the context of an "ignition advance," in which the current is switched on before the actual associated Hall interrupt, the direction of current flow in winding 102 is defined correctly, i.e. the value of NEXT_COMMUT defines which transistor pair needs to be monitored next in terms of switching on and shutting off. In S772 the BlockEnd_DONE flag is then set to 0 so that at the next pass the response in S762 is No, and the routine branches directly to S774.

Figure 27:
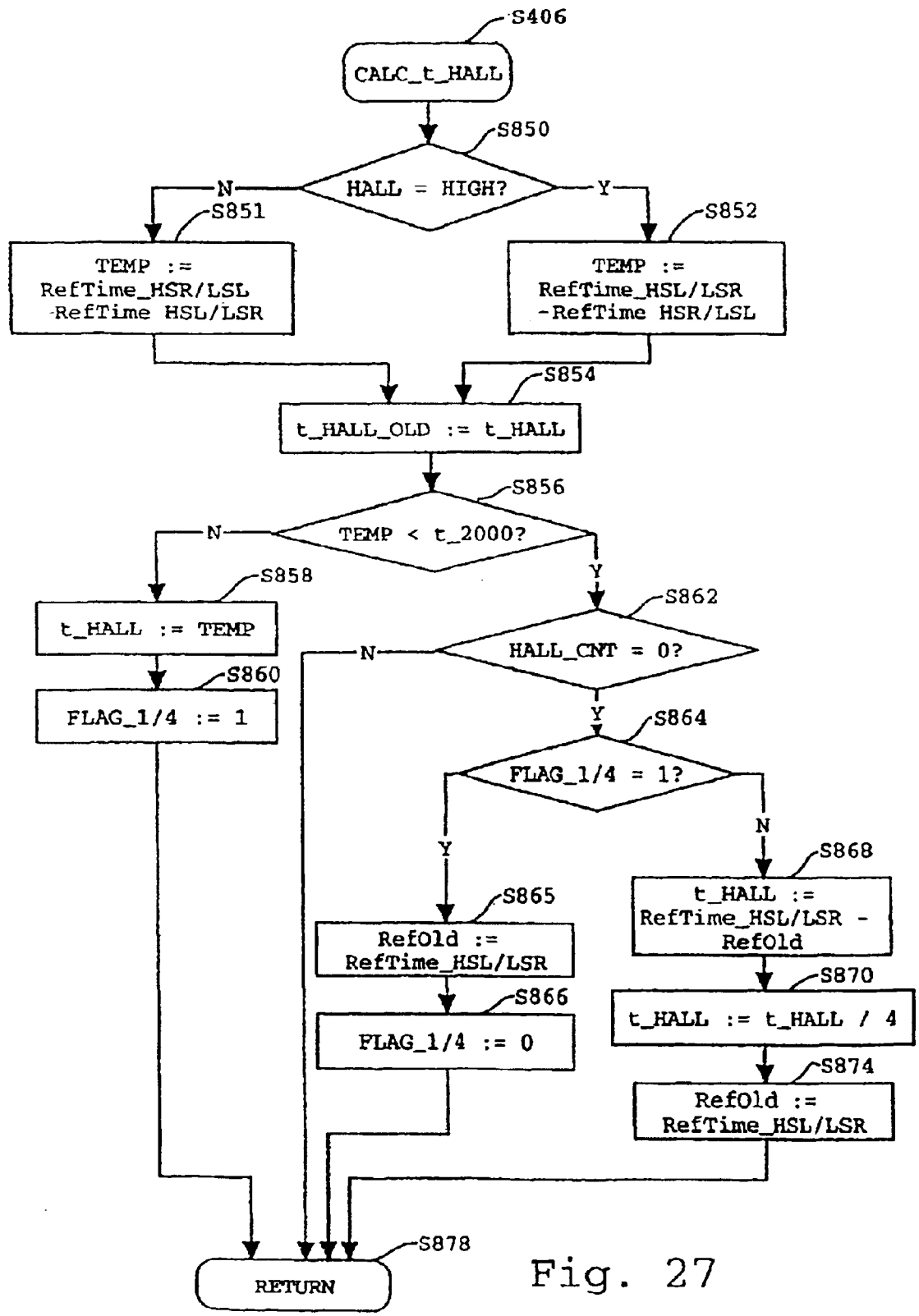
FIG. 27 is a flow chart to explain the calculation of a time period t_HALL at low and high rotation speeds.

FIG. 27 shows CALC_t_HALL routine S406 for calculating the instantaneous Hall time t_HALL, i.e. the time needed for rotor 108 to rotate through 180° el.

Figure 28:
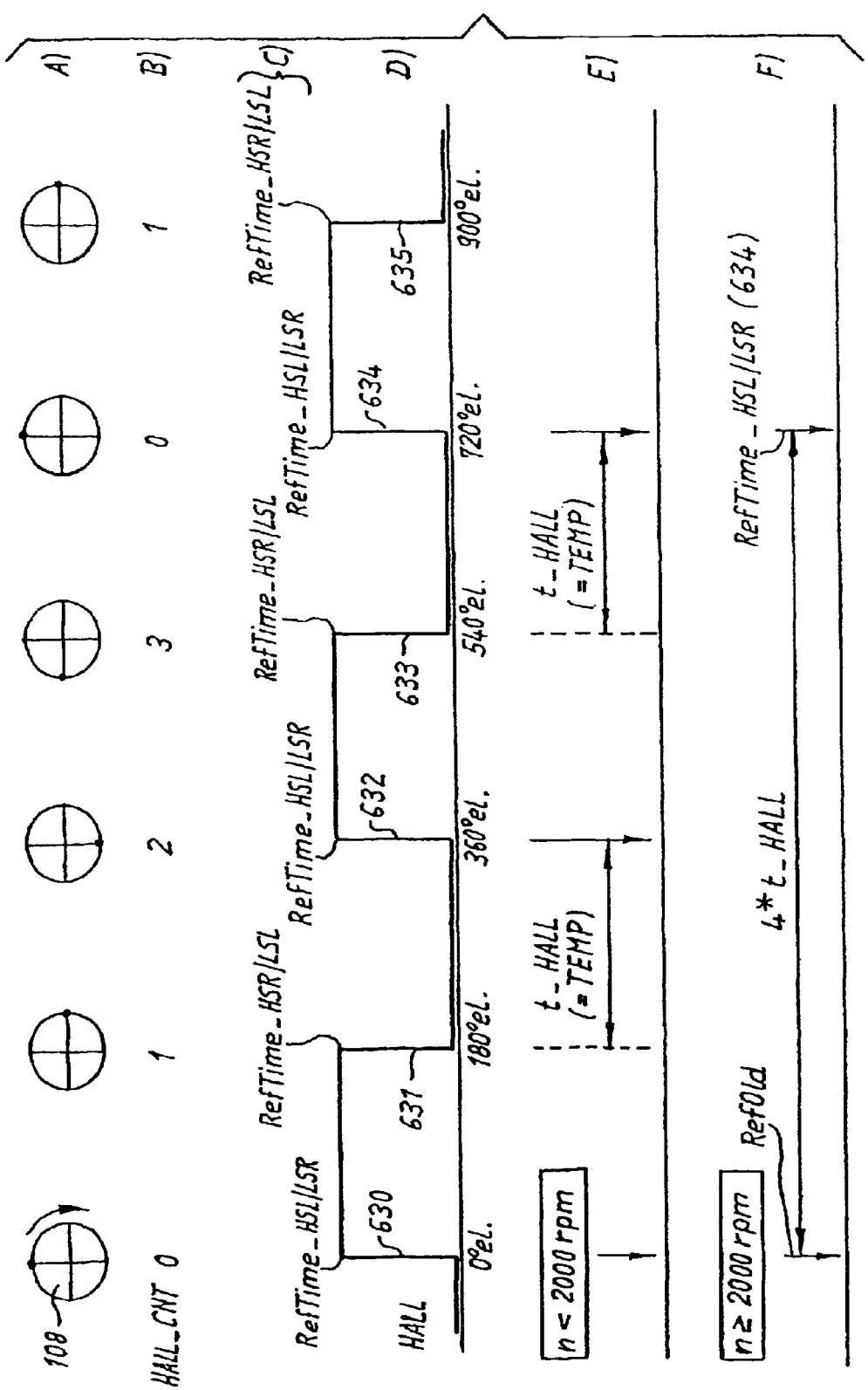
FIG. 28 is a diagram to explain the calculation of time period t_HALL at low and at high rotation speeds.

FIG. 28 is an overview for explanatory purposes. FIG. 28D shows signal HALL, which has edges at points 630, 631, 632, 633, 634, 635, at each of which a Hall change occurs that is used to determine the rotor position and to determine rotation speed and acceleration. Since a Hall change takes place four times per revolution with a four-pole rotor 108, the exact rotor position is measurable four times per revolution.

FIG. 28B shows the value of the HALL_CNT variable. This is a counter which (according to S454, FIG. 16) is incremented modulo 4. This means that this variable sequentially assumes the values 0, 1, 2, 3, 0, 1, 2, 3, 0 . . .

FIG. 28A shows, by way of example the position of rotor 108, which is depicted as a four-pole rotor as in FIG. 1. Edge 630 of signal HALL corresponds to the 0° el. rotor position and to counter status HALL_CNT=0, edge 631 to the 180° el. rotor position and to counter status HALL_CNT=1, edge 632 to the 360° el. rotor position and to counter status HALL_CNT=2, etc.

Two measurement approaches are used. FIG. 28E shows the one approach which is used at low rotation speeds n, e.g. at less than 2000 rpm, where t_HALL assumes large values (cf. equations (6) and (7) below). FIG. 28F shows the other approach which is used at higher rotation speeds (e.g. above 2000 rpm), at which Hall times t_HALL are shorter and inaccuracies due to magnetization defects of rotor 108 are avoided by measuring the time for one complete revolution (720° el.).

CALC_t_HALL routine S406 is called by the main program (FIG. 13) at every second Hall interrupt, specifically when the HALL_CNT variable (FIG. 28) is an even number, i.e. has a value of either 0 or 2 (cf. step S402 in FIG. 13).

The instantaneous time of the Hall change was previously stored in Hall interrupt routine S428 (FIG. 16), specifically in RefTime_HSR/LSL for an edge from High to Low (S458 in FIG. 16; FIG. 28C) and in RefTime_HSL/LSR for an edge from Low to High (S470 in FIG. 16; FIG. 28C). At rotor positions 0° el., 360° el., 720° el., etc., the time for the relevant rotor position is therefore stored as a reference time for HSL/LSR, and at rotor positions 180° el., 540° el., 900° el., etc. the time for the relevant rotor position is stored as a reference time for HSR/LSL, as indicated explicitly in FIG. 28C.

In S851 or S852 (FIG. 27), depending on the value of signal HALL, the time span between the instantaneous and previous Hall change is calculated and is stored in the TEMP variable. In FIG. 28E, for example after Hall change 632, this would be the time between edges 631 and 632, i.e. [RefTime_HSL/LSR (632)—RefTime_HSR/LSL (631)]. In S854 the instantaneous time t_HALL is stored in t_HALL_OLD so that an acceleration calculation can be performed (cf. FIG. 29).

S856 checks whether the time span TEMP is shorter than the time span t_2000 (time t_2000 being equal to time t_HALL at 2000 rpm). If No, rotation speed n of motor 100 is less than 2000 rpm, and the left branch S858, S860 is executed, in which time t_HALL is calculated for one-quarter of a revolution, i.e. for 180° el. In S858, the value TEMP from S851 or S852 is assigned to Hall time t_HALL, and in S860 FLAG_¼ is set to 1 to indicate that at present, only the time for a quarter-revolution is being measured.

If it is found in S856 that the rotation speed of the motor has already reached a rotation speed n=2000 rpm, S862 then checks whether the HALL_CNT variable equals 0. This is true after each complete mechanical revolution of rotor 108 (cf. FIGS. 28A and 28B). If No, execution branches immediately to the end S878, e.g. in the case of edge 632 in FIG. 28D. If, however, HALL_CNT=0, S864 then checks whether FLAG_¼=1.

If Yes, this is the very first pass through the t_HALL calculation for one complete rotor revolution, and therefore for this pass the present value RefTime_HSL/LSR is stored in RefOld so that starting with the next pass, it is possible to calculate using a valid value for RefOld. At the very first pass, there is no calculation of t_HALL over one complete mechanical revolution, but instead the previous value is re-used. In S866 FLAG_¼ is set to zero, i.e. starting with the next pass the measurement can be made over one complete revolution of rotor 108.

At the next call of CALC_t_HALL S406, at which HALL_CNT=0, execution branches from S864 to S868. There the time span is calculated between the instantaneous value RefTime_HSL/LSR (e.g. from edge 634 of FIG. 28D) and the value stored one rotor revolution ago in RefOld (e.g. at edge 630 of FIG. 28D). This time span corresponds to four times the Hall time t_HALL, and in S870 the calculated value is therefore divided by four so that the value t_HALL corresponds to exactly one-quarter of the time required for one entire revolution (from 630 to 634 in FIG. 28E, i.e. 720° el.). This approach to measuring t_HALL is particularly accurate, and therefore results in particularly smooth motor operation.

In S874 the instantaneous value RefTime_HSL/LSR for the next calculation is stored in the RefOld variable. Execution then leaves the routine in S878.

The time RefTime_HSR/LSL could similarly be used instead of RefTime_HSL/LSR, as is self-evident to one skilled in the art. The choice depends on the rotor position at which counter HALL_CNT has a counter status of 0.

In this exemplary embodiment, CALC_t_HALL routine S406 is called only after every second Hall interrupt because of branch S402 in the main program (FIG. 13). The query in S402 of FIG. 13 ensures that when it is called, it has available to it the correct reference times for rotation speed calculation over one complete revolution.

With a fast processor, that same CALC_t_HALL routine S406 could also be called more frequently.

Figure 29:
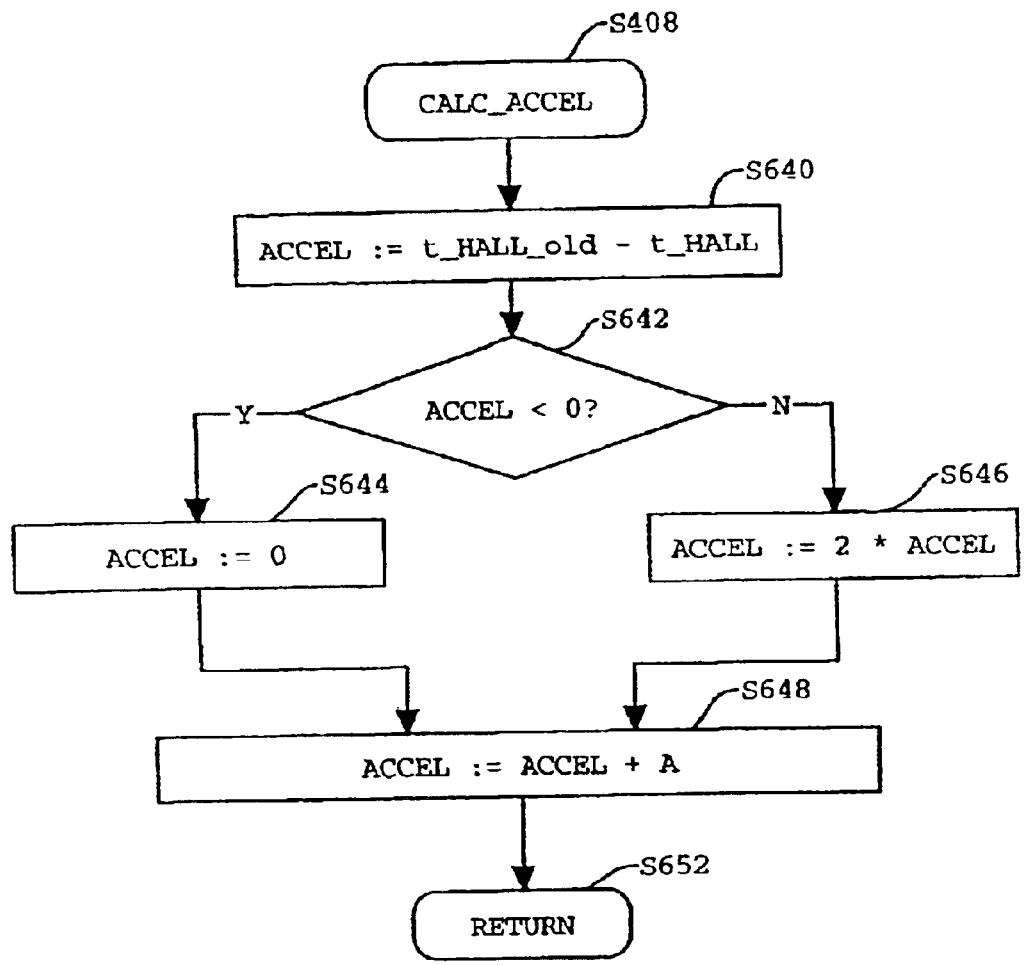
FIG. 29 shows a CALC_ACCEL routine for taking acceleration into account.

FIG. 29 shows CALC_ACCEL routine S408 which is used to calculate the acceleration of rotor 108. As shown in FIG. 13, this routine is executed subsequent to the CALC_t_HALL routine which prepares (in step S854) for the execution of routine S408.

In step S640, the ACCEL variable is calculated as the difference between t_HALL_OLD and t_HALL.

S642 checks whether ACCEL is less than 0, which means that the motor's rotation speed is decreasing e.g. because of a braking operation. In that case ACCEL is set to 0 in S644.

If ACCEL≧0 in S642, the routine then goes to S646, where the value of ACCEL is doubled. An ACCEL greater than 0 means that rotor 108 is being accelerated, for example as the motor comes up to speed. ACCEL is therefore predictively doubled because when a motor is started up, the rotation speed increases in accordance with an e-function, and if the doubling were not applied, the value of ACCEL would consequently be too low already after completion of the calculations.

Subsequent to S644 and S646, the routine goes to S648 where the value A* (equal to 400 µs, for example, because a period of approximately 400 µs is required for the commutation procedure) is added to the value of ACCEL (from S644 or S646). This value of ACCEL is then used in the RGL routine to modify the value of BW. The S408 routine then ends at step S652.

FIG. 30 shows RGL routine S410 for rotation speed control. This is based on a comparison between Hall time t_HALL and target time t_s, the latter corresponding to the desired rotation speed and being specified at input RA0 of µC 40. The controller according to the exemplary embodiment therefore does not work directly with rotation speed, but rather with the times needed by rotor 108 for a specific rotation angle. Hall time t_HALL corresponds to the time taken by the rotor to rotate 180° el. If rotor 108 has four poles and rotates at 3000 rpm, then $$t\_HALL = 60/(3000 \times 4) = 0.005 \ s = 5 \ ms \quad (6)$$

Similarly, the time at 1000 rpm is $$t\_HALL = 60/(1000 \times 4) = 0.15 \ s = 15 \ ms \quad (7).$$

At low rotation speeds, actual value t_HALL is thus very large, for example 150 ms=0.15 s at 100 rpm, and is then substantially greater than target value t_s, which e.g. equals 5 ms at 3000 rpm. For this reason, system deviation RGL_DIFF in step S654 is calculated as the difference (t_HALL−t_s) so that a positive result is obtained for the difference.

S656 checks whether the system deviation is greater than a permitted positive maximum value RGL_DIFF_MAX. If so, then in S658 the system deviation is set to that positive maximum value. This is important especially at start-up, when the system deviation would otherwise become very large.

If the response in S656 is No, the program then goes to step S660 and checks there whether the system deviation is less than a permitted negative maximum value −RGL_DIFF_MAX. If Yes, in S662 the system deviation is set to that negative maximum value. (This refers to the situation in which the motor is faster than the desired rotation speed.)

Steps S658, S660, or S662 are followed by S664, in which the calculation steps of a PI controller are performed. This involves multiplying the system deviation by a proportional factor RGL_P that can equal, for example, 2; the result is the proportional component RGL_PROP.

The system deviation is likewise multiplied by an integral factor RGL_I (equal, for example, to 0.0625), and is then added to the old integral component RGL_INT to yield a new integral component.

Lastly, length BW of a current block 444 or 446 (FIG. 15) is calculated as the sum of the new proportional component and new integral component.

Proportional factor RGL_P and integral factor RGL_I are defined empirically as a function of the size of the motor and the inertia of the load being driven.

Since BW must not be longer than time t_HALL required by the rotor to rotate 180° el., the next step S666 checks whether BW is too large; if so, in step S668 the block length is limited e.g. Toe the instantaneous value t_HALL.

If the response in S666 is No, routine S410 goes to step S670, which checks whether BW is less than 0, meaning that the motor is running too fast. If so, in S671 the value of BW is set to 0, i.e. no current flows to the motor. At the same time, integral component RGL_INT is set back to 0 (or to a low value). It has been found that this operation of setting the integral component back to a low value substantially improves the properties of the controller, especially with regard to overshooting of the set speed.

If the response in S670 is No, in S672 the block length is shortened to (BW−ACCEL), the value ACCEL being taken from S648 of FIG. 29. This value contains an acceleration-dependent component and the value A* (e.g. 400 µs) which was explained in FIG. 29. The reason for S672 is that during acceleration, e.g. at start-up, the next Hall change occurs earlier than at constant rotation speed, so that block length BW must be correspondingly shortened during acceleration. The doubling of value ACCEL in S646 (FIG. 29) also serves to make sufficient time available during acceleration for the commutation procedure, since as a motor starts up its speed increases approximately in accordance with an e-function, and this is taken into account in S646.

Using block length BW from S672, in S673 times t_BLOCK_START and t_BLOCK_END, which are plotted in FIG. 15, are now calculated. In FIG. 15, t_BLOCK_START is the time span between t1 and t3, and its magnitude is obtained from equation (3). Time t_BLOCK_END is obtained, as shown in FIG. 15d, by adding the value of BW to t_BLOCK_START. Times t_BLOCK_START and t_BLOCK_END are needed subsequently for the calculations in FIG. 25 (COMMUT_CTRL routine), as has been explained in detail with reference to FIG. 26.

If an "ignition advance" is desired, as has been explained with reference to equations (3a) and (4a), the formula $$t\_BLOCK\_START := t\_HALL + (t\_HALL - BW)/2 - VZ \qquad (8)$$

is used in S673. VZ in this case is a constant equal to e.g. 400 $\mu$s, and its effect, as shown in FIG. 15d, is to shift the beginning of block 446 to t3', i.e. the current is switched on and shut off earlier; t3' can then be located before t2. The invention makes this possible because the reference point used for calculating t_BLOCK_START for transistors HSL 114 and LSR 136 is leading edge 370 of signal HALL, i.e. the edge before the previous one (cf. arrows 445 and 447 of FIG. 15).

After S673, routine S410 ends at S674.

The routine of FIG. 30 thus yields a block length BW which becomes increasingly short as the actual rotation speed approaches the desired value.

The control function for block length BW interacts with the adaptive controller, described below with reference to FIG. 31 and FIG. 32, that further optimizes the value of BW by way of pulse duty factor pwm. BW should not exceed 95% of t_HALL so that time is available for the commutation procedure, and this is achieved by correspondingly modifying the PWM pulses of which a current block 444 or 446 (FIG. 15) is composed; in other words, the average current in a block is raised or lowered by means of the adaptive controller. If BW is too long, the average current is automatically increased, by raising the pulse duty factor of these pulses, until block length BW has "shrunk" to a value which allows optimum execution of the commutation procedure.

FIG. 31 shows a MOD_pwm routine S412 for modifying pulse duty factor pwm as a function of the motor's operating conditions.

Step S900 checks whether block length BW generated in S672 by the controller (FIG. 30) is less than or equal to 50% of the instantaneous Hall time t_HALL. This (rotation-speed-dependent) value of 0.5*t_HALL represents a lower limit value below which BW should not substantially decrease in order minimize motor noise. The reason is that short drive current pulses cause the motor to produces more solid-borne sound, which is undesirable, and they also reduce efficiency.

If the value has fallen below the lower limit, S902 checks whether pulse duty factor pwm is at least 10%. (It should not fall substantially below this value.)

If pwm is less than or equal to 10%, the program goes to step S904 where pulse duty factor pwm_OUT at output RC2 of $\mu$C 40 is set to the instantaneous value pwm; and then to S906, i.e. to the end of MOD_pwm routine S412. In this instance it is not possible to reduce pwm any further.

If pwm is greater than 10%, the program goes to step S908, which checks whether a counter PWM_CNT has a value of 0. This counter counts the number of times BW has reached or fallen below the lower limit value, i.e. 0.5*t_HALL, and at every fifth count value it causes pulse duty factor pwm to be reduced.

To achieve this, the $\mu$C has an internal 8-bit register which therefore has values between 1 and 256, and these values define pulse duty factor pwm of signal PWM outputted by $\mu$C 40 at its output RC2, which in this $\mu$C has a constant frequency of 20 kHz. Reducing the value in this internal register reduces pwm, and increasing the value in this register increases it.

If counter PWM_CNT has a value of 0 in S908, the program goes to step S910 where this counter is set to a value of 5. Pulse duty factor pwm is then lowered in S912 (cf. FIG. 22), thereby decreasing the mean value of motor current i1, i2. The program then goes to S904.

If counter PWM_CNT is not equal to 0 in S908, the program goes to step S914, where PWM_CNT is decremented by 1, i.e. in this case pwm does not change.

If the response in S900 is No, the program goes to step S916, which checks whether block length BW calculated by controller RGL is too long, i.e. greater than or equal to 95% of t_HALL. This is undesirable because the commutation procedure requires approx. 400 $\mu$s, which would no longer be available if BW were too long.

If BW is not too long, the program goes to step S904 (already explained), and pwm_OUT remains unchanged.

If BW is too long, the program goes to step S918, which checks whether pwm has already reached 100%; if so, the program goes directly to S904, since an increase above 100% is not possible, i.e. a continuous current then flows for the duration of BW.

If it is found in S918 that the pulse duty factor is less than 100%, the next step is S920, where counter PWM_CNT is checked to determine whether its value is 0. If Yes, in S922 counter PWM_CNT is set to 5. Value pwm is then incremented in S924 (cf. FIG. 21) so that the mean value of motor current i1 or i2 correspondingly increases.

If the response in S920 is No, the program goes to step S926, where PWM_CNT is decremented by a value of 1; the routine then goes to step S904.

Figure 32:
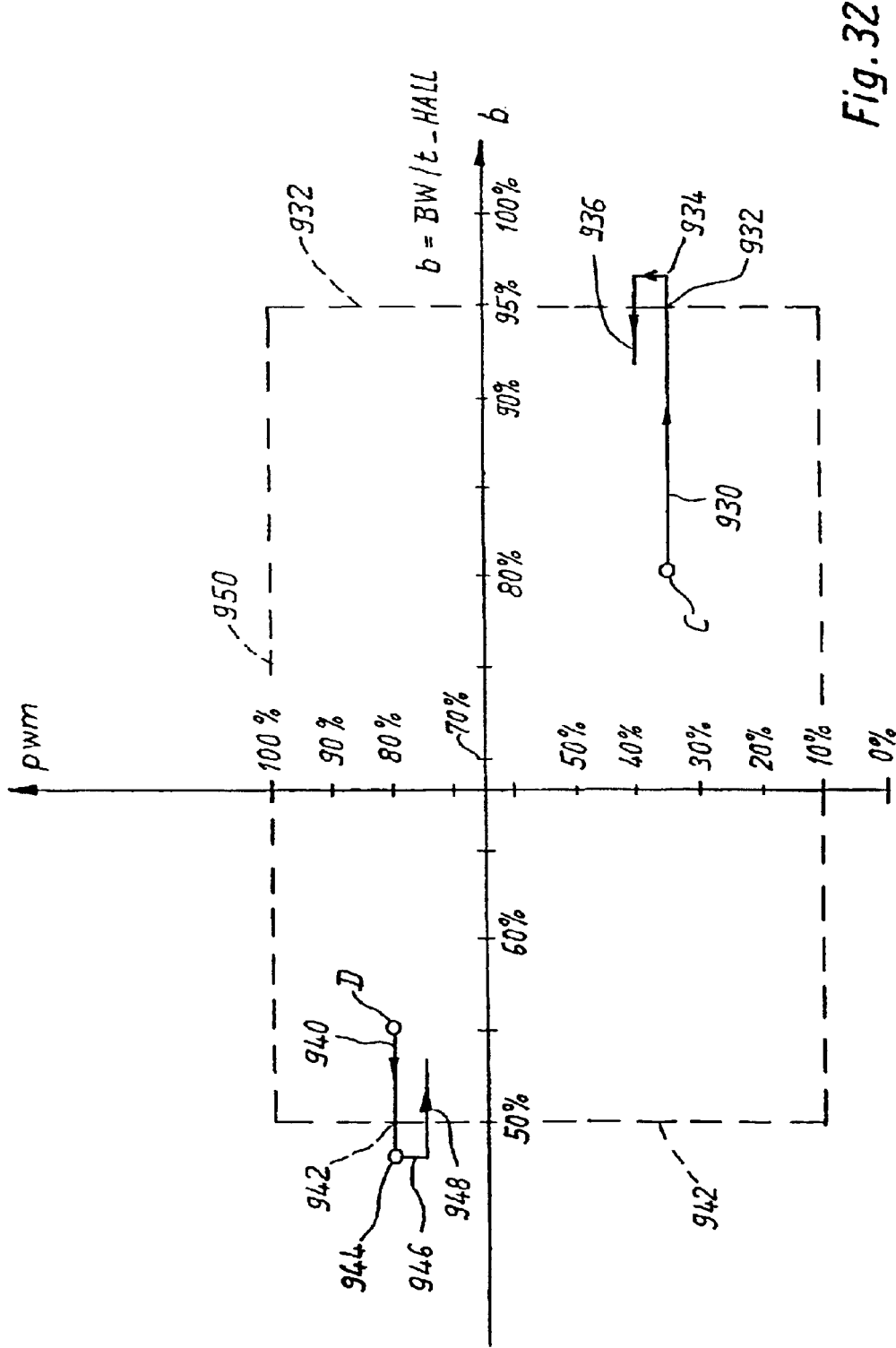
FIG. 32 is a diagram to explain the mode of operation of FIG. 31.

FIG. 32 explains the events in the flow chart of FIG. 31. In FIG. 32, the abscissa shows relative block length b. This is defined as $$b = BW/t\_HALL \qquad (9)$$

It therefore corresponds to the instantaneous ratio between block length BW and Hall time t_HALL, as a percentage. The ordinate shows the instantaneous pulse duty factor pwm, also as a percentage. As a reminder: t_HALL is the time required for rotor 108 to rotate 180° el. at the instantaneous rotation speed (cf. equations (6) and (7)).

a) Relative Block Length b Becomes Too High

Let it be assumed that motor 100 is operating at an operating point C, namely at a block length BW equal to 80% of t_HALL, i.e. at b=80%, and at a pulse duty factor pwm of 35%.

When a load is placed on the motor, b increases along a characteristic curve 930 due to the action of controller RGL; pwm remains unchanged at 35%. At 932 the upper limit value b=95% is exceeded, and at 934 pulse duty factor pwm is increased by means of S924 (FIG. 31), so that a higher average current flows, more energy is delivered to motor 100, and its rotation speed rises.

The relative block length b is therefore reduced by rotation speed controller RGL at 936 and returns to the permissible range, but now with an increased pwm. (The increase in pwm is depicted in exaggerated fashion in FIG. 32; it is performed only in small steps.)

Counter PWM_CNT prevents every minor excursion above upper limit value 932 from causing an increase in pwm. It has been determined empirically that an increase every fifth time yields very stable motor operation, but this factor can depend, for example, on the motor size, the type of load, etc. If this factor is too small, the controller tends to oscillate. Based on present understanding, values between 3 and 7 appear to be optimal.

b) Relative Block Length b Becomes Too Low

FIG. 32 shows, as a second example, an operating point D with a relative block length b=55% and a pwm of 80%.

As load on the motor is relieved, the characteristic curve follows a straight line 940 that falls below the lower limit value 942 (b=50%) and, at 944, results in a relative block length b of approximately 47%. This causes an increase in motor noise, and is unfavorable in terms of motor efficiency.

Pulse duty factor pwm is therefore, by means of S912, reduced along a vertical line 946 (FIG. 32), thereby decreasing the mean value of the current delivered to the motor so that the rotation speed drops.

Rotation speed controller RGL (FIG. 30) therefore calculates a greater block length BW so that relative block length b moves back, along a line 948, into a range above lower limit value 942.

When pronounced load changes occur, the operations just described can repeat several times. In principle, the rotation speed controller can adjust relative block length b and pulse duty factor pwm within the entire range enclosed by a dashed line 950 in FIG. 32, i.e. in this example a pwm between 10 and 100% and a relative block length b between 50 and 95%. This could also be referred to as an adaptive controller that always returns to the range defining its optimum efficiency and low motor noise.

Many variants and modifications are, of course, possible within the context of the present invention.

What is claimed is:

1. A method of commutating an electronically commutated motor which is configured for connection to a DC power network and comprises:

a permanent-magnet rotor (108);
   a full bridge circuit (137) having a plurality of semiconductor switches (114, 130, 132, 136);
   a stator that comprises a drive winding (102) having two winding terminals (104, 106), such that from a first winding terminal (104) of the drive winding (102), a first semiconductor switch (HSL 114) of the full bridge circuit (137) leads to a first line of the DC power network, and a second semiconductor switch (LSL 132) of the full bridge circuit (137) leads to a second line (122) of that DC power network;
   from a second winding terminal (106), a third semiconductor switch (HSR 130) of the full bridge circuit leads to the first line (116), and a fourth semiconductor switch (LSR 136) of the full bridge circuit (137) leads to the second line (122) of the DC power network in order to apply to the drive winding (102) during operation, within at least part of a predetermined rotation angle region of the rotor (108), a current in a first direction and—after the latter has been shut off in the course of a commutation procedure—within at least part of a subsequent rotation angle region, a current in a second direction opposite to the first direction;
   a sensor for sensing a variable (t_HALL) characterizing angular velocity of the rotor (108);
   a calculating means for calculating a future time for switching off motor current at the beginning of a commutation procedure;
   a controlling means for selectively rendering said semiconductor switches conductive or non-conductive;
   and a current sensing means;

the method comprising the steps of:
   a) automatically sensing said variable (t_HALL) characterizing the angular velocity of the rotor (108);
   b) based on that variable (t_HALL), automatically calculating said future time for switching off the current at the beginning of a commutation procedure;
   c) after that time is reached, of the set consisting of first semiconductor switch (HSL) and third semiconductor switch (HSR), automatically rendering the semiconductor switch conductive at the moment nonconductive, in order to interrupt the current flowing from the DC power network in the first direction to the drive winding (102);
   d) after that semiconductor switch has been made nonconductive, of the set consisting of second semiconductor switch (LSL) and fourth semiconductor switch (LSR), in addition to the semiconductor switch conductive at the moment, automatically changing the semiconductor switch not conductive at the moment into a conductive state, in order to connect the winding terminals of the drive winding to one another in low-resistance fashion via the second semiconductor switch (LSL) and fourth semiconductor switch (LSR), so that the current can continue to flow through the drive winding (102) in the first direction through the second semiconductor switch (LSL) and the fourth semiconductor switch (LSR) and can decay;
   e) when that current has reached a reduced value, automatically switching the winding terminals of the drive winding into a high-resistance state so that substantially no further current can flow between them;
   f) at a time subsequent to the end of step e), automatically switching the delivery of current from the DC power network to the drive winding, by controlling the full bridge circuit (137), into the second, opposite direction.

2. The method according to claim 1, further comprising during step e), automatically sensing the current flowing in the low-resistance connection, and automatically switching the winding terminals (104, 106) of the drive winding (102) into a high-resistance state when the current in the drive winding (102) has dropped to a predefined value.

3. The method according to claim 2, wherein the predefined value lies in the vicinity of zero current.

4. The method according to claim 1, further comprising, during step e), automatically measuring the time elapsed since the beginning of step d), and switching the winding terminals into a high-resistance state after a predefined time interval has elapsed.

5. The method according to claim 1, further comprising, during step e), automatically sensing the current flowing in the low-resistance connection, and
automatically switching the winding terminals of the drive winding into a high-resistance state upon occurrence of the first event of:
when the current in the drive winding has dropped to a predefined value, and
when a predefined time period has elapsed since the beginning of step d).

6. The method according to claim 5, wherein the predefined value of the current lies in the vicinity of zero current.

7. The method according to claim 1, further comprising performing said steps in a circuit wherein the full bridge circuit is implemented as an H-bridge (137).

8. An electronically commutated DC motor in which, during commutation, power is switched off in time intervals between current direction reversals, which comprises:

a rotor;

a stator having a stator winding arrangement;

a full bridge circuit for controlling the current ($i1$, $i2$) in the stator winding arrangement, in which full bridge circuit first bridge transistors are connected to a first DC supply lead, and second bridge transistors, configured as field-effect transistors, are connected to the second DC supply lead;

an arrangement for opening the first bridge transistors and for closing the second bridge transistors during a predefined operating state; and means for monitoring the direction of the current that flows in the second bridge transistors when they are conductive.

* * * * *

UNITED STATES PATENT AND TRADEMARK OFFICE
CERTIFICATE OF CORRECTION

PATENT NO.         : 6,940,243 B2                                                                 Page 1 of 1
APPLICATION NO. : 10/415055
DATED                  : September 6, 2005
INVENTOR(S)        : Hansjorg Berroth et al.

It is certified that error appears in the above-identified patent and that said Letters Patent is hereby corrected as shown below:

In column 10, line 10, "," should be -- . --

In column 16, line 5, "1R" should be --IR--

In column 16, line 19, "pF" should be --µF--

In column 22, line 14, "highside" should be --high-side--

In column 27, line 45, "Toe" should be --To--

In column 27, line 49, "28.80" should be --28.8'--

In column 28, line 16, "Toe" should be --to--

In column 32, line 45, "Toe" should be --to--

Signed and Sealed this

Eighth Day of May, 2007

JON W. DUDAS
*Director of the United States Patent and Trademark Office*